US012650703B2

(12) United States Patent
Gordon et al.

(10) Patent No.: US 12,650,703 B2
(45) Date of Patent: Jun. 9, 2026

(54) PLATOONING TELEOPERATED VEHICLES

(71) Applicant: Vay Technology GmbH, Berlin (DE)

(72) Inventors: Karsten Gordon, Ringsee (DE); Shilp Dixit, Berlin (DE); Mathias Metzler, Frankfurt am Main (DE)

(73) Assignee: Vay Technology GmbH, Berlin (DE)

( * ) Notice: Subject to any disclaimer, the term of this patent is extended or adjusted under 35 U.S.C. 154(b) by 0 days.

(21) Appl. No.: 18/740,273

(22) Filed: Jun. 11, 2024

(65) Prior Publication Data

US 2025/0377669 A1      Dec. 11, 2025

(51) Int. Cl.
| | |
|---|---|
| *G05D 1/65* | (2024.01) |
| *G05D 1/224* | (2024.01) |
| *G05D 1/698* | (2024.01) |
| *G06V 20/56* | (2022.01) |
| *H04W 4/40* | (2018.01) |
| G05D 109/10 | (2024.01) |
| G05D 111/10 | (2024.01) |
| G05D 111/30 | (2024.01) |

(52) U.S. Cl.
CPC ......... *G05D 1/6987* (2024.01); *G05D 1/2247* (2024.01); *G05D 1/65* (2024.01); *G06V 20/56* (2022.01); *H04W 4/40* (2018.02); *G05D 2109/10* (2024.01); *G05D 2111/10* (2024.01); *G05D 2111/32* (2024.01)

(58) Field of Classification Search
CPC ...... G05D 1/6987; G05D 1/2247; G05D 1/65; G05D 2109/10; G05D 2111/32; H04W 4/40; G06V 20/56
See application file for complete search history.

(56) References Cited

U.S. PATENT DOCUMENTS

| | | | |
|---|---|---|---|
| 8,352,112 | B2 | 1/2013 | Mudalige |
| 8,457,892 | B2 | 6/2013 | Aso et al. |
| 8,676,466 | B2 | 3/2014 | Mudalige |
| 2009/0222160 | A1 | 9/2009 | Morselli et al. |
| 2019/0163205 | A1 | 5/2019 | Kodera et al. |
| 2020/0042013 | A1 | 2/2020 | Kelkar et al. |

(Continued)

FOREIGN PATENT DOCUMENTS

WO      2004077378 A1      9/2004

OTHER PUBLICATIONS

Partial International Search Report & Written Opinion dated Jul. 25, 2025, for International Application No. PCT/EP2025/065684.

(Continued)

*Primary Examiner* — Mathew Franklin Gordon
(74) *Attorney, Agent, or Firm* — Athorus, PLLC

(57) ABSTRACT

Platoons of vehicles are operated remotely by a teleoperator. A lead vehicle of a platoon establishes communications with a teleoperator station, which receives drive state data from the lead vehicle and generates reference instructions for the lead vehicle. When a lead vehicle is under control of a teleoperator, and a follower vehicle joins a platoon with the lead vehicle, the follower vehicle receives drive state data from the lead vehicle and reference instructions for the lead vehicle from the teleoperator station. The follower vehicle captures data regarding its own drive state, and generates instructions based on the drive state data of the lead vehicle and the reference instructions for the lead vehicle. Drive state data of a lead vehicle of a platoon may be estimated, augmented or refined for accuracy based on drive state data of other vehicles of the platoon.

20 Claims, 29 Drawing Sheets

(56)          References Cited

U.S. PATENT DOCUMENTS

| 2021/0148717 A1 | 5/2021 | Atanasiu et al. |
| 2022/0284818 A1 | 9/2022 | Kwak et al. |
| 2022/0415181 A1 | 12/2022 | Wang et al. |
| 2023/0195105 A1 | 6/2023 | Lei et al. |
| 2023/0326352 A1 | 10/2023 | Lei |
| 2025/0060752 A1 | 2/2025 | Hirano |

OTHER PUBLICATIONS

International Search Report and Written Opinion for International Patent Application No. PCT/EP2025/065684 mailed on Sep. 24, 2025, 26 pages.

DRIVE STATE • VEHICLE A • TIME 1
LOCATION 41.767°N, 72.619°W
COURSE 056.8°   SPEED 64.1 mph
STEERING WHEEL ANGLE: +2.5°
ENGINE: 2929 rpm (GEAR 4)
YAW 0.1°  PITCH 1.4°  ROLL -0.3°

FIRST VEHICLE PROVIDES IMAGING DATA AND DRIVE STATE TO TELEOPERATOR

TELEOPERATOR GENERATES REFERENCE INSTRUCTIONS FOR FIRST
VEHICLE BASED ON IMAGING DATA AND DRIVE STATE

REFERENCE INSTRUCTIONS
VEHICLE A TIME 2
$T_1(x,y,z)$, $T_2(x,y,z)$, $T_3(x,y,z)$ 235A-2

210

$\vec{V}_{A2}$; $(x,y,z)A2$ 204A-1

ACTIONS EXECUTED
VEHICLE A TIME 2

245A-2

242

204A-3

NETWORK

205

REFERENCE
INSTRUCTIONS
VEHICLE A
TIME 2

235A-2

204A-2

202A

200

FIRST VEHICLE EMITS SIGNAL INVITING
VEHICLES TO FORM PLATOON

200

210

205

NETWORK 240A-3

VEHICLE A
AVAILABLE TO
FORM PLATOON
LOCATION
41.767°N 72.619°W
DESTINATION
BOSTON, MASS.

204B-1

$\vec{V}_{B3}$, (x, y, z)$_{B3}$

242

204B-2

204B-3

202B 230B-3

DRIVE STATE • VEHICLE B • TIME 3
LOCATION 41.861°N 72.366°W
COURSE 087.1° SPEED 64.5 mph
STEERING WHEEL ANGLE +0.7°
ENGINE: 3100 rpm (GEAR 5)
YAW 0.1° PITCH 0.0° ROLL 0.3°
DESTINATION: BOSTON, MASS.

SECOND VEHICLE ESTABLISHES
CONDITIONS FOR FORMING PLATOON
WITH FIRST VEHICLE

DRIVE STATE • VEHICLE A • TIME 4
LOCATION 41.891°N 72.301°W
COURSE 078.8° SPEED 63.9 mph
STEERING WHEEL ANGLE +0.1°
ENGINE: 3098 rpm (GEAR 5)
YAW -0.2°  PITCH 0.1°  ROLL -0.1°
DESTINATION: BOSTON, MASS.

DRIVE STATE
VEHICLE A
TIME 4

NETWORK

TO
320

FROM 365

SECOND VEHICLE TRANSMITS ACTIONS EXECUTED AND DRIVE STATE TO
FIRST VEHICLE AND TELEOPERATOR                                                    370

375

SECOND
VEHICLE REMAINS
FOLLOWER OF FIRST        YES
VEHICLE IN PLATOON?

NO

CONTROL OF SECOND VEHICLE TRANSFERRED TO MANUAL OPERATOR,      380
OTHER TELEOPERATOR, OR OTHER PLATOON

STOP

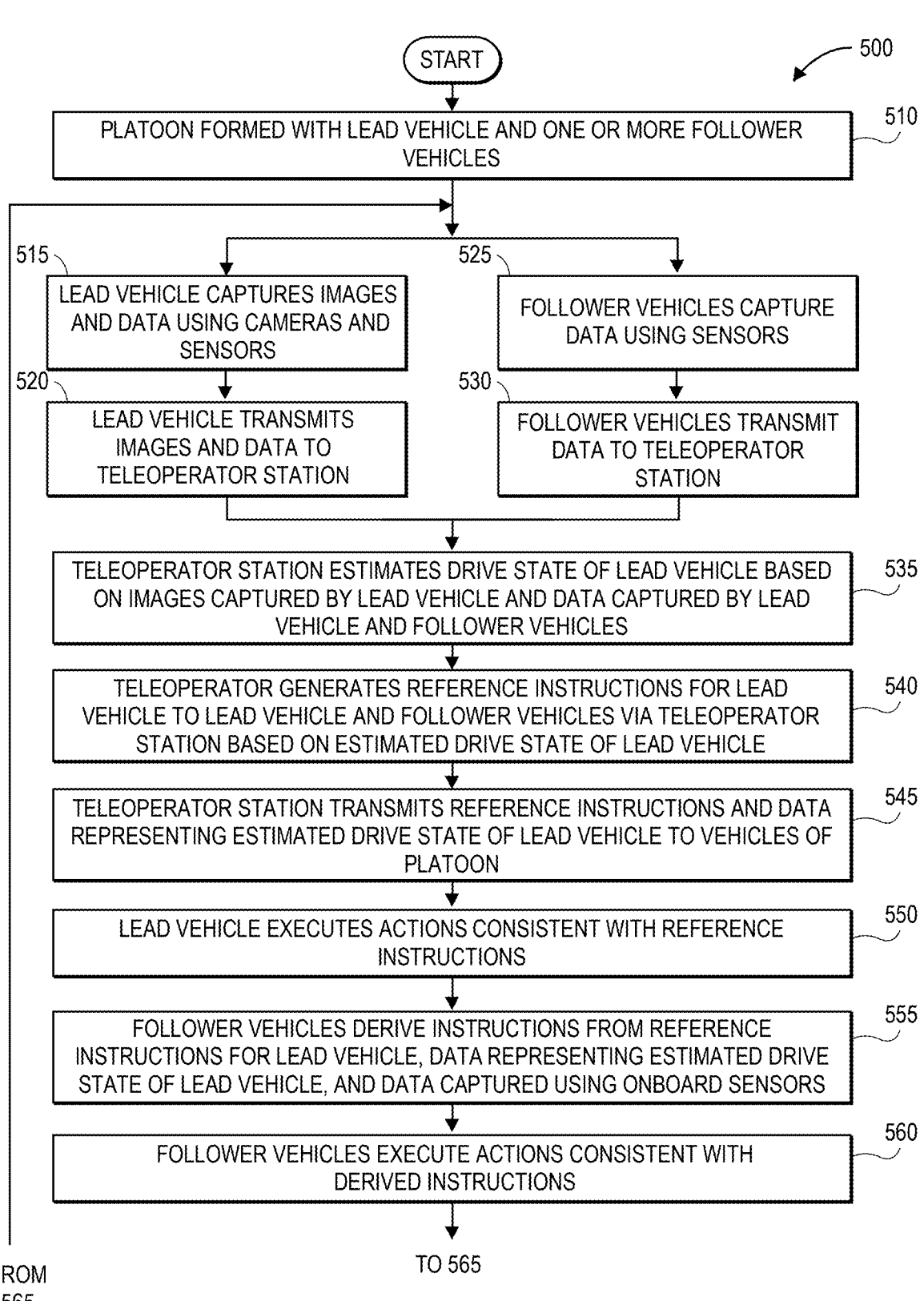

START

500

510
PLATOON FORMED WITH LEAD VEHICLE AND ONE OR MORE FOLLOWER VEHICLES

515
LEAD VEHICLE CAPTURES IMAGES AND DATA USING CAMERAS AND SENSORS

525
FOLLOWER VEHICLES CAPTURE DATA USING SENSORS

520
LEAD VEHICLE TRANSMITS IMAGES AND DATA TO TELEOPERATOR STATION

530
FOLLOWER VEHICLES TRANSMIT DATA TO TELEOPERATOR STATION

535
TELEOPERATOR STATION ESTIMATES DRIVE STATE OF LEAD VEHICLE BASED ON IMAGES CAPTURED BY LEAD VEHICLE AND DATA CAPTURED BY LEAD VEHICLE AND FOLLOWER VEHICLES

540
TELEOPERATOR GENERATES REFERENCE INSTRUCTIONS FOR LEAD VEHICLE TO LEAD VEHICLE AND FOLLOWER VEHICLES VIA TELEOPERATOR STATION BASED ON ESTIMATED DRIVE STATE OF LEAD VEHICLE

545
TELEOPERATOR STATION TRANSMITS REFERENCE INSTRUCTIONS AND DATA REPRESENTING ESTIMATED DRIVE STATE OF LEAD VEHICLE TO VEHICLES OF PLATOON

550
LEAD VEHICLE EXECUTES ACTIONS CONSISTENT WITH REFERENCE INSTRUCTIONS

555
FOLLOWER VEHICLES DERIVE INSTRUCTIONS FROM REFERENCE INSTRUCTIONS FOR LEAD VEHICLE, DATA REPRESENTING ESTIMATED DRIVE STATE OF LEAD VEHICLE, AND DATA CAPTURED USING ONBOARD SENSORS

560
FOLLOWER VEHICLES EXECUTE ACTIONS CONSISTENT WITH DERIVED INSTRUCTIONS

FROM 565

SENSOR DATA VEHICLE A
LOCATION 33.552°N 112.265°W
COURSE 220°  SPEED 24 mph
STEERING ANGLE -1.0°  ENGINE 3240 rpm
YAW 0.2°  PITCH 0.4°  ROLL 0.3°
OBJECT 1:  NATURAL
    19 m 032°   0 mph
OBJECT 2:  NATURAL
    16 m 129°   0 mph
OBJECT 3:  VEHICLE
    15 m 180°   25 mph 221°
OBJECT 4:  NATURAL
    39 m 222°   0 mph
OBJECT 5:  VEHICLE
    11 m 322°   31 mph 038°

615A

602C

602A

602B $\vec{V}_A$ $\vec{V}_C$ $\vec{V}_B$ $(x,y,z)_A$ $O_1$
606-2

$O_2$
606-3

$O_3$ $O_4$
606-1

$O_5$

SENSOR DATA VEHICLE B
LOCATION 33.553°N 112.264°W  COURSE 220°  SPEED 25 mph
STEERING ANGLE -0.5°  ENGINE 3332 rpm
YAW 0.2°  PITCH 0.3°  ROLL 0.1°
OBJECT 6:  NATURAL 318°  18 m  0 mph
OBJECT 7:  VEHICLE 338°  31 m  040° 26 mph
OBJECT 8:  VEHICLE 000°  15 m  221° 24 mph
OBJECT 9:  NATURAL 010°  23 m  0 mph
OBJECT 10: NATURAL 062°  11 m 0 mph LEAD VEHICLE DRIVE STATE ESTIMATED BASED ON LEAD
VEHICLE AND FOLLOWER VEHICLE IMAGES AND DATA VISUALIZATION GENERATED BASED ON LEAD VEHICLE AND FOLLOWER VEHICLE IMAGES AND DATA

PLATOONING TELEOPERATED VEHICLES

BACKGROUND

Traditionally, road vehicles such as automobiles, trucks or others have been operated by local operators who are riding in or on such vehicles. A local operator may typically cause a road vehicle to accelerate or brake, or to change gears or other power configurations, by contact with one or more foot pedals provided within the road vehicle. A local operator may also cause a road vehicle to travel on a desired course or in a desired direction, or to change a course or a direction, by interacting with a steering wheel or another control system provided within the road vehicle. Alternatively, a local operator may also choose routes for a road vehicle, establish environmental conditions within the road vehicle, or otherwise take any other actions with respect to the operation of the road vehicle, by interacting with one or more systems provided within the road vehicle.

Groups of autonomous (or self-driving) road vehicles may be operated as platoons. In a platoon of autonomously operated road vehicles, a lead vehicle at a front of the platoon typically selects a speed and a course or direction of the platoon, and maintains the speed and the course or the direction of the platoon. Each of the other vehicles of a platoon remain aligned behind the lead vehicle, fixed in relative position with respect to the lead vehicle or one another, and proceed on courses or at speeds selected by the lead vehicle. Platoons of autonomous vehicles may theoretically improve travel time, increase capacities of lanes, and reduce congestion.

The use of a teleoperator to remotely drive a road vehicle may be considered a transient technology between local operation of road vehicles and fully autonomous operation of road vehicles. In remote driving applications, a teleoperator may use a teleoperator station to remotely control any or all aspects of the operation of the vehicle by distributing commands or instructions to the road vehicle via a wireless communication network. A teleoperator may remotely operate a road vehicle in any manner, such as by viewing a live video stream representing one or more views of the vehicle's environment at the teleoperator station, and executing one or more commands or instructions to cause the road vehicle to travel on a course or to travel at a speed, or to change a course or a speed of the road vehicle, using one or more computer devices or other components.

BRIEF DESCRIPTION OF THE DRAWINGS

FIGS. 5A and 5B are a flow chart of one process for platooning teleoperated vehicles in accordance with implementations of the present disclosure.

DETAILED DESCRIPTION

Figure 1:
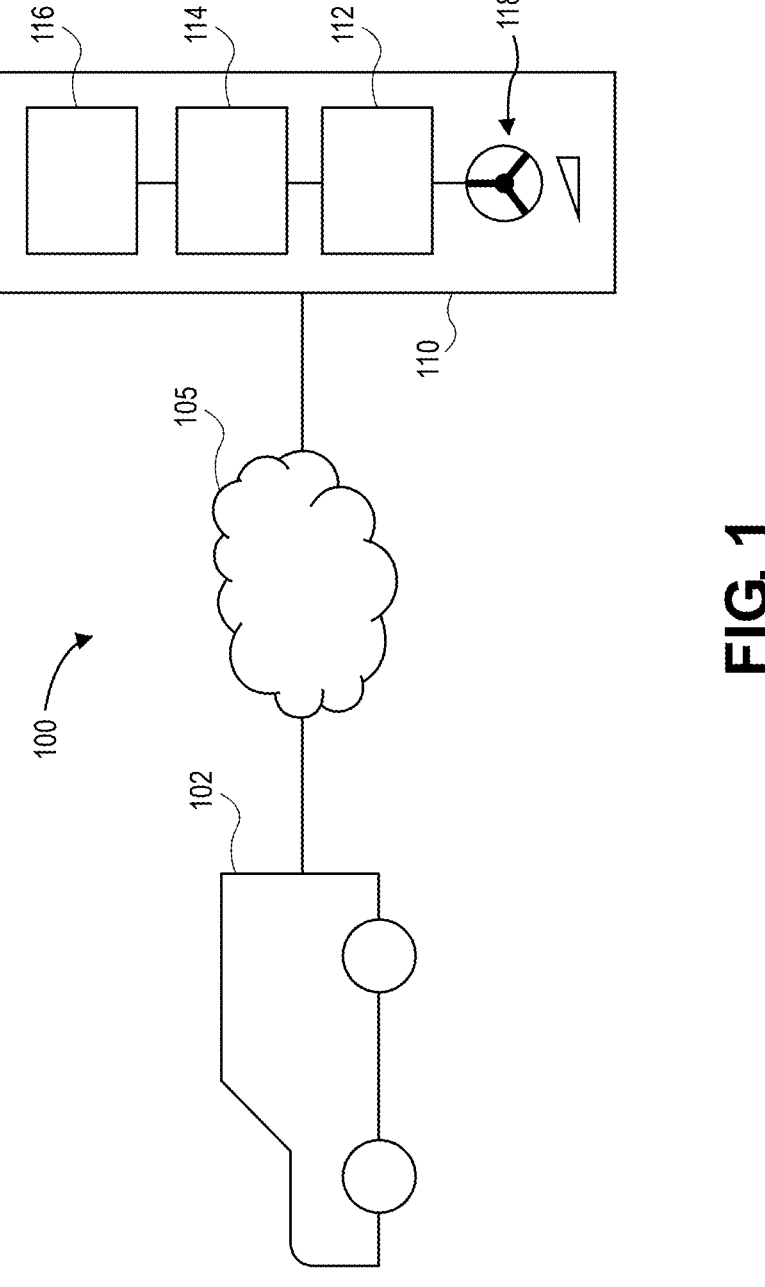
FIG. 1 is a view of aspects of one remote driving system in accordance with implementations of the present disclosure.

As is set forth in greater detail below, the present disclosure is directed to systems and methods for platooning teleoperated vehicles. More specifically, the present disclosure is directed to transferring control of a vehicle to a remote operator, or a teleoperator, and establishing a platoon (e.g., a "teleplatoon") with the remotely operated (or teleoperated) vehicle as a lead vehicle of the platoon, and any number of other vehicles following the lead vehicle. For example, during remote operation, imaging devices or other onboard sensors associated with a first vehicle may capture live streams of images or other sensor data representing views of the first vehicle's environment, or attributes of a drive state of the first vehicle. The streams of images or other data may then be transmitted, processed, and presented to the teleoperator at a teleoperator station. At the teleoperator station, the teleoperator may view at least a visualization formed from at least some of the images or other data, such as one or more live video streams, and remotely operate the first vehicle by way of a control interface or other control system to generate a reference trajectory or other drive control commands or instructions. The teleoperator station may then process and transmit the reference trajectory or other commands or instructions to the first vehicle, which may receive, process, and execute such commands or instructions. Streams of data received from the first vehicle may be processed and presented to account for latency or any other factors, or for any other reason.

In some implementations, when the first vehicle is under remote operation of a teleoperator, the first vehicle may generate and transmit one or more signals indicating a capacity or willingness to form a platoon with other vehicles that may be operated locally (e.g., by drivers within such vehicles) or remotely (e.g., by teleoperators), and to act as a lead vehicle of the platoon. Upon receiving such a signal, a second vehicle may establish conditions for forming a platoon with the first vehicle, such as by repositioning to within a predetermined range or distance of the first vehicle, and traveling in common or similar directions, or at common or similar speeds. The second vehicle may then designate itself as a follower vehicle of the lead vehicle, and as a member of the platoon.

Subsequently, when the first vehicle captures drive state data using cameras or other sensors, and transmits the drive state data to the teleoperator station, the second vehicle also receives the drive state data of the first vehicle. When the teleoperator generates commands or instructions for the first vehicle, and the teleoperator station transmits such commands or instructions to the first vehicle, the second vehicle also receives the commands or instructions that are intended for the first vehicle. The second vehicle may then also capture drive state data using cameras or other onboard sensors, and may interpret not only the drive state data captured by its own cameras or sensors but also the drive state data captured by the first vehicle and the commands or instructions generated by the teleoperator station, as well as actions taken by the first vehicle in accordance with such commands or instructions, to generate commands or instructions for its own operation. Thus, guided by a drive state of the first vehicle, and aided by inputs generated by a remote operator for the first vehicle, as well as actions autonomously taken by the first vehicle in response to such inputs, autonomous operation of the second vehicle may be enhanced accordingly.

Commands or instructions generated by a remote operator at a teleoperator station may include any sets of information or data that may be executed by a lead vehicle of a platoon, or interpreted by follower vehicles of the platoon. Such sets of information or data may include points in three-dimensional space defining a path or a route to be traveled by the lead vehicle, velocities or accelerations of the lead vehicle while traveling along the path or the route, threshold distances (e.g., maximum and minimum) that must be maintained between two of the vehicles of the platoon, or any other attributes or characteristics. The lead vehicle may interpret the commands or instructions and may execute one or more actions based on such commands or instructions, in a manner consistent with a drive state of the lead vehicle. Additionally, each of the follower vehicles may interpret the commands or instructions generated for the lead vehicle, along with the drive state of the lead vehicle, and actions executed by the lead vehicle in response to such commands or instructions, to independently deriving commands or instructions for the respective ones of the follower vehicles, and to execute actions consistent with the derived commands or instructions.

Moreover, where a plurality of vehicles of a platoon capture data using cameras or other sensors during operations, the vehicles of the platoon may share such data with a lead vehicle of the platoon, or a teleoperator station in control of the lead vehicle. In some implementations, the lead vehicle may then interpret data captured by its own onboard sensors and also data captured by sensors of other vehicles to generate data representing its drive state and transmit that data to a teleoperator station. Alternatively, in some other implementations, a remote operator at the teleoperator station may rely on drive state data captured by multiple vehicles of the platoon, thereby augmenting a perspective of the lead vehicle, and enabling the remote operator to make more relevant or well-informed decisions regarding the operation of the lead vehicle and, therefore, the platoon as a whole.

Referring to FIG. 1, a view of aspects of one remote driving system 100 in accordance with implementations of the present disclosure is shown.

As shown in FIG. 1, the remote driving system 100 may comprise a vehicle 102 that is constructed or adapted to be remotely driven, controlled, or instructed by a teleoperator via a wireless communication network 105. In addition, the remote driving system 100 of FIG. 1 may comprise a teleoperator station 110 for use by a teleoperator to generate one or more commands or instructions for remotely driving, controlling, or instructing the vehicle 102 via the wireless communication network 105.

In some implementations, the vehicle 102 may comprise a car, such as a small car (e.g., a compact), a regular car (e.g., a sedan), a Sport Utility Vehicle ("SUV"), a van, a tractor (with or without a trailer), a truck, or any other type of vehicle 102 that is constructed or adapted to be remotely driven, controlled, or instructed. In addition, the vehicle 102 may be a traditional, locally operated vehicle that has been modified to include or provide any required on-board infrastructure for teleoperation. For example, the vehicle 102 may include one or more actuators for controlling the vehicle 102, one or more imaging devices, cameras, or sensors for capturing imaging data of the vehicle 102's environment, one or more sensors to detect or measure drive state information, and/or various interfaces for bi-directional communication with the teleoperator station 110 via the wireless communication network 105.

Actuators for controlling the vehicle 102 may include mechanical actuators that directly actuate a steering wheel, acceleration pedal, brakes, and/or other systems or components of the vehicle 102. Alternatively, actuators for controlling the vehicle 102 (e.g., for adjusting or controlling speed, acceleration, steering angle, and/or other operational characteristics) may be controlled via an electronic interface associated with the vehicle 102.

Imaging devices or cameras associated with the vehicle 102 may include various types of imaging sensors, analog cameras, digital cameras, video cameras, depth sensors, infrared sensors, time-of-flight sensors, or other types of imaging sensors. The imaging devices or cameras may be mounted or installed and oriented at various positions on the vehicle 102 in order to capture imaging data of an environment at least partially surrounding the vehicle 102, e.g., in a forward movement direction, in a rearward movement direction, and/or in various other directions of a periphery of the vehicle 102. In addition, the imaging devices or cameras may capture imaging data, such as video data, live video streams, or other types of imaging data, which may be transmitted to the teleoperator station 110 and used for any purpose, such as to facilitate generation of a visualization of the vehicle 102 within the imaging data.

Sensors for detecting or measuring drive state information of the vehicle 102 may include not only imaging devices or cameras but also various other types of sensors configured for detecting speed, acceleration, steering angle, and/or other operational characteristics of the vehicle 102. For example, a first sensor such as a speedometer or encoder may measure a drive speed of the vehicle 102, while a second sensor such as an accelerometer, a pressure sensor, or an encoder may measure pedal actuation, acceleration, deceleration, or braking of the vehicle 102, and a third sensor such as an encoder or position or orientation sensor may measure a steering state or angle of the steering wheel, or an orientation of wheels of the vehicle 102. Drive state information of the vehicle 102 may be transmitted to the teleoperator station 110, or to any other computer devices or systems (e.g., a server), and may be used to facilitate generation of a visualization of the vehicle 102 within the imaging data, or for any other purpose, as further described herein.

Interfaces for bi-directional communication between the vehicle 102 and the teleoperator station 110 may enable transmission of imaging data, drive state information associated with the vehicle 102, or any other information or data from the vehicle 102 to the teleoperator station 110 via the wireless communication network 105. In addition, the interfaces for bi-directional communication with the teleoperator station 110 may enable receipt of drive control commands and/or other data, information, commands, or instructions from the teleoperator station 110 via the wireless communication network 105.

In some implementations, the wireless communication network 105 may include a network that allows for bi-directional transmission of data between the vehicle 102 and the teleoperator station 110. For example, the network 105 may be a Long-Term Evolution (or "LTE") network, a fourth generation ("4G") wireless communication network, a fifth generation ("5G") wireless communication network, or any other types of wireless communication networks. The network 105 may also include the Internet, in whole or in part.

Various information or data may be transmitted via the network 105, including but not limited to imaging data and/or drive state information associated with the vehicle 102, e.g., from the vehicle 102 to the teleoperator station 110, as well as drive control commands or instructions, or other data, information, commands, or instructions, e.g., from the teleoperator station 110 to the vehicle 102. Drive state information may comprise data or information related to speed, acceleration, steering angle, and/or other operational data or characteristics associated with the vehicle 102. Further, additional data may be exchanged between the vehicle 102 and the teleoperator station 110, such as time synchronization information (e.g., data transmission timestamps), or between the vehicle 102 or the teleoperator station 110 and any other computer devices or systems.

In some implementations, the teleoperator station 110 may comprise a communication unit 112 configured to send and receive data or information to and from the vehicle 102 via the network 105. The teleoperator station 110 may also comprise a processor (or processing unit) 114 configured to process various data and generate a visualization of a vehicle 102 to account for video latency as further described herein, a presentation (or display) device 116 configured to present the imaging data and the visualization of the vehicle 102 to a teleoperator using the teleoperator station 110, and a control interface 118 configured to receive drive control commands from the teleoperator using the teleoperator station 110.

The communication unit 112 may comprise various types of communication systems, devices, antenna, interfaces, or other data transmit/receive units configured to enable wireless communication between the teleoperator station 110 and the vehicle 102 via the wireless communication network 105. As described herein, the communication unit 112 may receive imaging data, drive state information, and/or other data from the vehicle 102, and may transmit drive control commands and/or other data to the vehicle 102.

As further described herein, the capture, transmission, receipt, processing, and/or presentation of imaging data, e.g., video data or live video streams, or drive state information from a vehicle 102 to a teleoperator station 110 via a network 105 may introduce time delay or latency, e.g., video latency. As a result, imaging data or other information or data that is presented to a teleoperator at a teleoperator station 110 may not actually be live or real-time, but instead may be associated with a past time, based on a current value or amount of latency. In addition, the receipt, transmission, processing, and/or execution of drive control commands from a teleoperator station 110 to a vehicle 102 via a network 105 may also introduce time delay or latency, e.g., control latency. As a result, drive control commands or instructions that are sent to the vehicle 102 may actually be executed at a future time based on a current value or amount of control latency.

The processor 114 may include or be a processing unit, graphics processing unit, or another type of processors configured to process various information or data that is received and/or sent between the vehicle 102 and teleoperator station 110 via the network 105. For example, the processor 114 may receive imaging data, e.g., video data or live video streams, and determine a value or amount of video latency associated with the imaging data. In some examples, timestamps may be embedded within portions of the imaging data, e.g., as various embedded codes within one or more pixels, and the processor 114 may extract and decode the embedded timestamps to determine a current value or amount of video latency based on a comparison with a current time.

In other examples, timestamps may be sent together or along with imaging data, e.g., in metadata or other portions of the imaging data, and the processor 114 may receive or detect the timestamps to determine a current value or amount of video latency based on a comparison with a current time. Various other methods may be used to provide timestamps associated with portions of imaging data, in order to determine a current value or amount of video latency. As further described herein, the processor 114 may generate a visualization of the vehicle 102 within the imaging data based at least in part on a determined value or amount of video latency.

The processor 114 may also receive drive state information associated with the vehicle 102. For example, the drive state information may comprise data or information related to current speed, acceleration, steering angle, and/or other operational data or characteristics associated with the vehicle 102, and the processor 114 may generate a visualization of the vehicle 102 within the imaging data based at least in part on the drive state information, as further described herein. In addition, the processor 114 may receive and process drive control commands received from a teleoperator associated with the teleoperator station 110, such that the drive control commands can be transmitted to the vehicle 102 via the network 105 in order to remotely drive, control, or instruct various systems or components of the vehicle 102.

In some implementations, in order to generate a visualization of the vehicle 102 within the imaging data, the processor 114 may determine a position of the vehicle 102, e.g., an estimated position, based on the video latency and/or the drive state information. For example, based on the amount of time that has elapsed since capture of the imaging data based on the video latency, and/or based on the drive state information, e.g., speed, acceleration, and/or steering angle, associated with the time of capture of the imaging data, an estimated position of the vehicle 102 may be determined.

For example, if the vehicle 102 is traveling along a straight path at a relatively slower speed and if the video latency is a relatively small value, a position of the visualization of the vehicle 102 within the imaging data may be determined to be relatively closer to a viewpoint or perspective associated with the imaging data. In another example, if the vehicle 102 is traveling along a straight path at a relatively faster speed and if the video latency is a relatively large value, a position of the visualization of the vehicle 102 within the imaging data may be determined to be relatively farther forward from a viewpoint or perspective associated with the imaging data.

In some implementations, one or more characteristics of the visualization of the vehicle 102 may be modified based on the video latency. As an example, if the video latency is a relatively large value, the visualization of the vehicle 102 may change colors, e.g., from green to amber and/or red. In addition, highlighting, outlining, sharpness, focus, or resolution of the visualization of the vehicle 102 may be reduced or made fuzzy to indicate a relatively large value of video latency. In another example, if the video latency is a relatively small value, the visualization of the vehicle 102 may change colors, e.g., from red and/or amber to green. In addition, highlighting, outlining, sharpness, focus, or resolution of the visualization of the vehicle 102 may be increased or made clear and distinctive to indicate a relatively small value of video latency.

In some implementations, the processor 114 may determine an uncertainty associated with the determined position, e.g., based on the video latency and/or the drive state information. For example, based on the determined uncertainty associated with the determined position, various characteristics of the visualization of the vehicle 102 may be modified. In some examples, if the vehicle 102 is making a turn and if the video latency is a relatively large value such that the uncertainty associated with the position of the visualization of the vehicle 102 is relatively high, a size, bounding box, or maximum envelope associated with the visualization of the vehicle 102 may be increased or enlarged to indicate the level of uncertainty associated with the determined position. In addition or alternatively, a sharpness, focus, or resolution associated with the visualization of the vehicle 102 may be reduced or made fuzzy to indicate the level of uncertainty associated with the determined position.

In other examples, if the vehicle 102 is moving along a relatively straight path and if the video latency is a relatively small value such that the uncertainty associated with the position of the visualization of the vehicle 102 is relatively small, a size, bounding box, or maximum envelope associated with the visualization of the vehicle 102 may be decreased or reduced to indicate the level of uncertainty associated with the determined position. In addition or alternatively, a sharpness, focus, or resolution associated with the visualization of the vehicle 102 may be increased or made clear or distinctive to indicate the level of uncertainty associated with the determined position.

The presentation device 116 may comprise one or more monitors, screens, projectors, display devices, head-mounted displays, augmented reality displays, and/or other types of presentation devices. For example, the presentation device 116 may receive and present, render, or display the imaging data, e.g., video data or live video streams, received from the vehicle 102. In addition, the presentation device 116 may receive the visualization of the vehicle 102 generated by the processor 114, and may present, render, or overlay the visualization of the vehicle 102 within or onto the imaging data. The presentation device 116 may present the imaging data and the visualization of the vehicle 102, such that a teleoperator at the teleoperator station 110 may perceive and understand an environment around the vehicle 102 and safely and reliably drive, control, or instruct operations of the vehicle 102.

The control interface 118 may comprise a steering wheel, acceleration pedal, brake pedal, transmission selector, and/or various other interface components to generate drive control commands for the vehicle 102. In addition, the control interface 118 may include components, elements, or interfaces to control or instruct various other aspects of the vehicle 102, such as lights, turning indicators, windshield wipers, power windows, power doors, climate control systems, entertainment or infotainment systems, and/or various other systems, devices, or accessories associated with the vehicle 102. The control interface 118 may receive drive control commands provided or input by a teleoperator at the teleoperator station 110, which may then be processed and/or transmitted to the vehicle 102 via the network 105.

The control interface 118 may receive interactions by a teleoperator at the teleoperator station 110, and interpret such interactions to generate drive control instructions for the vehicle 102. For example, a teleoperator may apply a steering torque to a steering wheel, a joystick, or another input device of the teleoperator station 110, or apply a force to a brake pedal, an accelerator pedal, or another input device of the teleoperator station 110. In response, the teleoperator station 110 may determine quantities such as the steering torque or a steering angle for the vehicle 102, and a brake or accelerator pedal force or a pedal position of a brake or accelerator pedal for the vehicle 102 before transmitting reference commands or instructions that are consistent with the steering torque or angle, or brake or accelerator pedal force or pedal position, to the vehicle 102.

For example, the teleoperator station 110 may transmit reference commands or instructions that represent demands consistent with the determined quantities, e.g., demands for the steering torque, the steering angle, the brake or accelerator pedal forces or the brake or accelerator pedal positions, to the vehicle 102. Alternatively, or additionally, the teleoperator station 110 may transmit reference commands or instructions that represent demands interpreted from the determined quantities, e.g., demands for drive torque, brake torque, longitudinal accelerations, longitudinal velocities, yaw angles or yaw rates, or path curvatures, to the vehicle 102.

Once the reference commands or instructions are received, the vehicle 102 may interpreted the reference commands or instructions and provide demands for steering angles or torques to a steering controller or steering system of the vehicle 102 (e.g., an electronic power-assisted steering system), or to a controller and provide demands for brake pedal or accelerator pedal forces, brake pedal or accelerator pedal positions or longitudinal accelerations or velocities to a brake controller or a power train of the vehicle 102. Additionally, the vehicle 102 may further provide demands for vehicle yaw angles, yaw rates or vehicle path curvatures to a yaw controller of the vehicle 102.

Based on the reference commands or instructions, the various components of the vehicle 102 may execute one or more actions consistent with the reference commands or instructions, as well as a drive state of the vehicle 102, and thereby cause the vehicle 102 to turn, accelerate or brake, as necessary, in order to travel or remain on a desired course or at a desired speed, subject to any prevailing traffic conditions, weather conditions, preexisting thresholds or limits, or any other factors.

Although FIG. 1 illustrates an example remote driving system 100 having a particular number, type, configuration, and arrangement of various components, other implementations may include various other numbers, types, configurations, and arrangements of the various components. For example, one or more vehicles 102 may be in communication with one or more teleoperator stations, various types of wireless communication networks may be used to facilitate communication between vehicles 102 and teleoperator stations, and/or various other modifications may be made in other implementations of the remote driving system 100.

The systems and methods of the present disclosure are directed to platoons of vehicles, at least one of which may be operated remotely, e.g., in response to commands or instructions generated by a teleoperator, and at least one of which may operate autonomously based on data captured using onboard sensors and also by the remotely operated vehicles, as well as commands or instructions generated by the teleoperator for the remotely operated vehicles. Platooning enables a single teleoperator to operate multiple vehicles effectively simultaneously. For example, vehicles operating in platoons may turn, accelerate or brake in concert with one another, or upon reaching common or similar points, thereby enabling headway between the vehicles to be reduced, fuel economy to be enhanced, traffic congestion to be reduced, and risks of collisions to be minimized. Vehicles that are configured to operate according to one or more machine learning or artificial intelligence solutions may automatically join a platoon with a remotely operated vehicle that is traveling along a common or similar route or path, or to a common or nearby destination, or depart such a platoon. While in the platoon, a lead vehicle of a platoon may rely on commands or instructions generated by a teleoperator, as well as data regarding its current drive state, and may execute actions for its operations based on the commands or instructions received the teleoperator and also data regarding its current drive state. Follower vehicles of the platoon may also rely on commands or instructions generated by the teleoperator for the lead vehicle, data regarding the drive state of the lead vehicle, and actions executed by the lead vehicle, as well as data regarding their respective drive states, in executing actions for their own respective operations.

Thus, platoons that include at least one remotely operated (e.g., teleoperated) vehicles may execute substantially fewer computing decisions, or computing decisions that are substantially less complex, than would be required if each of the vehicles of the platoons were remotely operated. Any vehicle may become a lead vehicle of a platoon at any time, or may form or join a platoon with one or more other vehicles, e.g., as a follower of such vehicles.

In some implementations, a platoon may include a single remotely operated lead vehicle, and any number of follower vehicles may be configured to operate based on instructions generated for the lead vehicle, as well as a drive state of the lead vehicle, and their own respective drive states. Alternatively, in some other implementations, a platoon may include two or more lead vehicles, and any number of follower vehicles that are configured to operate based on instructions generated for such lead vehicles and drive states of such lead vehicles, as well as their own respective drive states.

Referring to FIGS. 2A through 2L, views of aspects of one system 200 for platooning teleoperated vehicles in accordance with implementations of the present disclosure are shown. Except where otherwise noted, reference numerals preceded by the number "2" shown in FIGS. 2A through 2L indicate components or features that are similar to components or features having reference numerals preceded by the number "1" shown in FIG. 1.

Figure 2A:
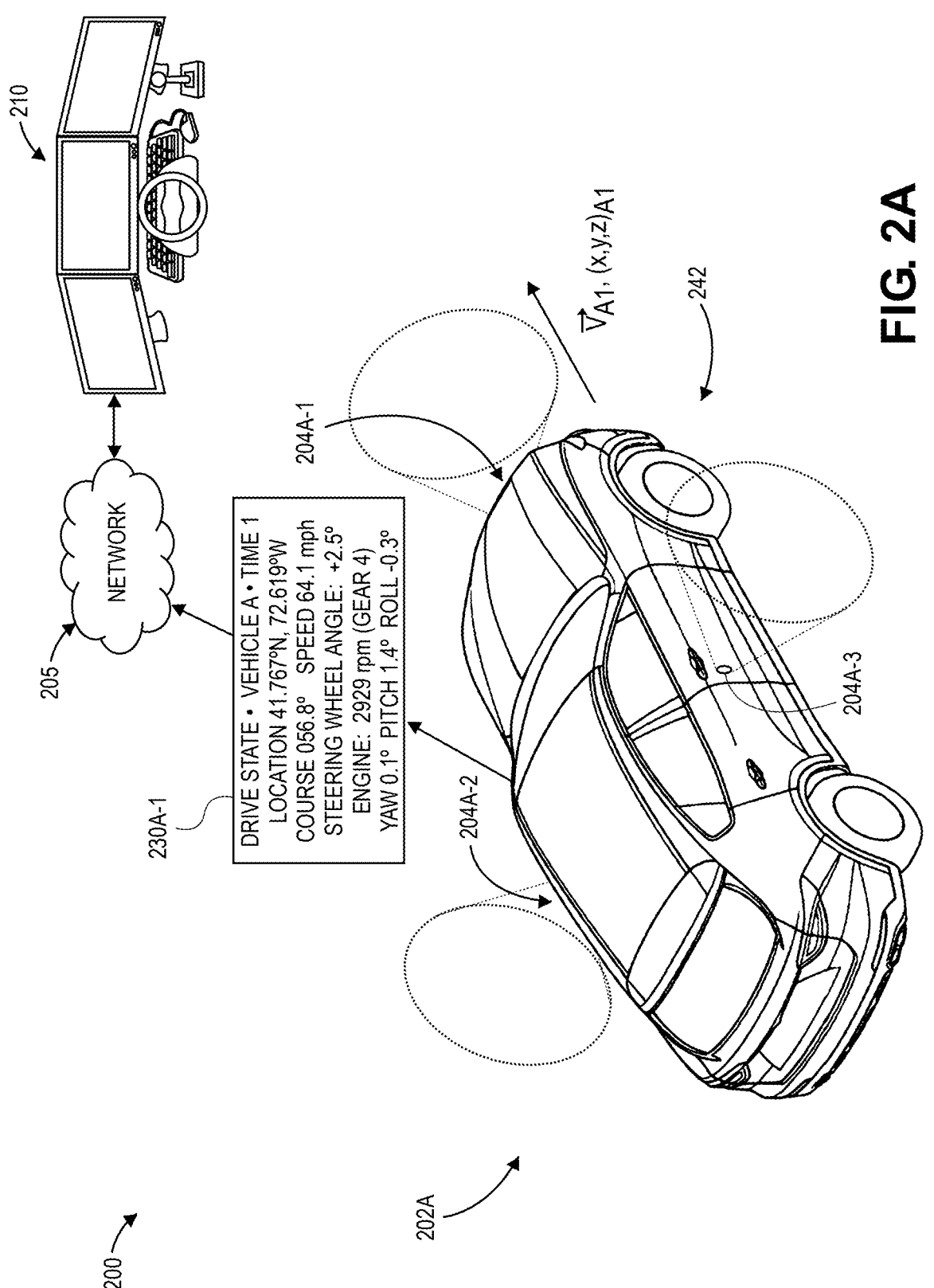
FIGS. 2A through 2L are views of aspects of one system for platooning teleoperated vehicles in accordance with implementations of the present disclosure.

As is shown in FIG. 2A, a vehicle 202A located at a position $(x, y, z)_{A1}$ travels at a velocity $V_{A1}$ under operational control of a selected teleoperator at a teleoperator station 210. The vehicle 202A may be an automobile of any type or form, e.g., a convertible, a coupe, a hatch back, a sedan, a sport-utility vehicle, a trailer, a truck, a van, or any other type or form of car. The vehicle 202A may be configured for travel on roads 242 of any capacity or rating, which may include lane widths of typically nine to twelve feet each, and surfaces formed from standard materials such as asphalt, concrete, cement, gravel, cobblestone or dirt, or any other suitable materials. For example, the roads 242 may include one or more highways (e.g., interstate highways, divided highways, or undivided highways), streets, or avenues, as well as any connecting infrastructure between such roads 242, and may be open to traffic of all types or forms, or limited to certain types or forms of traffic, e.g., personal vehicles, such as the vehicle 202A.

The vehicle 202A may include one or more onboard computer devices or systems having transceivers or other components that are in communication with the teleoperator station 210 or any number of other external computer systems over one or more wireless communications networks 205, which may include the Internet in whole or in part.

The vehicle 202A may be outfitted or equipped for both local operation by a driver (or a local operator), as well as remote operation by one or more teleoperators (or remote operators), e.g., the selected teleoperator at the teleoperator station 210. For example, the vehicle 202A may include a steering wheel and one or more pedals, e.g., an accelerator and a brake pedal, as well as any number of other controllers or components for local operation by a driver. The vehicle 202A may also include any number actuators for remotely operating the vehicle 202A, as well as one or more sensors for capturing data from an environment of the vehicle 202A, or to detect or measure drive state information of the vehicle 202A. The vehicle 202A may further include one or more interfaces for bi-directional communication between the vehicle 202A and the teleoperator station 210 or other external computer devices or systems.

For example, the vehicle 202A may also be outfitted with a plurality of cameras or other sensors, and configured to transmit information or data captured by such cameras or sensors to the teleoperator station 210 or any number of other computer devices or systems over the one or more wireless communication networks 205. As is shown in FIG. 2A, the vehicle 202A may be equipped with imaging devices 204A-1, 204A-2, 204A-3 (e.g., cameras) that are aligned to capture imaging data, e.g., visual images, depth images, or other imaging data, from fields of view surrounding the vehicle 202A. The imaging device 204A-1 is aligned to capture imaging data from a field of view extending forward of the vehicle 202A, while the imaging device 204A-2 is aligned to capture imaging data from a field of view extending from a left side (e.g., a port side) of the vehicle 202A, and the imaging device 204A-3 is aligned to capture imaging data from a field of view extending from a right side (e.g., a starboard side) of the vehicle 202.

The vehicle 202A may further include any other type or form of sensors, including but not limited to a position sensor (e.g., a Global Positioning System or "GPS" receiver), an inertial measurement unit (or "IMU") including one or more accelerometers, gyroscopes, compasses or position sensors, or any other sensors for determining positions, velocities, accelerations, or orientations along or about one or more principal axes of the vehicle 202A. The vehicle 202A may further include any number of other sensors for determining attributes or statuses of one or more components provided aboard the vehicle 202A, such as a steering angle or wheel orientation of the vehicle 202A.

As is further shown in FIG. 2A, the vehicle 202A may transmit information or data regarding a drive state 230A-1 of the vehicle 202A at a time $t_1$ to the computer system 250 over the one or more wireless communication networks 205. For example, the drive state 230A-1 may identify the position $(x, y, z)_{A1}$ of the vehicle 202A, e.g., by a latitude and longitude and, alternatively, an elevation, as well as the velocity $V_{A1}$ of the vehicle 202A, e.g., by a course and a speed. The drive state 230A-1 may further include a steering wheel angle of the vehicle 202A, a rotational speed and/or gear of an engine of the vehicle 202A, as well as a yaw angle, a pitch angle and a roll angle of the vehicle 202A. The drive state 230A-1 may also include any other information or data regarding operations of the vehicle 202A, e.g., an estimated amount of fuel remaining, an estimated time until additional fuel is required, or the like. Alternatively, or additionally, where the vehicle 202A includes a driver or other passengers within the vehicle 202A, the vehicle 202A may also transmit information or data regarding attributes of the drivers or passengers to the teleoperator station 210 or any number of other computer devices or systems over the one or more wireless communication networks 205.

Information or data regarding the drive state 230A-1 may be transmitted to the teleoperator station 210 or any other computer devices or systems over the one or more wireless communication networks 205 at any rate or frequency in accordance with implementations of the present disclosure. For example, in some implementations, such information or data may be transmitted at a frequency of ten hertz (or ten times per second), one hundred hertz (or one hundred times per second), or at any other rate or frequency. Alternatively, in some implementations, different information or data regarding the drive state 230A-1 may be transmitted at different rates or frequencies. For example, in some implementations, information or data such as positions, velocities, accelerations, steering wheel angles, or Eulerian angles may be transmitted as the information or data is calculated or determined. Other information or data may be transmitted as the information or data changes, or after a predetermined period or interval of time. Information or data regarding the drive state 230A-1 or any other information or data may be transmitted in individual sets (e.g., packets) of data, or streamed from the vehicle 202A in a continuous or substantially continuous manner.

In some implementations, the vehicle 202A may also include any number of displays or other features for rendering user interfaces that display information or data regarding the vehicle 240A, e.g., an identifier of a destination, a distance to the destination, an estimated time until the vehicle 240A is expected to arrive at the destination, or any other information or data. Such user interfaces may also include buttons or other interactive features enabling a driver or passenger of the vehicle 240A to request that the driver or passenger of the vehicle 240A take operational control of the vehicle 240A, or that a teleoperator take over operational control of the vehicle 202A from the driver or passenger, at any time. For example, in some implementations, the vehicle 202A may further include one or more microphones or other acoustic sensors (not shown), enabling a driver or passenger to directly request that a teleoperator take over operational control of the vehicle 202A by one or more express utterances, such as "please take control of my vehicle," or one or more implicit utterances such as "I'm tired," "this traffic is unbearable" or "I'm lost." Such microphones or other sensors may capture acoustic data representing the utterances, interpret the acoustic data as including a request for a takeover of operational control, and transmit information or data representing the request to the teleoperator station 210 or other external computer devices or systems over the one or more wireless communication networks 205. Conversely, in some implementations, the driver 240A may also provide one or more express utterances such as "please give me control of my vehicle," or one or more implicit utterances such as "OK, I'm ready" or "I'm back." Such microphones or other sensors may capture acoustic data representing the utterances, interpret the acoustic data as including a request to restore operational control, and transmit information or data representing the request to the teleoperator station 210 or other external computer devices or systems over the one or more wireless communication networks 205.

Figure 2B:
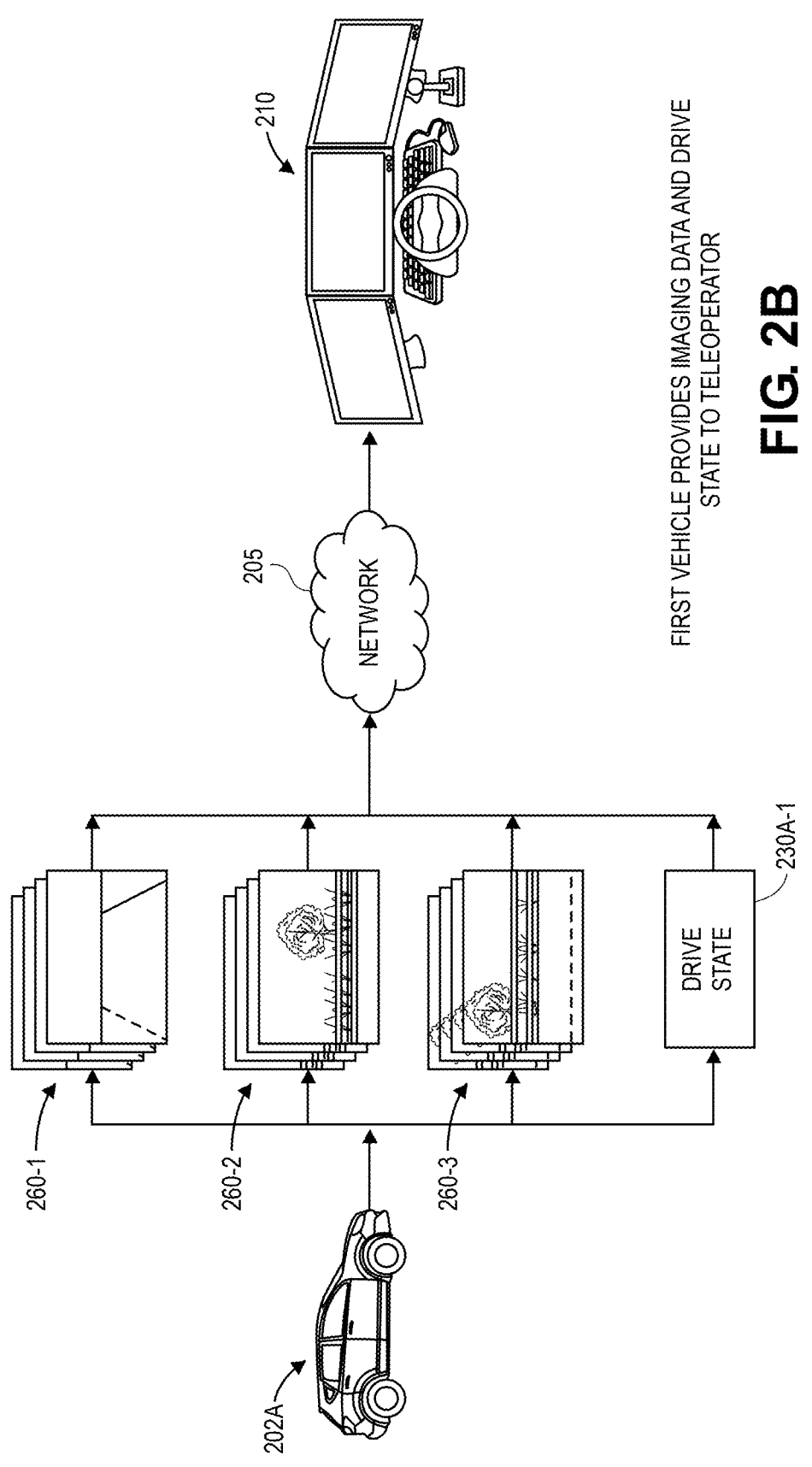

As is shown in FIG. 2B, information or data regarding the operation of the vehicle 202A may be streamed to the teleoperator station 210, e.g., by way of a channel for bi-directional communication may be established between the teleoperator station 210 and the vehicle 202A. Such information may include imaging data 260-1, 260-2, 260-3

(e.g., visual images, depth images or any other type or form of images) captured by the imaging devices 240A-1, 240A-2, 240A-3 of the vehicle 202A shown in FIG. 2A, as well as information or data regarding the drive state 230A-1 of the vehicle 202A, or any other information or data captured by any other sensors of the vehicle 202A.

Figure 2C:
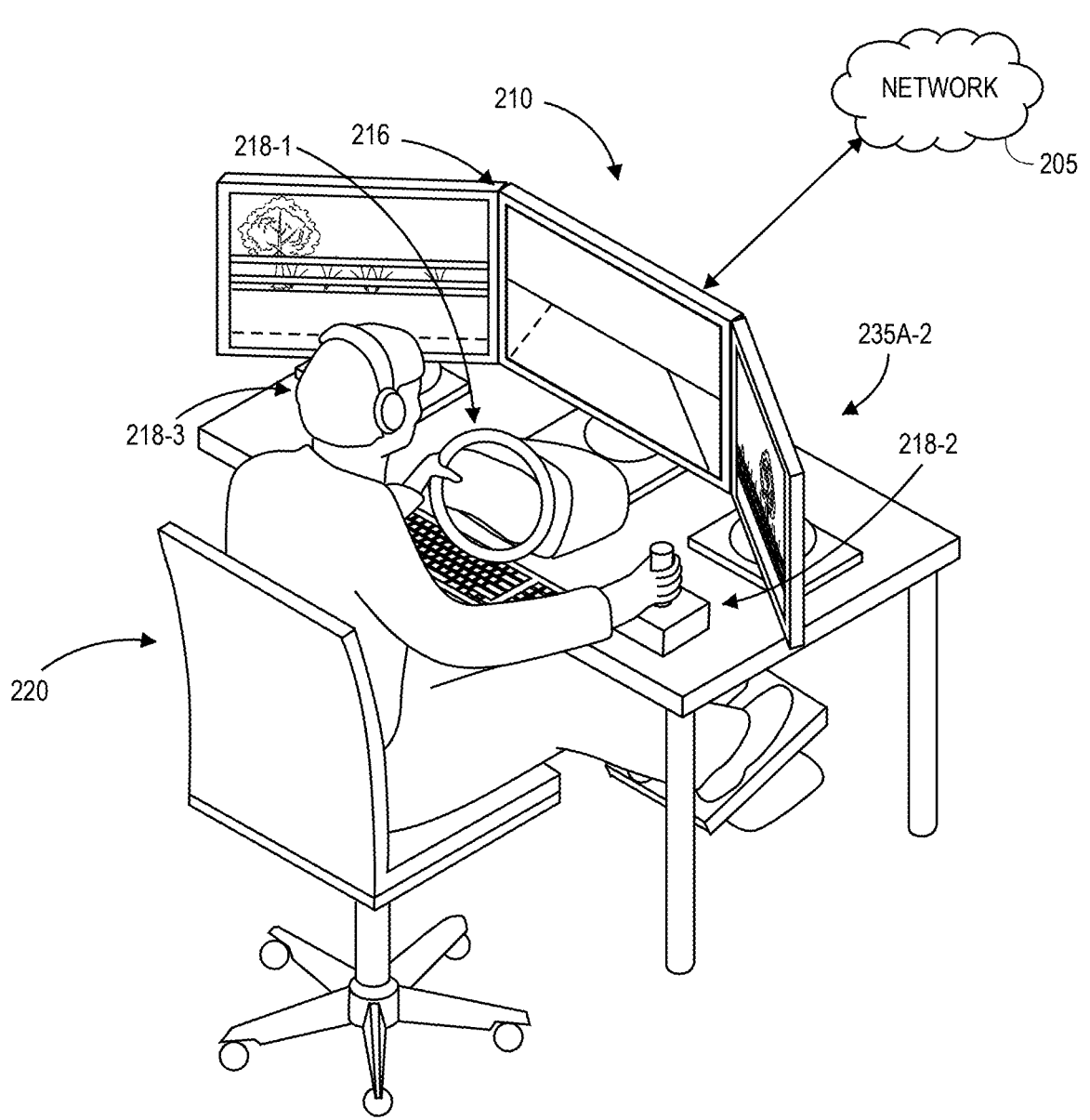

As is shown in FIG. 2C, the teleoperator station 210 may include a display having a display (or presentation) device 216 and a plurality of control components (or input/output devices) 218-1, 218-2, 218-3, e.g., a keyboard 218-1, a joystick (or another operator) 218-2 and a headset 218-3. The teleoperator station 210 enables a selected teleoperator 220 to evaluate the imaging data 260-1, 260-2, 260-3 or any other information or data received by the teleoperator station 210 from the vehicle 202A, and to make any determinations regarding an operational status or condition of the vehicle 202A based on the information or data. For example, the teleoperator station 210 may generate a video visualization based on the imaging data 260-1, 260-2, 260-3 or information regarding the drive state 230A-1 of the vehicle 202A received from the vehicle 202A, and render the video visualization on the display device 216, or cause any acoustic data received from the vehicle 202A to be played by the headset 218-3.

The teleoperator 220 may also generate one or more commands or instructions via the keyboard 218-1, the joystick 218-2 or the headset 218-3, and the teleoperator station 210 may transmit such commands or instructions to the vehicle 202A over the one or more wireless communications networks 205. For example, the teleoperator 220 may manually enter reference commands or instructions 235A-2 for the vehicle 202A using the keyboard 218-1, execute one or more gestures or other interactions to provide reference commands or instructions 235A-2 via the joystick 218-2, or utter one or more spoken words to provide reference commands or instructions 235A-2 to the headset 218-3. Alternatively, or additionally, the teleoperator 220 may generate the reference commands or instructions 235A-2 by a combination of two or more of entries via the keyboard 218-1, gestures or interactions with the joystick 218-2, or utterances of spoken words captured by the headset 218-3.

Figure 2D:
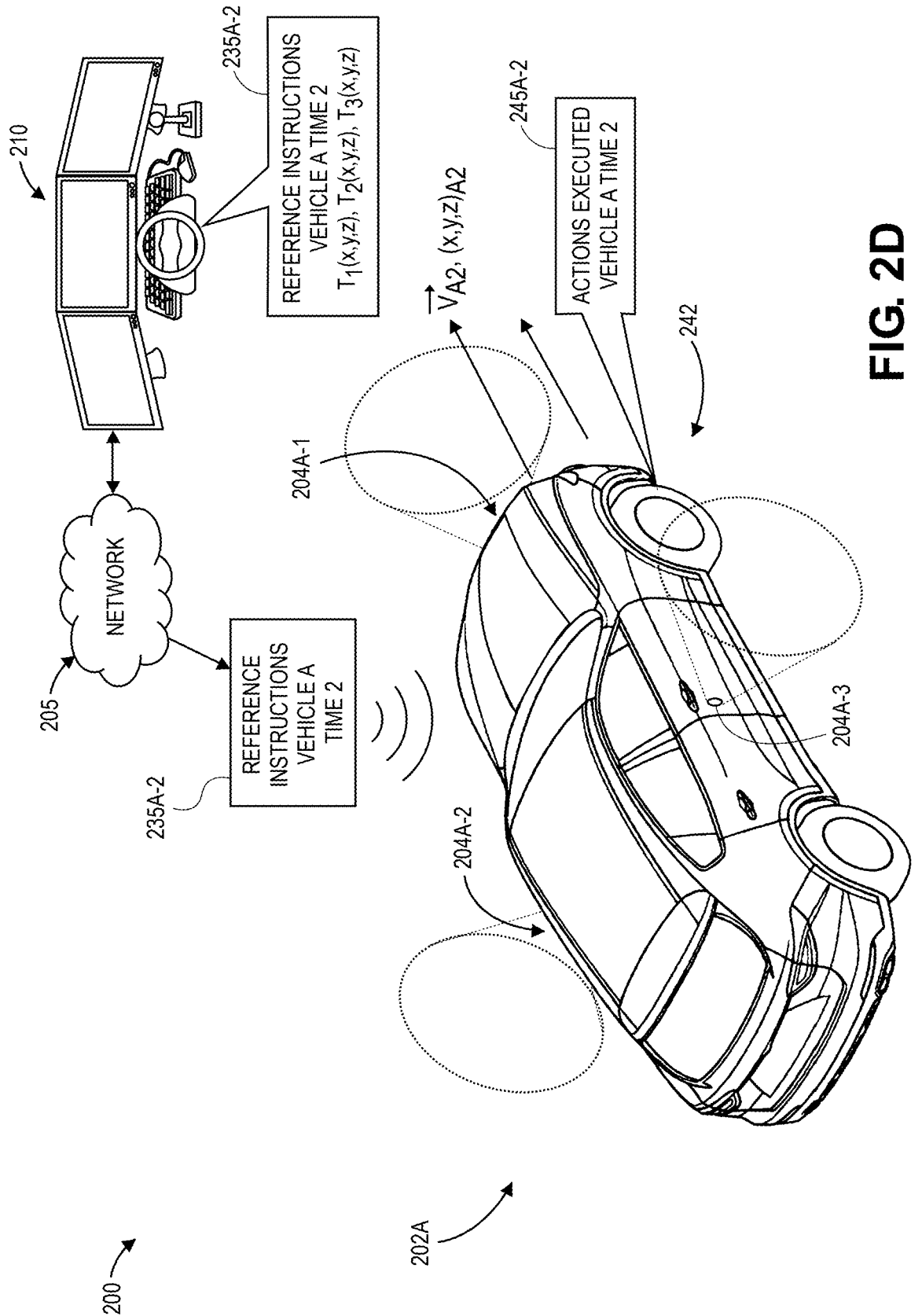

As is shown in FIG. 2D, the teleoperator station 210 may transmit information or data representing the reference commands or instructions 235A-2 at a time $t_2$ to the vehicle 202A via the wireless communications networks 205, as the vehicle 202A is located at a position $(x, y, z)_{A2}$ and travels at a velocity $V_{A2}$. In some implementations, the reference commands or instructions 235A-2 may include, but need not be limited to, information or data regarding desired steering torques, steering angles, brake or accelerator pedal forces, brake or accelerator pedal positions, drive torques, brake torques, longitudinal accelerations, longitudinal velocities, yaw angles, yaw rates, path curvatures or other aspects of operation for the vehicle 202A. In some implementations, the reference commands or instructions 235A-2 may include, but need not be limited to, coordinates or other identifiers of any number of points $T_1(x, y, z)$, $T_2(x, y, z)$, $T_3(x, y, z)$ in three-dimensional space of a trajectory that the teleoperator 220 has designated for the vehicle 202A to follow as of the time $t_2$. Alternatively, or additionally, the reference commands or instructions 235A-2 may further include any number of conditions or constraints that define parameters of operation for the vehicle 202A, including but not limited to operational constraints such as maximum or minimum speeds or accelerations of the vehicle 202A or minimum turn radii, as well as a formation geometry, which may define maximum or minimum distances or ranges to be maintained between the vehicle 202A and other vehicles or other objects.

Upon receiving the reference commands or instructions 235A-2 at the time $t_2$, the vehicle 202A may interpret the reference commands or instructions, as well as any other information or data, in identifying actions 245A-2 to be executed by the vehicle 202A. For example, where one or more of the reference commands or instructions 235A-2 indicates demands for steering angles or torques, brake pedal or accelerator pedal forces, brake pedal or accelerator pedal positions, longitudinal accelerations or velocities, yaw angles, yaw rates or vehicle path curvature, or other attributes of the operation of the vehicle 202A, one or more components of the vehicle 202A identify actions consistent with the reference commands or instructions 235A-2, as well as a drive state of the vehicle 202A. Such actions may include, but need not be limited to, turns, accelerations, brakings, or other actions that may be required to enable the travel or remain on a desired course or at a desired speed in accordance with the reference commands or instructions 235A-2, as well as a drive state of the vehicle 202A, subject to any prevailing traffic conditions, weather conditions, preexisting thresholds or limits, or any other factors.

For example, where one or more of the reference commands or instructions 235A-2 designates a speed, the vehicle 202A may identify an extent to which the vehicle 202A must speed up or slow down, as necessary, in order to cause the vehicle 202A to reach the speed, and select and execute acceleration or braking evolutions accordingly. Alternatively, or additionally, where one or more of the reference commands or instructions 235A-2 designates a course, the vehicle 202A may identify an extent to which the vehicle 202A must turn, as necessary, in order to cause the vehicle 202A to travel on the course, and select and execute steering evolutions accordingly. Where one or more of the reference commands or instructions 235A-2 designates a new destination or location along a route (e.g., a waypoint) to which the vehicle 202A must travel, or removes a requirement for the vehicle 202A to travel along the route to the location, the vehicle 202A may revise a route or a path of the route by adding or removing waypoints or destinations accordingly.

In some implementations, in addition to the reference instructions 235A-2, the teleoperator station 210 may generate and transmit one or more files, records or other sets of information or data regarding the drive state of the vehicle 202A and any other vehicles in communication with the teleoperator station 210, or other external computer devices or systems with which the teleoperator station 210 is in communication. For example, such information or data may identify positions, velocities, steering torques, angles, pedal forces or positions, drive torques, brake torques, accelerations or velocities, yaw angles or rates, path curvatures, or other features of each of such vehicles, as well as distances or ranges between such vehicles and any other vehicles or other objects during operation, or identifiers of such vehicles or other objects. Each of the vehicles that receive such information or data may interpret the information or data, along with reference instructions or drive states, in selecting and executing actions for operation in a platoon or independently.

The teleoperator 220 may maintain operational control of the vehicle 202A until the vehicle 202A arrives at an intended destination, or at any other location. Alternatively, in some implementations, a driver or passenger of the vehicle 202A may request to regain operational control over the vehicle 202A at any time, e.g., by one or more interactions with a button or another interactive features provided on a display within the vehicle 202A, or by one or more utterances of spoken or sung words, which may be captured by any microphones or other acoustic sensors provided within the vehicle 202A, and operational control over the vehicle 202A may be transferred back to the driver or passenger accordingly.

In accordance with implementations of the present disclosure, a platoon may be formed by a vehicle (e.g., a lead vehicle) under control of a remote operator (e.g., a teleoperator), and any number of other vehicles (e.g., follower vehicles) that are not under control of a local operator or a remote operator, and instead operate autonomously in a manner consistent with the vehicle under control of the remote operator. As is shown in FIG. 2E, after the vehicle 202A executed the one or more actions 245A-2, such as by varying speeds or steering angles to cause the vehicle 202A to travel in accordance with the reference commands or instructions 235A-2, e.g., along the trajectory defined by the points $T_1(x, y, z)$, $T_2(x, y, z)$, $T_3(x, y, z)$ identified in the reference commands or instructions 235A-2, the vehicle 202A reports the actions 245A-2 executed at the time $t_2$ along with information or data regarding a drive state 230A-3 of the vehicle 202A at a time $t_3$, e.g., to the teleoperator station 210 or to any other external computer devices or systems.

As is discussed above, the information or data regarding the drive state 230A-2 may identify a position of the vehicle 202A at a time $t_3$, as well as a velocity of the vehicle 202A at the time $t_2$, by reference to a course and a speed of the vehicle 202A. The information or data regarding the drive state 230A-2 may further include a steering wheel angle of the vehicle 202A, a rotational speed and/or gear of an engine of the vehicle 202A, as well as a yaw angle, a pitch angle and a roll angle of the vehicle 202A, an estimated amount of fuel remaining aboard the vehicle 202A, an estimated time until the vehicle 202A requires additional fuel, or any other information or data, as of the time $t_3$.

Figure 2E:
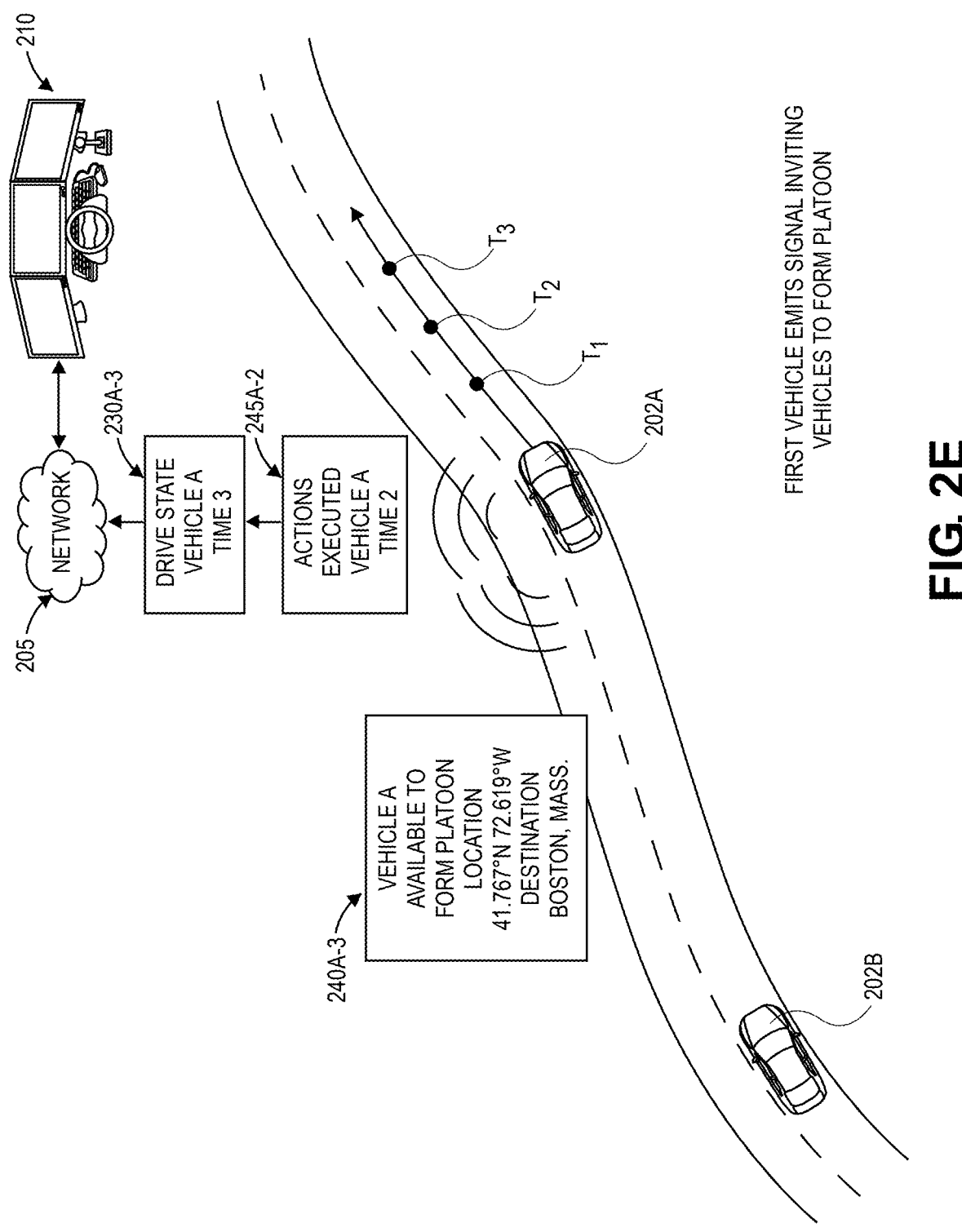

As is shown in FIG. 2E, the vehicle 202A also transmits one or more signals 240A-1 including information or data indicating a capacity or a willingness to form a platoon with any number of other vehicles, e.g., a vehicle 202B, as of the time $t_3$. For example, as is shown in FIG. 2E, the signals 240A-1 identify the position of the vehicle 202A at the time $t_3$, as well as an intended destination of the vehicle 202A. Alternatively, or additionally, the signals 240A-1 may further identify any other aspects of the operation of the vehicle 202A at the time $t_3$, such as an identifier of the teleoperator 220, or any conditions or constraints for forming a platoon with the vehicle 202A, including but not limited to distances or ranges between the vehicle 202A and any other vehicles of a platoon, speeds at which the vehicle 202A and other vehicles may travel, points through or near which the vehicle 202A intends to travel, communications systems or software provided aboard the vehicle 202A or communications protocols by which the vehicle 202A or the teleoperator station 210 may communicate. Such conditions or constraints may also include or relate to prevailing traffic conditions, weather conditions, or other factors in an area in which the vehicle 202A is operating.

Figure 2F:
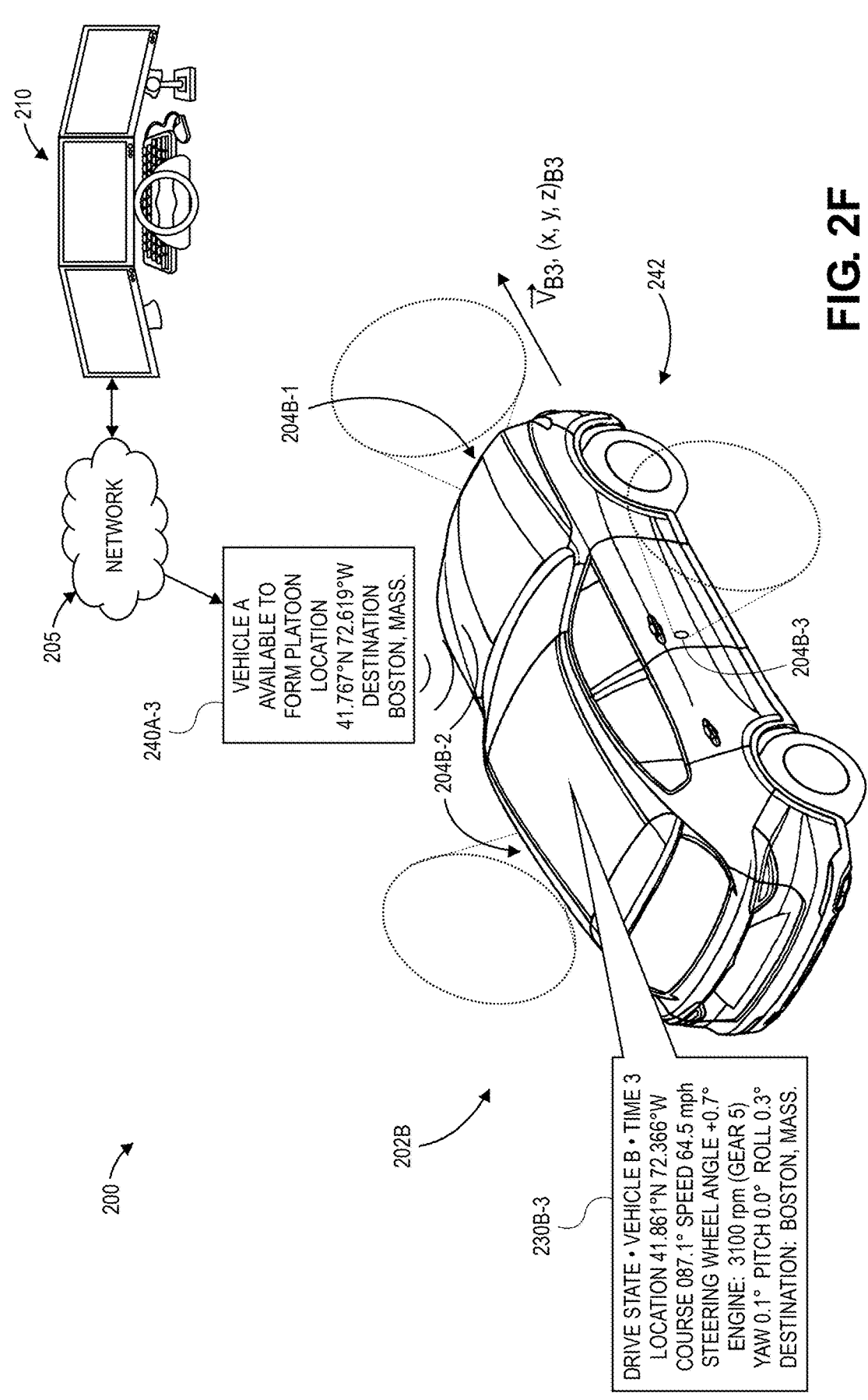

As is shown in FIG. 2F, upon receiving the signals 240A-1, the vehicle 202B, which is located at a position (x, y, z)$_{B3}$ and travels at a velocity $V_{B3}$, determines information or data regarding a drive state 230B-1 of the vehicle 202B at the time $t_3$, to determine whether forming a platoon with the vehicle 202A is feasible or favorable to the vehicle 202B.

For example, the information or data regarding the drive state 230B-1 may include the position $(x, y, z)_{B3}$ of the vehicle 202B, the velocity $V_{B3}$ (e.g., a course and a speed) of the vehicle 202B, a steering wheel angle of the vehicle 202B, a rotational speed and/or gear of an engine of the vehicle 202B, as well as a yaw angle, a pitch angle and a roll angle of the vehicle 202B at the time $t_3$. The information or data regarding the drive state 230B-1 may also include any other information or data regarding operations of the vehicle 202B, e.g., an estimated amount of fuel remaining, an estimated time until additional fuel is required, or the like. At the time $t_3$, the vehicle 202B may be operated by one or more drivers or other passengers within the vehicle 202B, or by a teleoperator other than the teleoperator 220.

Like the vehicle 202A, the vehicle 202B may also be outfitted with a plurality of cameras or other sensors, e.g., imaging devices 204B-1, 204B-2, 204B-3, a position sensor (e.g., a GPS receiver), an IMU, or any other sensors for determining positions, velocities, accelerations, or orientations of the vehicle 202B along or about one or more principal axes. Also like the vehicle 202A, the vehicle 202B may further include any number of other sensors for determining attributes or statuses of one or more components provided aboard the vehicle 202B, such as a steering angle or wheel orientation of the vehicle 202B.

The vehicle 202B may determine whether forming a platoon with the vehicle 202A is feasible or favorable to the vehicle 202B on any basis. For example, the vehicle 202B may determine that the vehicle 202A and the vehicle 202B are traveling to common or similar destinations, or at least intend to travel on common or similar paths for an extended period of time. The vehicle 202B may also determine that operating in a platoon with the vehicle 202A will enable the vehicle 202B to arrive at an intended destination or another location at or near a predetermined time. The vehicle 202B may determine that the vehicle 202B is capable of remaining within a predetermined range of the vehicle 202A, based on traffic conditions, weather conditions, lighting conditions, or any other factors. The vehicle 202B may further determine whether the vehicle 202B is capable of communicating with both the vehicle 202A and the teleoperator station 210.

Furthermore, in some implementations, when the vehicle 202B is operating under control of a local operator (e.g., a driver) or a remote operator (e.g., a teleoperator) at the time $t_3$, when the signals 240A-1 are received, the local operator or the remote operator may desire or require relief from operating the vehicle 202B, and may be interested in forming a platoon with the vehicle 202A for that reason, at least temporarily.

Figure 2G:
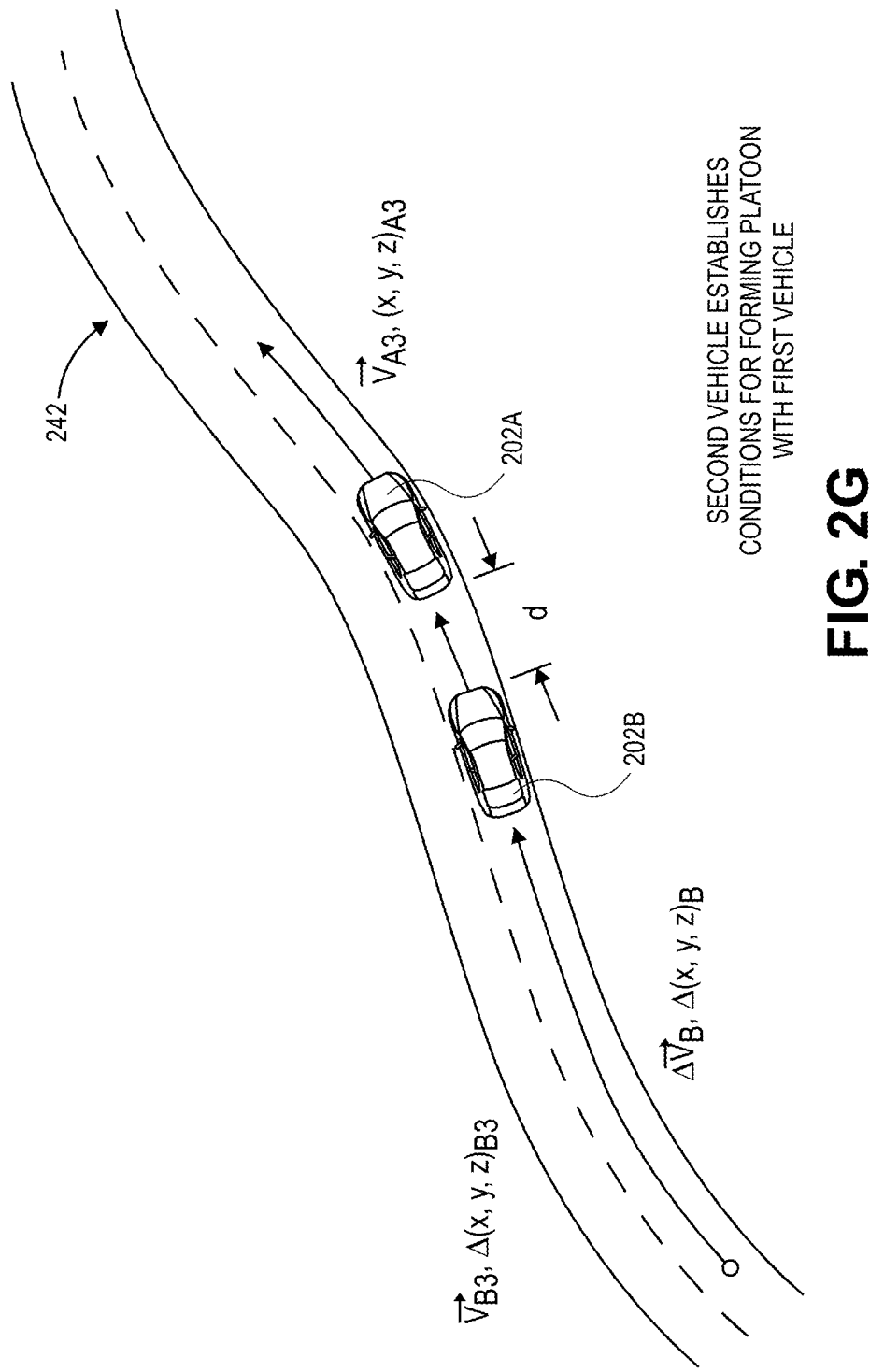

As is shown in FIG. 2G, upon determining that forming a platoon with the vehicle 202A is both feasible and favorable, an operator of the vehicle 202B (e.g., a driver or a teleoperator) may cause the vehicle 202B to travel to a selected position relative to the vehicle 202A to establish a formation geometry for the platoon. For example, the vehicle 202B may determine a change in velocity $\Delta V_B$ and position $\Delta(x, y, z)_B$ required in order to travel to a position behind, adjacent to or in front of the position $(x, y, z)_{A3}$ of the vehicle 202A, and is within a predetermined distance (or range) d of the vehicle 202A, for forming a platoon with the vehicle 202A, and may execute actions to cause the change in velocity $\Delta V_B$ and position $\Delta(x, y, z)_B$.

Figure 2H:
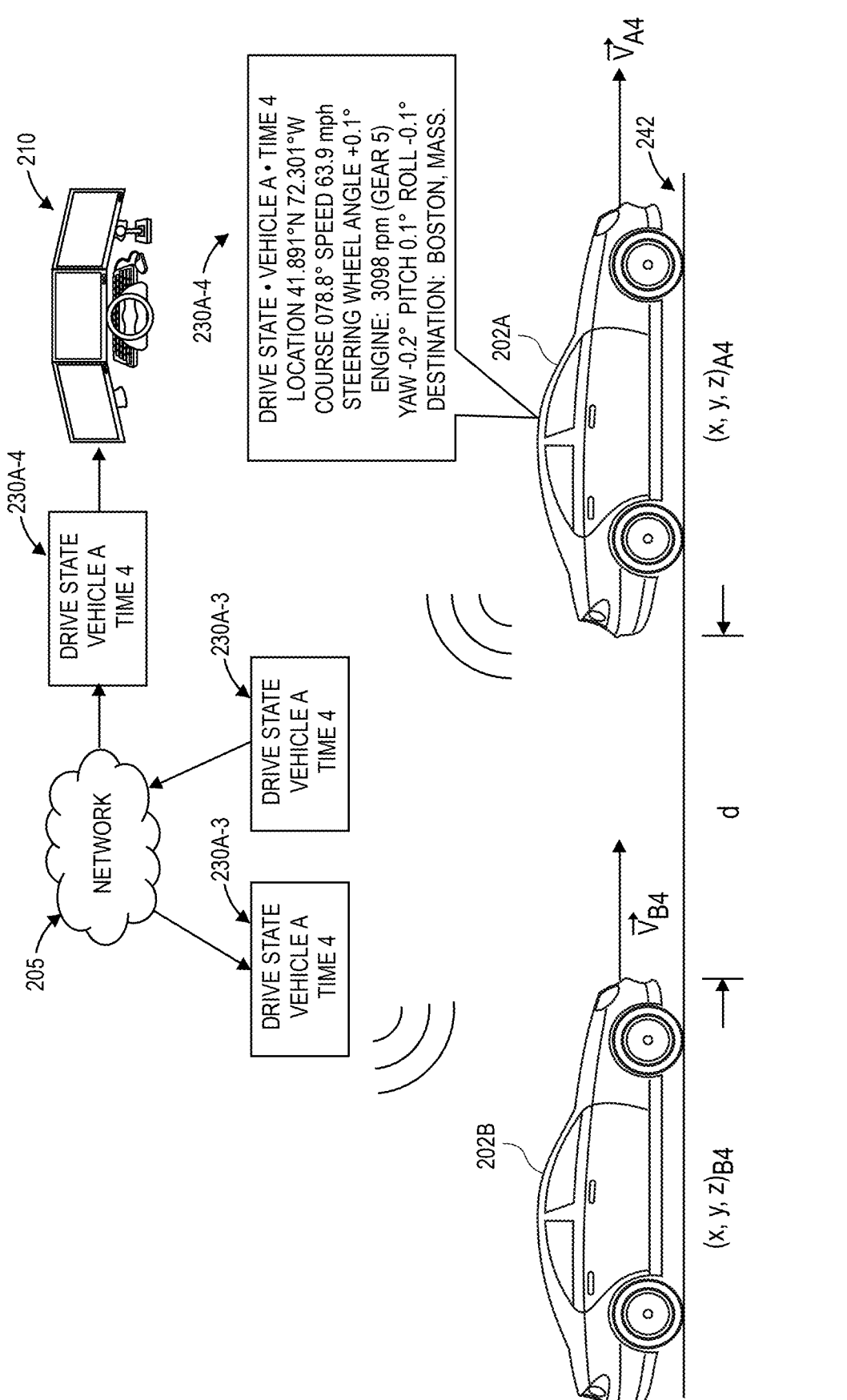

As is shown in FIG. 2H, after the vehicle 202A and the vehicle 202B form a platoon, with the vehicle 202A traveling at a velocity $V_{A4}$ and located at a position $(x, y, z)_{A4}$ at a time $t_4$, and the vehicle 202B traveling at a velocity $V_{B4}$ and located at a position $(x, y, z)_{B4}$ at the time $t_4$, the vehicle 202A continues to transmit information or data regarding a drive state 230A-4 of the vehicle 202A at the time $t_4$ to not only the teleoperator station 210 but also to the vehicle 202B over the one or more wireless communication networks 205. As is shown in FIG. 2H, the position $(x, y, z)_{A4}$ of the vehicle 202A and the position $(x, y, z)_{B4}$ of the vehicle 202B are separated approximately by the distance d. In order to maintain the separation between the vehicle 202A and the vehicle 202B substantially constant, the velocity $V_{A4}$ of the vehicle 202A and the velocity $V_{B4}$ of the vehicle 202B may be substantially similar to one another.

The information or data regarding the drive state 230A-4 may include, but need not be limited to, the position $(x, y, z)_{A4}$, the velocity $V_{A4}$, a steering wheel angle of the vehicle 202A at the time $t_4$, a rotational speed and/or gear of an engine of the vehicle 202A at the time $t_4$, Eulerian angles of the vehicle 202A at the time $t_4$, an estimated amount of fuel remaining aboard the vehicle 202A at the time $t_4$ or an estimated time until the vehicle 202A requires additional fuel at the time $t_4$, or any other information or data.

Figure 2I:
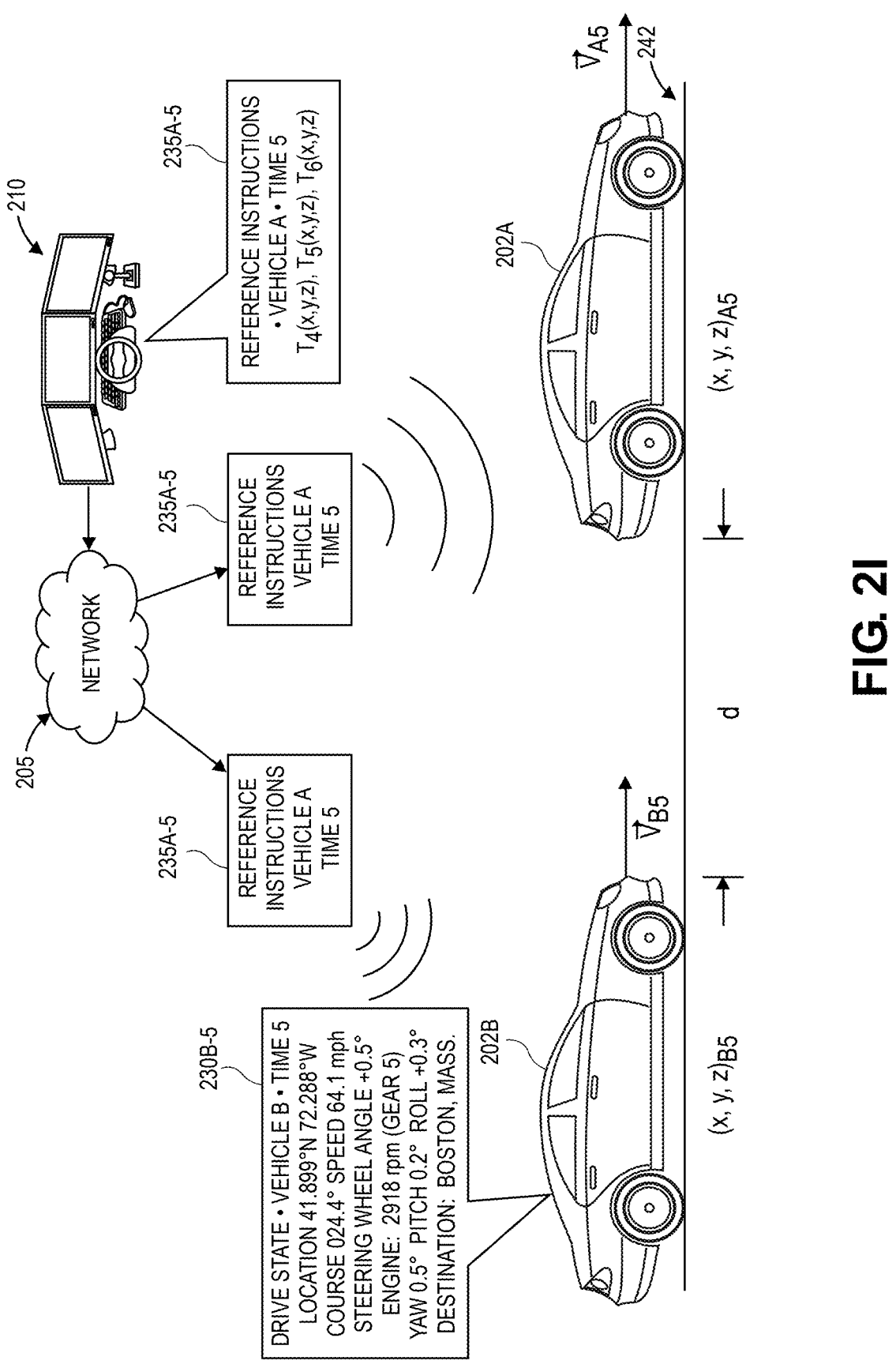

As is shown in FIG. 2I, upon receiving the information or data regarding the drive state 230A-4 of the vehicle 202A, with the vehicle 202A traveling at a velocity $V_{A5}$ and located at a position $(x, y, z)_{A5}$ at a time $t_5$, and the vehicle 202B traveling at a velocity $V_{B4}$ and located at a position $(x, y, z)_{B5}$ at the time $t_5$, the teleoperator station 210 generates and transmits reference commands or instructions 235A-5 for the vehicle 202A at the time $t_5$ to both the vehicle 202A and also the vehicle 202B over the one or more wireless communication networks 205. The reference commands or instructions 235A-5 may include, but need not be limited to, coordinates or other identifiers of any number of points $T_4(x, y, z)$, $T_5(x, y, z)$, $T_6(x, y, z)$ in three-dimensional space of a trajectory that the teleoperator 220 has designated for the vehicle 202A to follow. Alternatively, or additionally, the reference commands or instructions 235A-5 may further include any number of conditions or constraints that define parameters of operation for the vehicle 202A, including but not limited to operational constraints such as maximum or minimum speeds or accelerations of the vehicle 202A or minimum turn radii, as well as a formation geometry, which may define maximum or minimum distances or ranges to be maintained between the vehicle 202A and other vehicles or other objects.

In some implementations, the teleoperator station 210 may generate and transmit one or more files, records or other sets of information or data regarding the vehicles 202A, 202B and any other vehicles in communication with the teleoperator station 210, or other external computer devices or systems with which the teleoperator station 210 is in communication. Such information or data may identify positions, velocities, steering torques, angles, pedal forces or positions, drive torques, brake torques, accelerations or velocities, yaw angles or rates, path curvatures, or other features of each of such vehicles, as well as distances or ranges of each of the vehicles 202A, 202B, and any other vehicles or other objects during operation, or identifiers of such vehicles or other objects, and the vehicles 202A, 202B may interpret the information or data, along with reference instructions or drive states, in selecting and executing actions for operation in the platoon.

Additionally, the vehicle 202B further captures or determines information or data regarding a drive state 230B-2 of the vehicle 202B at the time $t_5$, including but not limited to the position $(x, y, z)_{B5}$, the velocity $V_{B5}$, a steering wheel angle of the vehicle 202B at the time $t_5$, a rotational speed and/or gear of an engine of the vehicle 202B at the time $t_5$, Eulerian angles of the vehicle 202B at the time $t_5$, an estimated amount of fuel remaining aboard the vehicle 202B or an estimated time until the vehicle 202B requires additional fuel at the time $t_5$, or any other information or data.

Figure 2J:
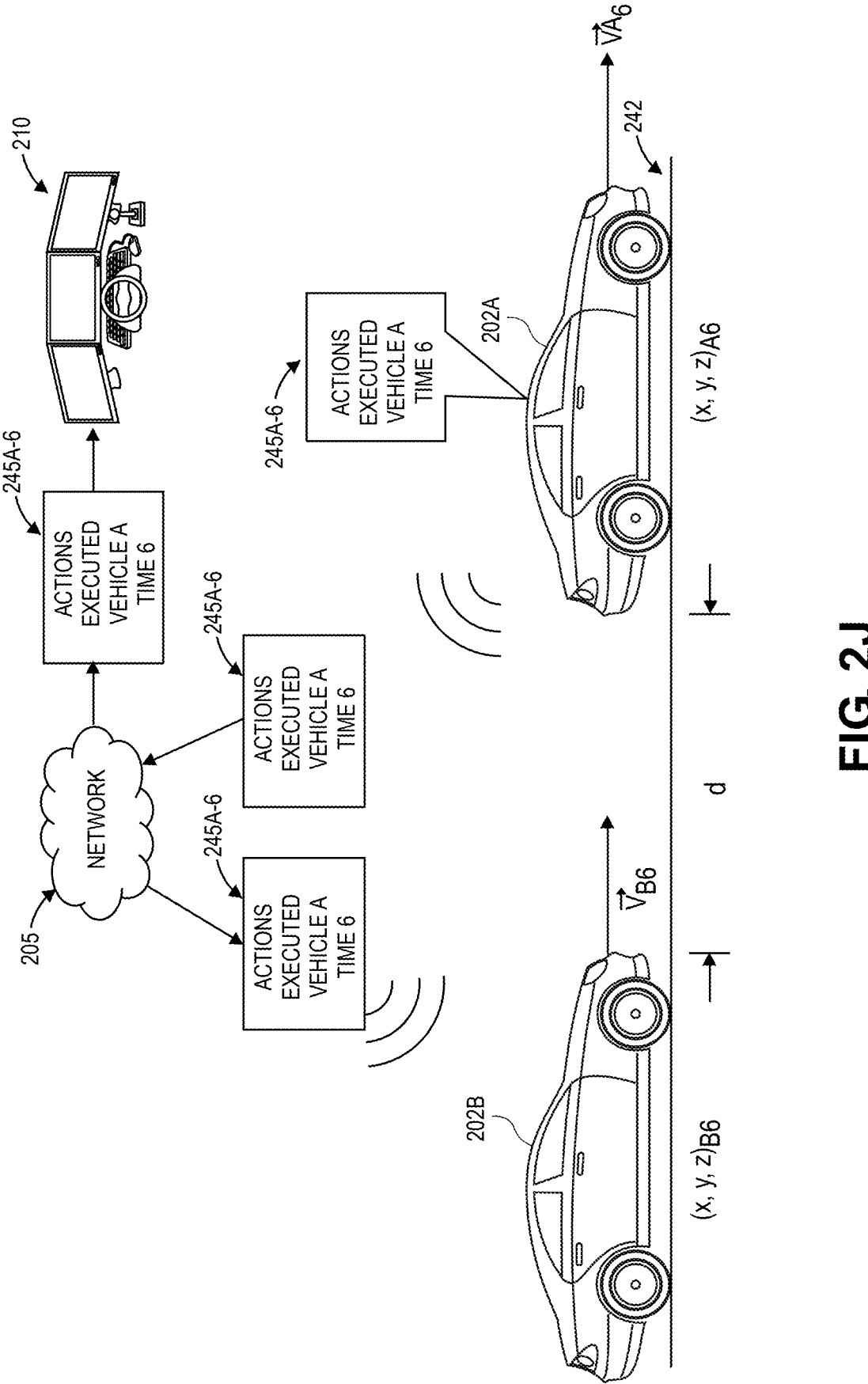

As is shown in FIG. 2J, the vehicle 202A interprets the reference commands or instructions 235A-5 received at the time $t_5$, as well as any other information or data regarding the vehicle 202A or the vehicle 202B, and identifies actions 245A-6 to be executed by the vehicle 202A, in order to cause a change in a course or a speed of the vehicle 202A, as necessary, in accordance with the reference commands or instructions. Such actions 245A-6 may include, but need not be limited to, accelerations or braking evolutions, steering evolutions, or modifying a route or a path of the route, or any other actions. Upon executing the actions 245A-6, the vehicle 202A transmits information or data regarding the actions 245A-6 to the teleoperator station 220. and the vehicle 202B.

Figure 2K:
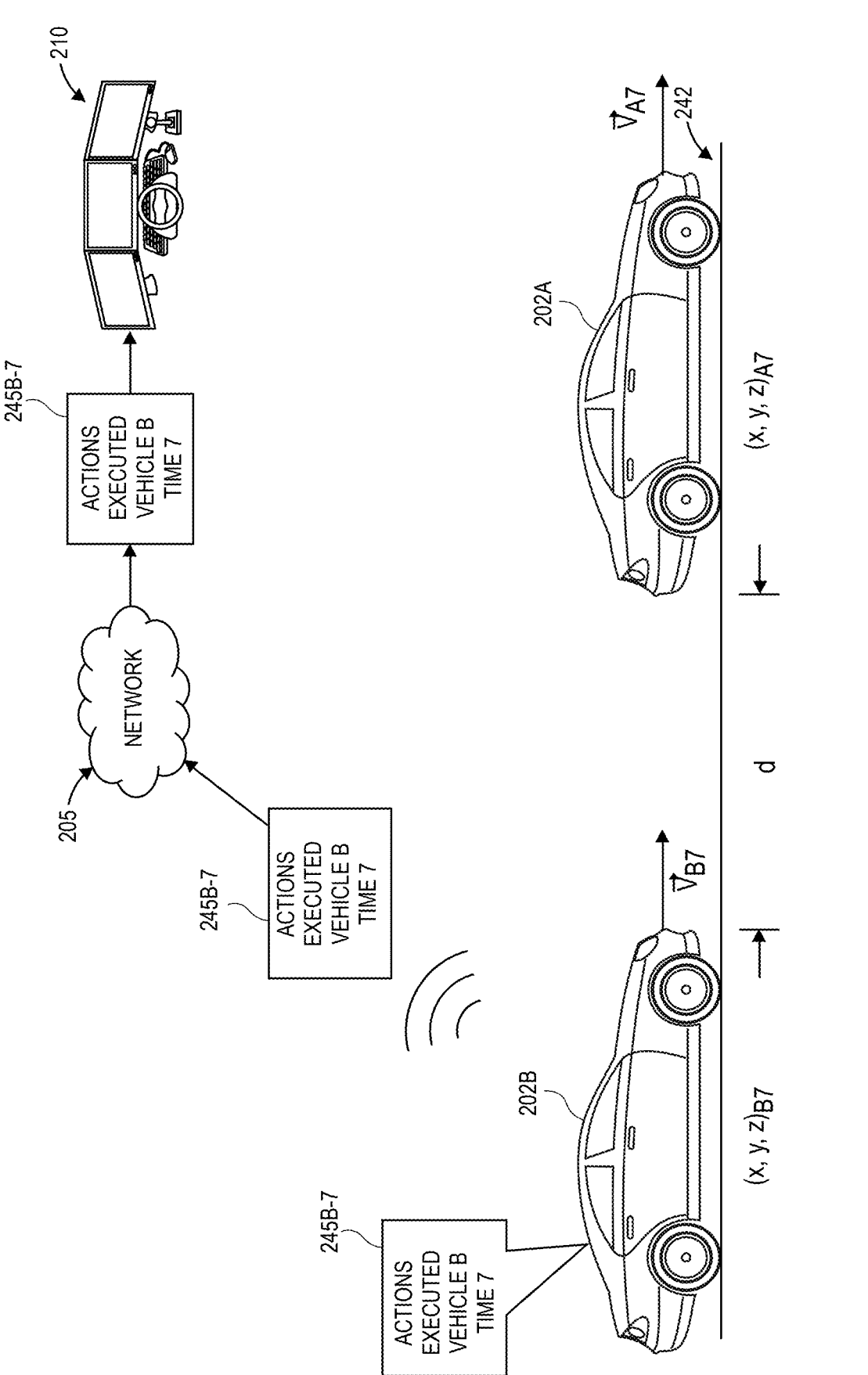

As is also shown in FIG. 2K, upon receiving the reference commands or instructions 235A-5 and the actions 245A-6 executed by the vehicle 202A at the time $t_6$, with the vehicle 202A traveling at a velocity $V_{A7}$ and located at a position (x, y, z)$_{A7}$ at a time $t_7$, and the vehicle 202B traveling at a velocity $V_{B4}$ and located at a position (x, y, z)$_{B5}$ at the time $t_5$, the vehicle 202B further derives a set of actions 245B-7 to be executed in order to cause the vehicle 202B to operate within the platoon. The actions 245A-6 may include, but need not be limited to, accelerations or braking evolutions, steering evolutions, or modifications to a route or a path of the route of the vehicle 202B, or any other actions in order to cause the vehicle 202B to travel in a manner consistent with the vehicle 202A as a member of a platoon.

Figure 2L:
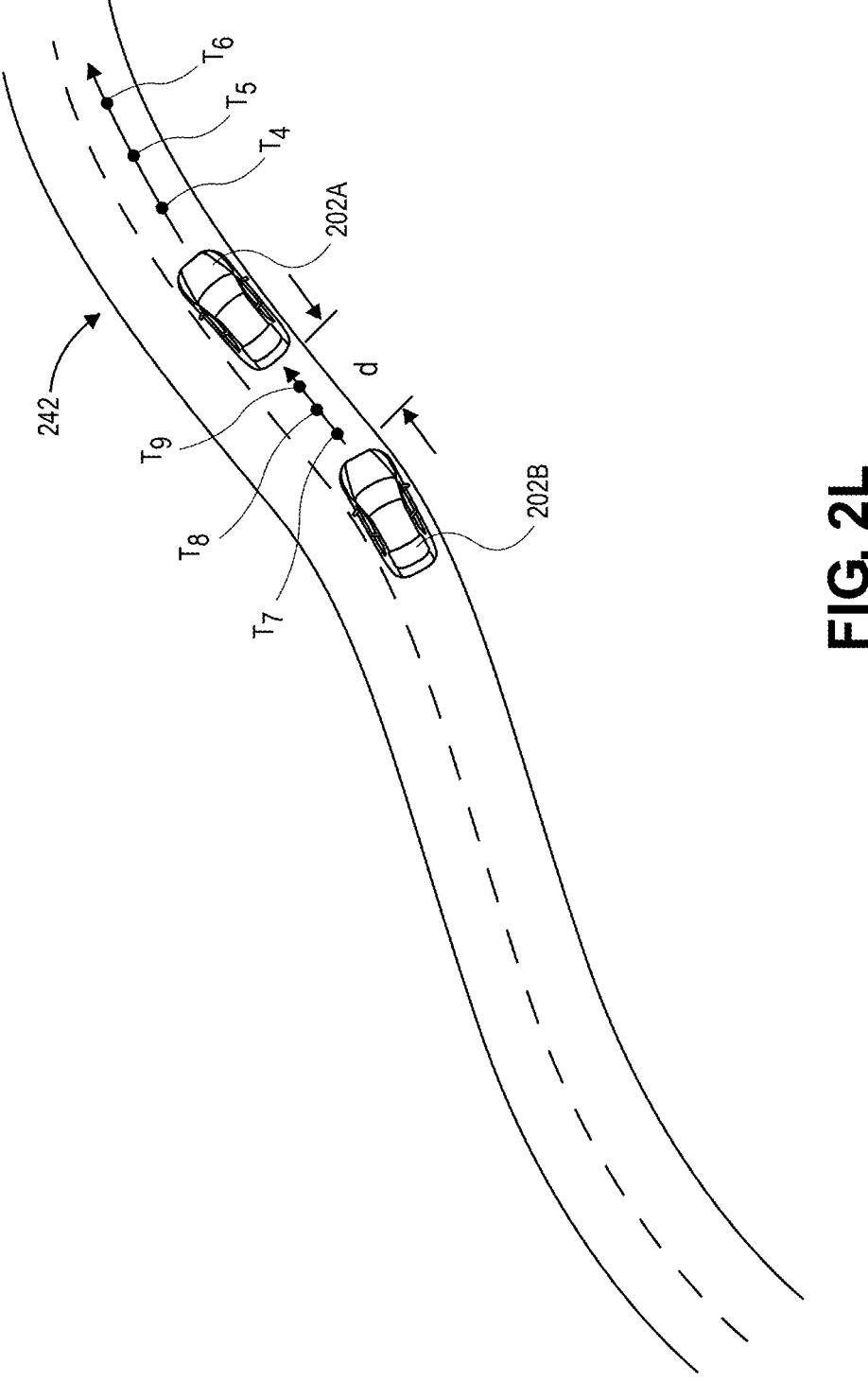

As is shown in FIG. 2L, the vehicle 202A and the vehicle 202B operate in a platoon, whereby the vehicle 202A executes the actions 245A-6 to cause the vehicle 202A to travel along points $T_4$(x, y, z), $T_5$(x, y, z), $T_6$(x, y, z) in three-dimensional space of the trajectory that the teleoperator 220 has designated for the vehicle 202A to follow, and the vehicle 202B executes the actions 245B-7 to cause the vehicle 202B to travel along points $T_7$(x, y, z), $T_8$(x, y, z), $T_9$(x, y, z) in three-dimensional space of a trajectory consistent with the trajectory followed by the vehicle 202A.

Subsequently, the vehicles 202A, 202B may continue to capture information or data regarding their respective drive states, and transmit the information or data to the teleoperator station 210 and one another. The teleoperator 220 may continue to generate reference instructions for the vehicle 202A, and transmit the reference instructions to both the vehicle 202A and the vehicle 202B. The vehicle 202A may select and execute actions to operate in a manner consistent with the reference instructions, and report such actions to the vehicle 202B and the teleoperator station 210. The vehicle 202B may then interpret the drive state of the vehicle 202A and its own drive state, as well as the reference commands or instructions and the actions executed by the vehicle 202A to operate in accordance with the reference commands or instructions, and identify actions to be executed by the vehicle 202B in order to operate in a manner consistent with the platoon. The vehicle 202A and the vehicle 202B may remain in the platoon until either the vehicle 202A or the vehicle 202B arrives at a destination, until a local operator regains control over the vehicle 202A, until a local operator or another teleoperator takes control over the vehicle 202B, or until the vehicle 202A or the vehicle 202B departs the platoon for any other reason.

Although the platoon of FIGS. 2G through 2L includes just two vehicles 202A, 202B, those of ordinary skill in the pertinent arts will recognize that a platoon may include any number of vehicles in accordance with implementations of the present disclosure. Additionally, although the follower vehicle 202B is positioned behind the lead vehicle 202A in the platoon of FIGS. 2G through 2L, those of ordinary skill in the pertinent arts will recognize that a follower vehicle of a platoon may be located in any position relative to a lead vehicle of the platoon, including but not limited to in front of or alongside the lead vehicle, and at any distance or range.

Furthermore, information or data regarding drive states of the vehicles may be captured and interpreted, and instructions may be generated based on such data or other information or data, at any rate or frequency. For example, in some implementations, drive states or other properties of vehicles may be determined at frequencies of fifty Hertz (or fifty times per second), one hundred Hertz (or one hundred times per second), or at any other rate or frequency. Thus, differences between the times $t_1$, $t_2$, $t_3$, $t_4$, $t_5$, $t_6$, $t_7$ of FIGS. 2A through 2K may be on the order of one hundredth of one second, or any other interval.

Figure 3A:
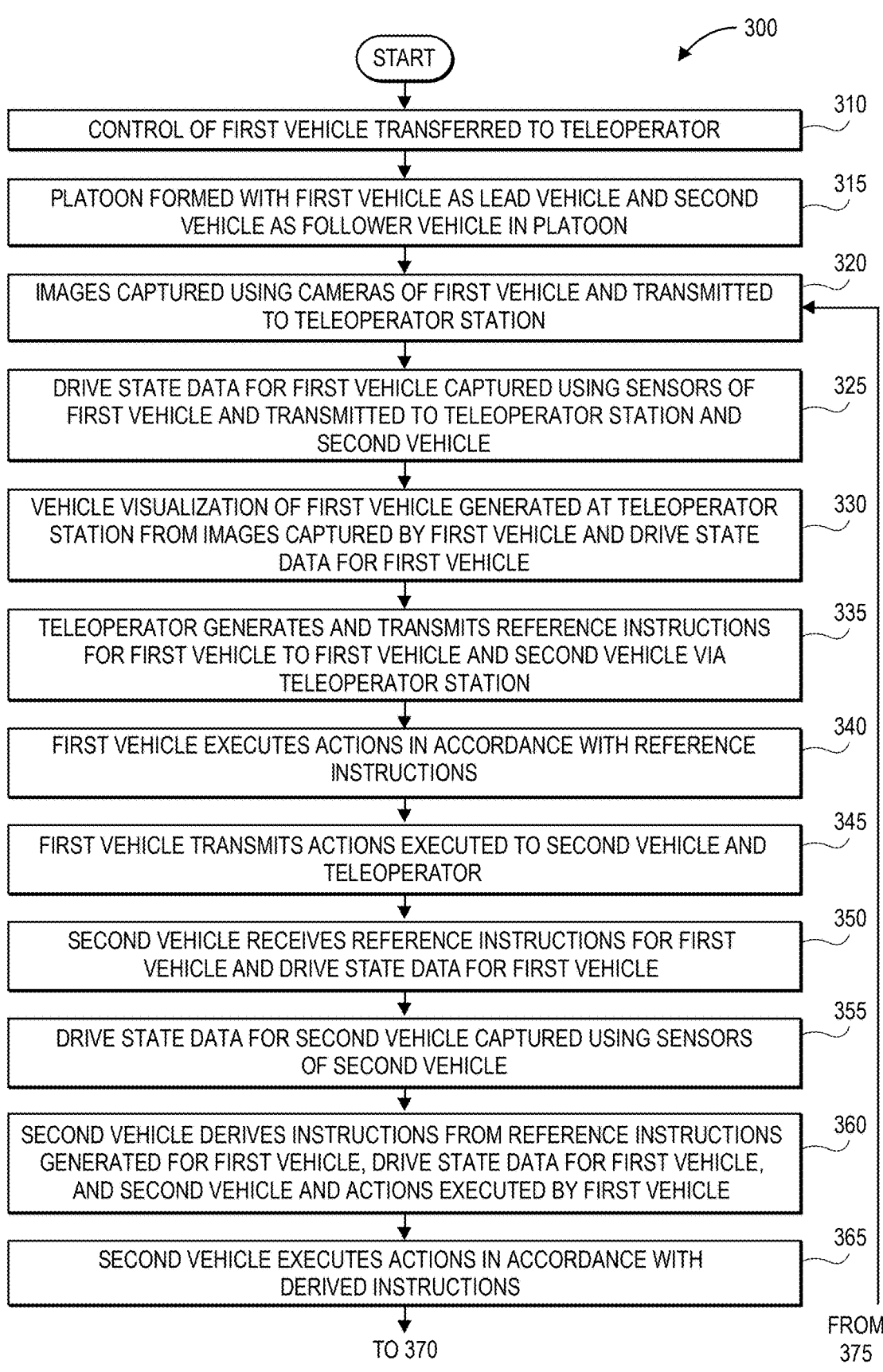
FIGS. 3A and 3B are a flow chart of one process for platooning teleoperated vehicles in accordance with implementations of the present disclosure.
Figure 3B:
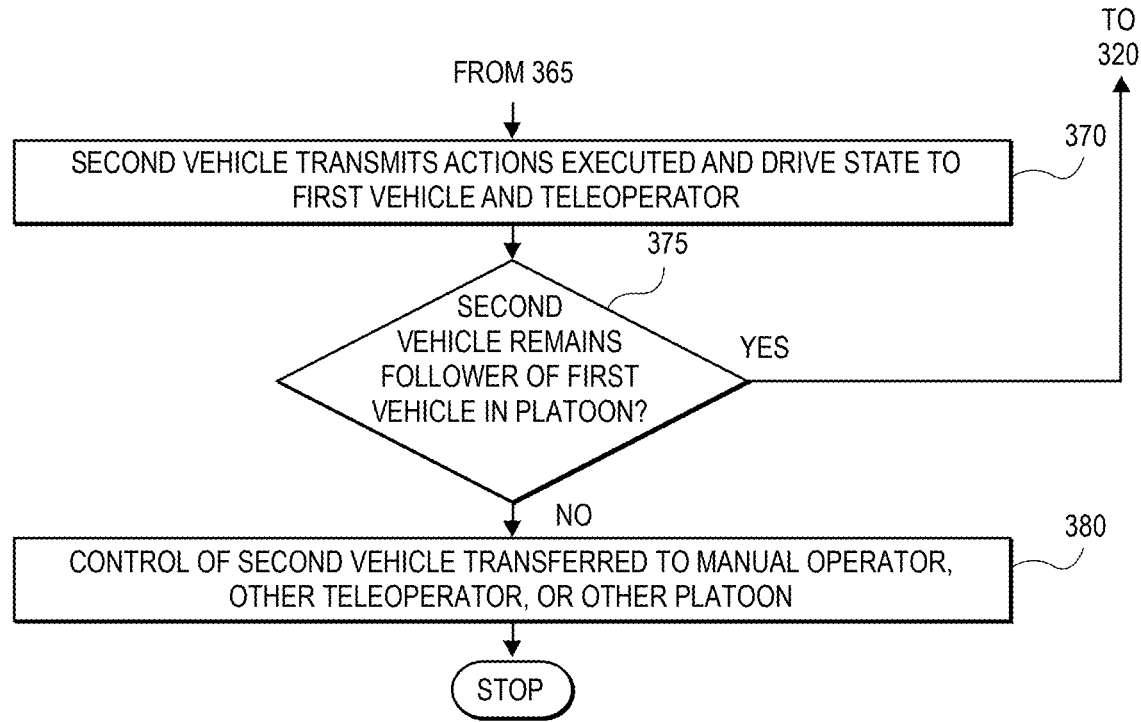

Referring to FIGS. 3A and 3B, a flow chart 300 of one process for platooning teleoperated vehicles in accordance with implementations of the present disclosure is shown. At box 310, control of a first vehicle is transferred to a teleoperator. In some implementations, the first vehicle may be a car, e.g., a powered, wheeled vehicle of any type or form that is used for transportation and may be configured for both manual and remote operation. For example, the first vehicle may include any number of actuators for remotely or locally controlling the first vehicle, as well as one or more imaging devices, cameras, or other sensors for capturing imaging data from an environment of the first vehicle, one or more sensors to detect or measure drive state information, or one or more interfaces for bi-directional communication between the first vehicle and one or more teleoperator stations or other vehicles or systems via a wireless communication network.

In some implementations, the first vehicle may be a convertible, a coupe, a hatch back, a sedan, a sport-utility vehicle, a trailer, a truck, a van, or any other type or form of car. The first vehicle may include an engine or motor along with a drive train having a transmission, one or more driveshafts, axles, wheels or other components that may be provided or contained within a body or frame of any size or shape. The first vehicle may further include any number of doors, windows, vents, or other features for providing access to the first vehicle, as well as any number of chairs or seats for accommodating humans or other animals that may be arranged in rows or columns, and a trunk or any number of compartments or other spaces for storing one or more items.

Control of the first vehicle may be transferred to the teleoperator in any manner. For example, in some implementations, a manual driver of the first vehicle may request an operational takeover of the first vehicle by the teleoperator, e.g., by one or more interactions with any number of buttons, switches or other controls, which may be or include discrete physical components of the first vehicle, or representations on a display (e.g., a touchscreen) of the first vehicle or a mobile device associated with the driver. Alternatively, or additionally, the driver may request the operational takeover by one or more spoken utterances or sounds that may be captured by any number of microphones provided in association with the first vehicle, or microphones of a mobile device or other computer system associated with the driver, and interpret such utterances or sounds to recognize the request.

In transferring control of the first vehicle to the teleoperator, one or more channels for bi-directional communication may be established between the first vehicle and a teleoperator station, e.g., over one or more wireless communication networks, which may include the Internet in whole or in part. In some implementations, where the first vehicle is outfitted with one or more actuators for remotely or locally controlling the first vehicle, such actuators may be configured to receive commands or instructions for controlling the first vehicle from the teleoperator station, and restricted or prevented from receiving commands or instructions for controlling the vehicle from the steering wheel, pedals or other controls within the first vehicle. Likewise, the first vehicle may be configured to transmit information or data captured by any imaging devices, cameras or other sensors provided aboard the first vehicle to the teleoperator station or other systems via the one or more wireless communication networks.

At box 315, a platoon is formed, including the first vehicle designated as a lead vehicle of the platoon, and a second vehicle designated as a follower vehicle in the platoon. In some implementations, upon transferring control of the first vehicle to a teleoperator, the first vehicle may emit one or more signals (e.g., messages, such as beacons) indicating that the first vehicle is configured for and capable of forming a platoon with one or more other vehicles, subject to any number of conditions or constraints. For example, such conditions or constraints may relate to distances or ranges between the first vehicle and another vehicle, connectivity, surface conditions, traffic conditions, or any other relevant factors. The second vehicle may capture the signal and confirm its eligibility to form or join a platoon with the first vehicle. Upon confirming that the second vehicle is eligible to form or join the platoon, the second vehicle, which may operate under control of a local driver or remote control by another teleoperator, may place itself under suitable conditions with respect to the first vehicle, such as by repositioning to within a predetermined distance or range of the first vehicle, and traveling on a suitable direction and at a suitable speed for joining the platoon.

Conditions or constraints subject to which the platoon is formed may include, but need not be limited to, distances or ranges between the lead vehicle and each of the respective follower vehicles, or between the follower vehicles, as well as speeds at which the lead vehicle and the respective follower vehicles are traveling or intend to travel, destinations of the lead vehicle and the respective follower vehicles, points through or near which each of the lead vehicle and the follower vehicles intends to travel, communications systems or software provided aboard the lead vehicle and the respective follower vehicles, control systems of the lead vehicle and the respective follower vehicles. Such conditions or constraints may also include or relate to prevailing traffic conditions, weather conditions, or other factors in an area in which the lead vehicle or the respective follower vehicles are located.

In some implementations, a platoon may be formed to include the first vehicle and any number of other follower vehicles, and need not be limited to including only a single follower vehicle, viz., the second vehicle. In such implementations, any number of other vehicles may receive signals emitted by the first vehicle, and place itself in suitable conditions with respect to the first vehicle for forming or joining a platoon with the first vehicle.

At box 320, images are captured using cameras of the first vehicle and transmitted to a teleoperator station operated by the teleoperator. The cameras may be aligned in any direction or orientation with respect to principal axes of the first vehicle, e.g., along or about a yaw axis, a pitch axis or a roll axis of the first vehicle, or in any other direction or orientation. The images may include one or more frames of imaging data, and may also include timestamps, time synchronization data, metadata, and/or other related data. A communication unit associated with the first vehicle may then transmit the images and any other related data to a teleoperator station of the teleoperator via a communication network.

At box 325, drive state data for the first vehicle is captured using sensors of the first vehicle and transmitted to at least the teleoperator station and the second vehicle. The drive state data for the first vehicle may include, for example, an identifier of the first vehicle, as well as indicators of a velocity (e.g., speed) or an acceleration of the first vehicle, a course (or direction) of the first vehicle, Eulerian angles of the first vehicle (e.g., a yaw angle, a pitch angle or a roll angle), a position of the first vehicle, a steering angle of the first vehicle, or any other attributes of the position, motion or orientation of the first vehicle. The drive state data may take any form or be in any format, and may further include any imaging data (e.g., images) or any other data captured by sensors provided aboard the first vehicle.

The drive state data captured by the sensors of the first vehicle may be transmitted in any manner, and according to any wireless protocols, such as any Wireless Fidelity ("Wi-Fi") or cellular (or mobile) protocol.

At box 330, a vehicle visualization is generated at the teleoperator station based on the images captured at box 320 and the drive state data for the first vehicle captured at box 325. For example, the teleoperator station may generate the visualization of the first vehicle based on the images received from the first vehicle, and any accompanying timestamps, time synchronization data, metadata, or other related data, as well as the drive state of the first vehicle, e.g., speed, acceleration, steering angle, and/or other information. The visualization may be updated continuously or at regular intervals, based on images subsequently received from the first vehicle, drive state data subsequently received from the first vehicle, or any other relevant factors. Images captured by the lead vehicle may be processed in real time or near-real time, or at any other interval or periodicity to generate the visualization. Moreover, in some implementations, the images may be processed or pre-processed in any manner and for any reason. For example, in some implementations, images may be pre-processed to address or accommodate for lighting conditions on account of positions of sources of light, such as the Sun or natural lights, as well as lighting effects pertaining to a time of day, e.g., day or night. Images may also be pre-processed or processed to remove static portions of such images, such as where a portion of the first vehicle consistently appears within a field of view of a camera, and cannot depict any foreground or background features.

In some implementations, a visualization may be generated based at least in part on map data associated with an area in which the first vehicle is operating. Such map data may include, but need not be limited to, data associated with roadways, lanes, curves, turns, distances, angles, grades, slopes, speeds, intersections, landmarks, structures, or other aspects or features associated with particular locations. Such map data may be static or dynamic, and may be updated continuously or periodically based on changes to various aspects or features at particular locations. Additionally, the map data may be stored locally, e.g., in the same physical location as the teleoperator station, or in one or more alternate or virtual locations, such as in a "cloud"-based environment.

In some implementations, a visualization may be generated based at least in part on data regarding the first vehicle, such as a type of the first vehicle, capabilities of the first vehicle, operational characteristics of the first vehicle, or other aspects or features of the first vehicle. Such aspects or features may include, but need not be limited to, a body type of the first vehicle, whether the first vehicle is driven by power to the front wheels ("front wheel drive"), the rear wheels ("rear wheel drive"), or all wheels ("all-wheel drive" or "four wheel drive"), whether the first vehicle is equipped for road or off-road operation, types of transmissions or gear trains of the first vehicle, as well as available or maximum steering angles, yaw rates, steering torques, speeds or accelerations of the first vehicle. Data regarding the first vehicle may also be stored locally, e.g., in the same physical location as the teleoperator station, or in one or more alternate or virtual locations, such as aboard the first vehicle, or in a "cloud"-based environment.

The teleoperator station may further consider any other data regarding operation of the first vehicle in generating the visualization, which may correspond to a position in three-dimensional space that may be determined or selected based on any latency and drive states of the first vehicle at times that the images were captured. For example, a position corresponding to a visualization of the first vehicle may be estimated or determined in order to accurately characterize surroundings of the first vehicle within or overlaid onto imaging data for a teleoperator at the teleoperator station. In some implementations, larger values of latency may cause a position corresponding to the visualization of the first vehicle to be located farther along a movement path or direction of the first vehicle, ahead of a position of the first vehicle at a time at which the imaging data was captured, whereas smaller values of latency may cause the position corresponding to the visualization of the first vehicle to be closer to the position of the vehicle at the time at which the imaging data was captured.

Likewise, greater speeds, accelerations, or steering angles of the drive state information may cause a position corresponding to the visualization to be farther along a movement path or direction of the vehicle, ahead of a position of the first vehicle at a time at which the imaging data was captured, whereas lesser speeds, accelerations, or steering angles of the drive state information may cause the position of the visualization to be closer to the position of the first vehicle at the time at which the imaging data was captured. Various combinations of latency and drive states may cause further changes or modifications to positions corresponding to visualizations of the first vehicle, which may also be presented with various visual characteristics, such as shapes, sizes, colors, highlights, outlines, sharpness or resolution, that may vary based on the determined latency or drive states.

Moreover, an uncertainty associated with a position corresponding to a visualization of the first vehicle may be determined based on latency or drive states, or any other factors, and visual characteristics with which the visualizations are presented, e.g., size, sharpness, focus, or resolution, may be selected based on the determined uncertainty of the estimated position. In some examples, a visualization may be enlarged or increased in size with higher levels of uncertainty and shrunken or reduced in size with lower levels of uncertainty. In other examples, a visualization may be presented with lower sharpness, focus, or resolution for higher levels of uncertainty and with greater sharpness, focus, or resolution for lower levels of uncertainty.

At box 335, the teleoperator generates a set of reference instructions (or reference commands) for the first vehicle, and transmits the reference instructions for the first vehicle to at least the first vehicle and the second vehicle. The reference instructions may correspond to points in three-dimensional space over or through which the first vehicle is intended to travel, and may be manually selected by the teleoperator for travel to an intended destination based at least in part on the visualization, as well as any traffic conditions, weather conditions, or other operational concerns. For example, the teleoperator may evaluate conditions surrounding the first vehicle based on the visualization of the first vehicle, and the teleoperator station may generate the reference instructions in response to one or more inputs received from the teleoperator via the teleoperator station. The reference instructions may include any information or data regarding the intended operation of the lead vehicle, including but not limited to demands for steering angles or torques, brake pedal or accelerator pedal forces, brake pedal or accelerator pedal positions, longitudinal accelerations or velocities, yaw angles, yaw rates or vehicle path curvature, or other attributes of the operation of the lead vehicle at various points in three-dimensional space. Moreover, in some implementations, the reference instructions may identify positions of objects within a vicinity of the lead vehicle, as well as classifications of such objects, and speeds or directions of motion of such objects where applicable.

At box 340, the first vehicle executes actions in accordance with the reference instructions. Such actions may include, but need not be limited to, turns, accelerations, brakings, or other actions that may be required to enable the travel or remain on a desired course or at a desired speed in accordance with the reference instructions, subject to any prevailing traffic conditions, weather conditions, preexisting thresholds or limits, or any other factors. For example, where the reference instructions identify a trajectory based on plurality of points in three-dimensional space, or positions of objects to be avoided, a control system or other computer system provided aboard the first vehicle may interpret the reference instructions and identify changes in speeds or steering angles that are required in order for the first vehicle to travel along the trajectory, or to avoid the objects, as well as times or locations at which the speeds or steering angles of the first vehicle should be changed. The first vehicle may then execute such changes at such times or locations to cause the first vehicle to speed up or to slow down, to turn, or to come to a stop at one or more points in three-dimensional space, as necessary.

At box 345, the first vehicle transmits information or data regarding the actions executed at box 340 to the second vehicle and to the teleoperator station. The information or data regarding the actions executed may be transmitted along with information or data regarding a drive state of the first vehicle, e.g., as updated based on the execution of the actions at box 340, or independently.

At box 345, the second vehicle receives the reference instructions for the first vehicle, the actions executed by the first vehicle, and the drive state of the first vehicle from the first vehicle or the teleoperator station, e.g., over one or more networks. In some implementations, the second vehicle may receive the reference instructions from the teleoperator station over a first network or a first protocol, e.g., over a cellular or Wi-Fi network, and may receive the drive state data for the first vehicle or the actions executed by the first vehicle over a second network or a second protocol, e.g., via Bluetooth. Alternatively, the second vehicle may receive the reference instructions, the actions and the drive state data from the first vehicle or from the teleoperator station.

At box 355, drive state data for the second vehicle is captured using sensors of the second vehicle. The drive state data captured at box 355 may be of the same type or category as the drive state data captured at box 325, or of any other type or category. For example, the drive state data for the second vehicle may include, for example, an identifier of the second vehicle, as well as indicators of a position of the second vehicle, a velocity (e.g., speed) or an acceleration of the second vehicle, a course (or direction) of the second vehicle, Eulerian angles of the second vehicle (e.g., a yaw angle, a pitch angle or a roll angle), a steering angle of the second vehicle, or any other attributes of the position, motion or orientation of the second vehicle. The drive state data may further include any other data captured by sensors provided aboard the second vehicle, including but not limited to imaging data.

At box 360, the second vehicle derives instructions from the reference instructions that were generated for the first vehicle, the drive state data for the first vehicle, the actions executed by the first vehicle and the drive state data for the second vehicle. In some implementations, a control system of the second vehicle may interpret the reference instructions, the drive state data for the first vehicle, and the actions executed by the first vehicle to select a trajectory for the second vehicle. The second vehicle may then derive or generate instructions based on the drive state data for the second vehicle captured at box 355 for causing the second vehicle to travel in accordance with the selected trajectory. For example, as is discussed above, a control system for the second vehicle may identify points in three-dimensional space of a selected trajectory, and determine information or data regarding speeds or steering angles of the second vehicle that must be established in order to cause the second vehicle to travel in a manner consistent with the selected trajectory, as well as times at which the speeds or the steering angles of the second vehicle should be changed.

At box 365, the second vehicle executes actions in accordance with the instructions derived at box 360. Thus, upon establishing the platoon with the first vehicle, and receiving the reference instructions generated for the first vehicle and the drive state data of the first vehicle, a control system associated with the second vehicle may autonomously generate instructions for causing the second vehicle to travel in a manner consistent with the platoon, without direct input from a local driver or a remote teleoperator.

At box 370, the second vehicle transmits information or data regarding the actions executed and a drive state of the second vehicle to the first vehicle and the teleoperator. In some implementations, the teleoperator station may consider any of such information or data in generating reference commands or instructions for the first vehicle, or may refine any drive state determination or position determination regarding the first vehicle based on the information or data received from the second vehicle.

At box 375, whether the second vehicle remains a follower vehicle in the platoon is determined. For example, the first vehicle or the second vehicle may have arrived at a destination, or the platoon may be disestablished or disbanded for any other reason. If the second vehicle remains a follower vehicle in the platoon, then the process returns to box 320, where images are captured again using cameras of the first vehicle and transmitted to the teleoperator station of the teleoperator. If the second vehicle is no longer a follower vehicle in the platoon, then the process advances to box 380, where control of the second vehicle is transferred to a manual operator within the second vehicle, to another teleoperator, or to another platoon, and the process ends. Control of the second vehicle may be transferred to the manual operator, to the other teleoperator or to the platoon in any manner. For example, in some implementations, a manual driver of the second vehicle or another teleoperator may request an operational takeover of the second vehicle, and the second vehicle may exit the platoon accordingly. Alternatively, the second vehicle may receive signals from one or more other vehicles in other platoons, and determine any conditions or constraints for joining such platoons from such signals, before electing to join one of such platoons.

Alternatively, or additionally, in some other implementations, the second vehicle may vehicle may be designated as a follower vehicle in another platoon. In such implementations, the process represented in the flow chart 300 of FIGS. 3A and 3B, or a similar process, may be initiated at box 315, with the second vehicle being designated as a follower of another vehicle in the other platoon. In still other implementations, where control of the second vehicle is transferred to another teleoperator, the second vehicle may be designated as a lead vehicle in another platoon, and the process represented in the flow chart 300 of FIGS. 3A and 3B, or a similar process, may be initiated.

Although the process represented in the flow chart 300 of FIGS. 3A and 3B includes only a lead vehicle, viz., the first vehicle, and a single vehicle, viz., the second vehicle, as a follower vehicle in the platoon, those of ordinary skill in the pertinent arts will recognize that a platoon may include any number of follower vehicles, and that platoons of the present disclosure are not limited to just two vehicles in number.

Referring to FIGS. 4A through 4E, views of aspects of one system for platooning teleoperated vehicles in accordance with implementations of the present disclosure in accordance with implementations of the present disclosure are shown. Except where otherwise noted, reference numerals preceded by the number "4" shown in FIGS. 4A through 4E indicate components or features that are similar to components or features having reference numerals preceded by the number "2" shown in FIGS. 2A through 2L or by the number "1" shown in FIG. 1.

Figure 4A:
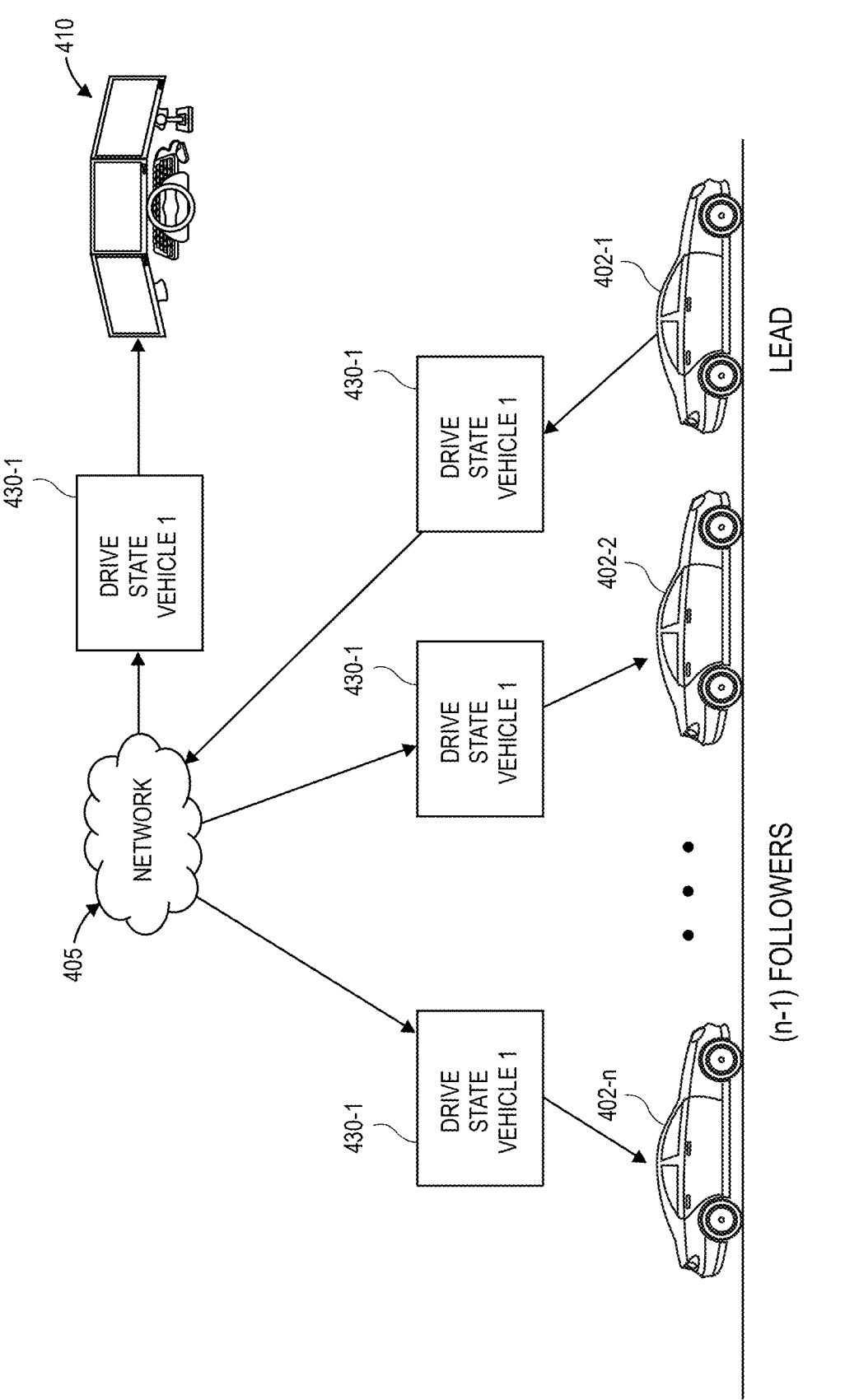
FIGS. 4A through 4E are views of aspects of one system for platooning teleoperated vehicles in accordance with implementations of the present disclosure.

As is shown in FIG. 4A, a platoon includes a plurality of n vehicles 402-1, 402-2 . . . 402-n, including a lead vehicle 402-1 and a plurality of (n–1) follower vehicles 402-2 . . . 402-n. The lead vehicle 402-1 is configured to capture images during operation of the platoon, as well as information or data regarding a drive state 430-1 of the lead vehicle 402-1, which may include, for example, an identifier of the lead vehicle 402-1, as well as indicators of a velocity (e.g., speed) or an acceleration of the lead vehicle 402-1, a course (or direction) of the lead vehicle 402-1, Eulerian angles of the lead vehicle 402-1 (e.g., a yaw angle, a pitch angle or a roll angle), a position of the lead vehicle 402-1, a steering angle of the lead vehicle 402-1, or any other attributes of the position, motion or orientation of the lead vehicle 402-1. The drive state 430-1 may take any form or be in any format, and may further include any imaging data (e.g., images) or any other data captured by sensors provided aboard the lead vehicle 402-1.

The lead vehicle 402-1 transmits the information or data regarding the drive state 430-1 to a teleoperator station 410 and to the follower vehicles 402-2 . . . 402-n of the platoon over one or more networks 405. A teleoperator may interpret information or data regarding the drive state 430-1 and view a visualization generated based on any images captured by the lead vehicle 402-1 to generate commands or instructions (e.g., reference instructions) for the lead vehicle 402-1.

The vehicles of the platoon, including but not limited to the lead vehicle 402-1 and the follower vehicles 402-2 . . . 402-*n*, may be configured to operate in any configuration, arrangement or topology in accordance with the present disclosure. In some implementations, the teleoperator station 410 may be configured to transmit information or data to each of the vehicles of the platoon. In some other implementations, however, the teleoperator station 410 may be configured to transmit information or data to the lead vehicle 402-1 of the platoon, and the lead vehicle 402-1 may be configured to share the information or data with each of the other (n–1) follower vehicles 402-2 . . . 402-*n* of the platoon. In still other implementation, the teleoperator station 410 may be configured to transmit information or data to the lead vehicle 402-1 of the platoon, and the lead vehicle 402-1 may be configured to share the information or data with a first follower vehicle, viz., the follower vehicle 402-2, of the platoon. The first follower vehicle may then be configured to share the information or data with a second follower vehicle, which may likewise be configured to continue sharing information or data in a cascading manner until the information or data has been shared with each of the vehicles of the platoon.

Moreover, the vehicles 402-1 . . . 402-*n* of the platoon may be of any type or size, e.g., convertible, a coupe, a hatch back, a sedan, a sport-utility vehicle, a tractor (with or without trailers), a truck, a van, or any other type or form of car or truck. In some implementations, the platoon may be homogenous in nature, such that each of the vehicles of the platoon is of a similar or identical type. Alternatively, the platoon may be heterogenous in nature, such that two or more of the vehicles 402-1 . . . 402-*n* of the platoon are different from one another. Furthermore, platoons may be configured to operate on highways, streets, avenues or roads of any type, and in any environment.

Figure 4B:
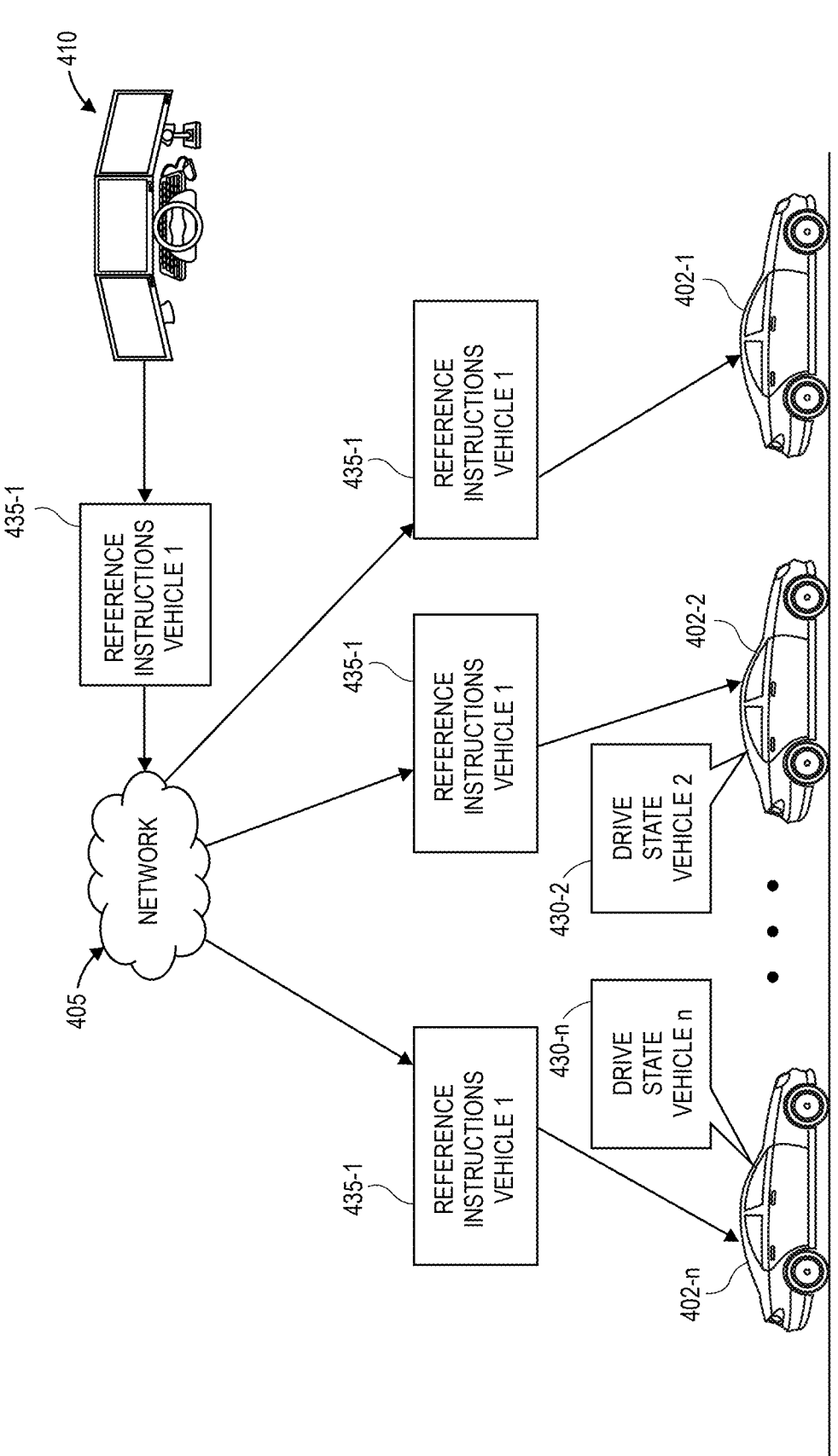

As is shown in FIG. 4B, the teleoperator station 410 transmits a set of reference instructions 435-1 generated for the lead vehicle 402-1 to both the lead vehicle 402-1 and the follower vehicles 402-2 . . . 402-*n* of the platoon over the one or more networks 405. In some implementations, the reference instructions 435-1 may identify a plurality of points in three-dimensional space through or over which the lead vehicle 402-1 is commanded or instructed to travel. Alternatively, the reference instructions 435-1 may include any other information regarding the intended operation of the lead vehicle 402-1. For example, in some implementations, the reference instructions 435-1 may represent demands for a steering torque, a steering angle, a brake or accelerator pedal force, a brake or accelerator pedal position, a drive torque, a brake torque, a longitudinal acceleration, a longitudinal velocity, a yaw angle, a yaw rate, a path curvature, or any other attribute of the intended operation of the lead vehicle 402-1.

As is further shown in FIG. 4B, each of the follower vehicles 402-2 . . . 402-*n* may also determine information or data regarding their own drive states 430-2 . . . 430-*n*. The reference instructions 435-1 may be generated based on any number or type of interactions by a teleoperator with the teleoperator station 410, as well as the information or data regarding the drive state 430-1, or any information or data regarding any drive state of any other vehicle in communication with the teleoperator station 410.

Figure 4C:
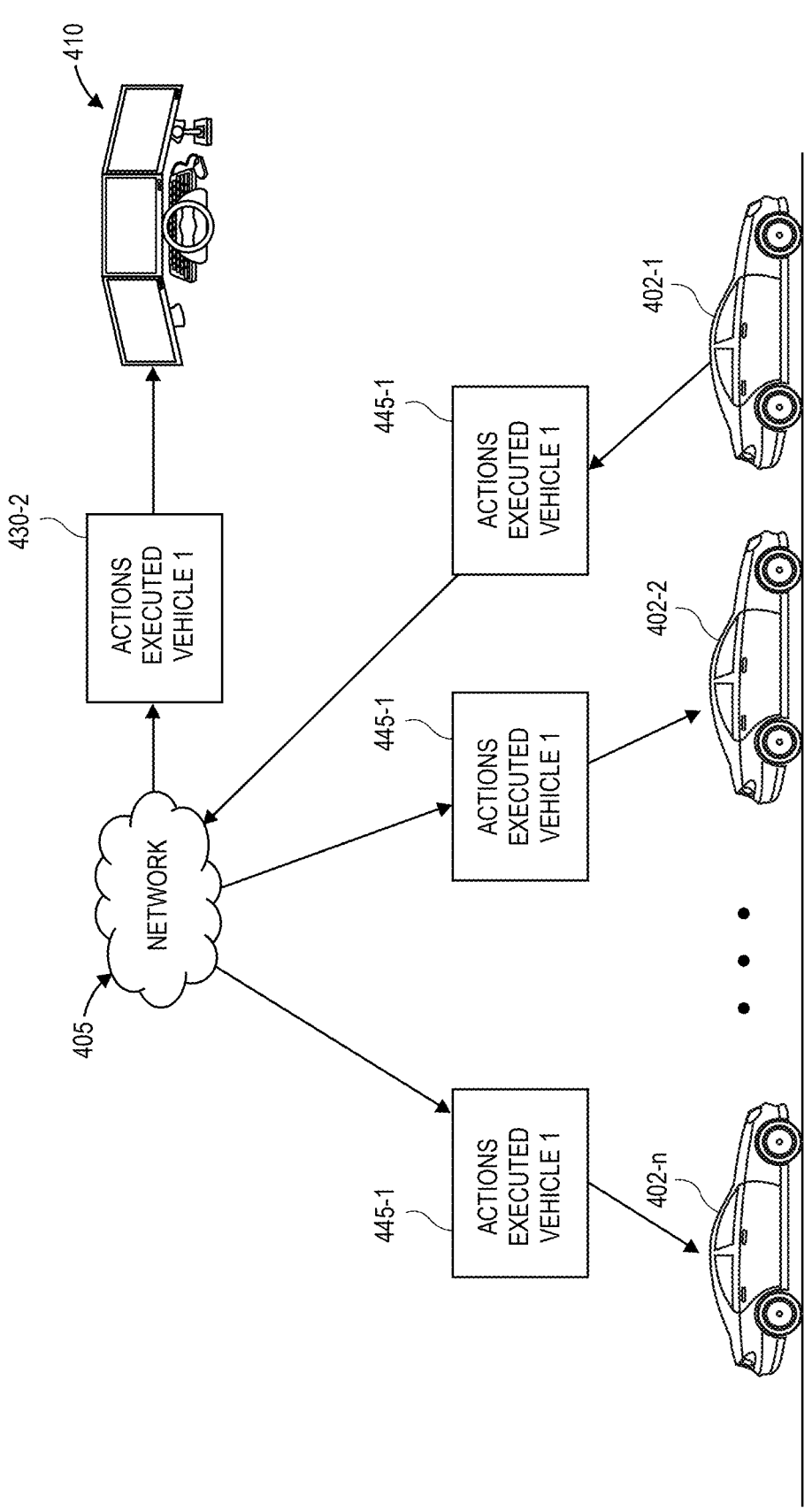

As is shown in FIG. 4C, the lead vehicle 402-1 may interpret the reference instructions 435-1, and select and execute a set of actions 430-2 to cause the lead vehicle 402-1 to operate in accordance with the reference instructions 435-1. The actions 430-2 may include one or more acceleration or braking evolutions for changing or maintaining a speed of the lead vehicle 402-1, one or more steering evolutions for changing or maintaining a course of the lead vehicle 402-1, one or more modifications to a route or a path, or any other actions. Additionally, as is further shown in FIG. 4C, the lead vehicle 402-1 may transmit information or data regarding the actions 430-2 executed in response to the reference instructions 435-1 to the teleoperator station 410 and the follower vehicles 402-2 . . . 402-*n* over the one or more networks 405.

Figure 4D:
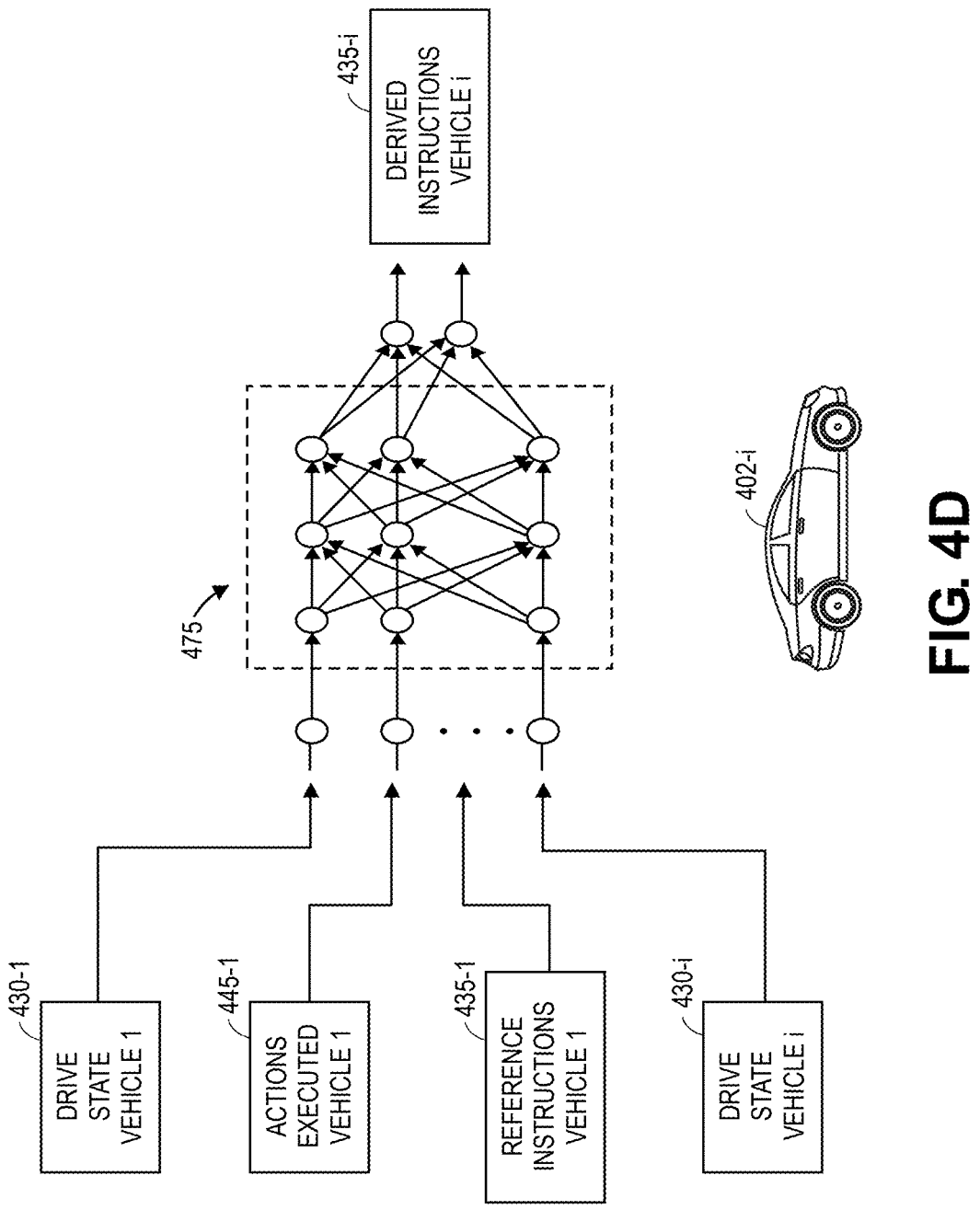

In accordance with implementations of the present disclosure, follower vehicles in a platoon may generate instructions for operating in accordance with the platoon based on reference instructions generated for a lead vehicle of the platoon, actions executed by the lead vehicle in response to the reference instructions, a drive state of the lead vehicle, and their respective drive states. As is shown in FIG. 4D, upon receiving the drive state 430-1 of the lead vehicle 402-1, the reference instructions 435-1 generated for the lead vehicle 402-1, and the actions 445-1 executed by the lead vehicle 402-1 in accordance with the reference instructions 435-1, each follower vehicle 402-*i* of the follower vehicles 402-2 . . . 402-*n* may determine its own drive state 430-*i*, and provide the drive states 430-1, 430-*i*, the actions 445-1 and the reference instructions 435-1 as inputs to a machine learning model 475 that is trained to interpret actions taken by a vehicle having a given drive state in response to instructions received from a teleoperator, and to generate actions to be taken by a follower vehicle having a given drive state. As is further shown in FIG. 4D, each follower vehicle 402-*i* of the follower vehicles 402-2 . . . 402-*n* may derive a set of instructions 435-*i* for operating within the platoon based on outputs received in response to the inputs. Upon generating the sets of instructions 435-*i*, each follower vehicle 402-*i* of the follower vehicles 402-2 . . . 402-*n* may further execute actions in response to the instructions in order to travel on desired trajectories in association with the lead vehicle 402-1. Such actions may include but need not be limited to one or more changes in speeds or steering angles that are required in order to travel along the desired trajectories, at times or locations at which the speeds or steering angles should be changed.

Figure 4E:
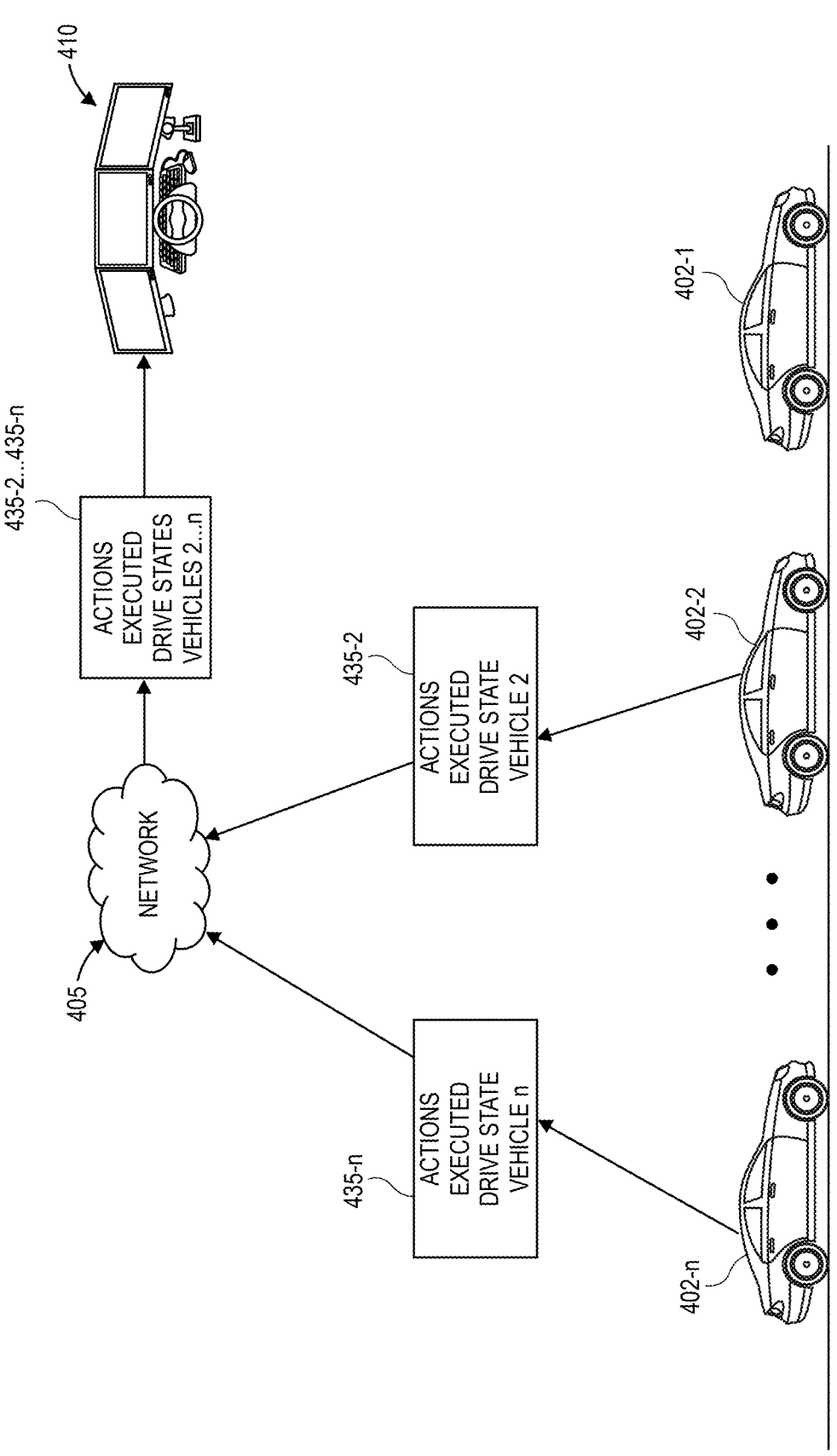

As is shown in FIG. 4E, after having executed actions in response to their respectively generated sets of instructions 435-*i*, each of the follower vehicles 402-2 . . . 402-*n* transmits information or data 435-2 . . . 435-*n* to the teleoperator station 410 representing the actions executed by the respective vehicles and their respective drive states. The teleoperator station 410 may then interpret the information or data to augment or refine drive state data received that is subsequently or concurrently received from the lead vehicle 402-1, or to generate reference instructions for the lead vehicle 402-1 accordingly.

Figure 5B:
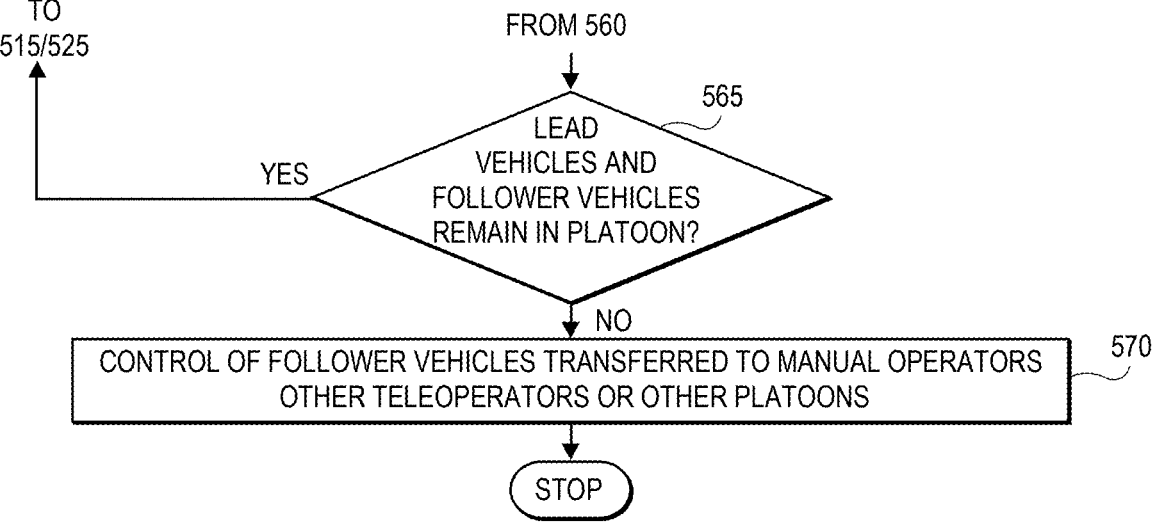

Referring to FIGS. 5A and 5B, a flow chart 500 of one process for platooning teleoperated vehicles in accordance with implementations of the present disclosure is shown. At box 510, a platoon is formed with a lead vehicle and one or more follower vehicles. In some implementations, the lead vehicle may emit one or more signals (e.g., messages, such as beacons) indicating that the lead vehicle is configured for and capable of forming a platoon, subject to any number of conditions or constraints, and any number of other vehicles that capture the signals may establish suitable conditions with respect to the lead vehicle, or operate in accordance with any constraints of the platoon, and establish the platoon with the lead vehicle. Such conditions or constraints may include, but need not be limited to, distances or ranges between the lead vehicle and each of the respective follower vehicles, or between the follower vehicles, as well as speeds at which the lead vehicle and the respective follower vehicles are traveling or intend to travel, destinations of the lead vehicle and the respective follower vehicles, points through or near which each of the lead vehicle and the follower vehicles intends to travel, communications systems or software provided aboard the lead vehicle and the respective follower vehicles, control systems of the lead vehicle and the respective follower vehicles. Such conditions or constraints may also include or relate to prevailing traffic conditions, weather conditions, or other factors in an area in which the lead vehicle or the respective follower vehicles are located. The platoon may include the lead vehicle and any number of follower vehicles, including as few as a single follower vehicle.

At box 515, the lead vehicle captures images and data using one or more onboard sensors. The lead vehicle may capture the images using cameras aligned in any direction or orientation with respect to principal axes of the lead vehicle, e.g., along or about a yaw axis, a pitch axis or a roll axis of the lead vehicle, or in any other direction or orientation. The data captured using the onboard sensors may include, for example, an identifier of the lead vehicle, as well as indicators of a velocity (e.g., speed) or an acceleration of the lead vehicle, a course (or direction) of the lead vehicle, Eulerian angles of the lead vehicle (e.g., a yaw angle, a pitch angle or a roll angle), a position of the lead vehicle, a steering angle of the lead vehicle, or any other attributes of the position, motion or orientation of the lead vehicle. Alternatively, any other types or forms of data may be captured by sensors provided aboard the lead vehicle.

At box 520, the lead vehicle transmits the images and data captured at box 515 to a teleoperator station. The images may include frames of imaging data, as well as timestamps, time synchronization data, metadata, and/or other related data regarding the images. The data may include an identifier of the lead vehicle, an indicator of a position of the lead vehicle, a velocity of the lead vehicle, Eulerian angles of the lead vehicle (e.g., a yaw angle, a pitch angle or a roll angle), a steering angle of the lead vehicle, or any other attributes of the lead vehicle. The data may also include identifiers of positions of detected objects, which may include vehicles or any other nearby stationary or mobile objects such as buildings, curbs, fences, fire hydrants, guardrails, mailboxes, signs, trees or other natural plant life, utility systems, walls or other objects. The data may also identify sizes, shapes or dimensions of the objects, or any other data. In some implementations, the data may also include classifications of detected objects, as well as confidence scores or levels associated with such classifications. The lead vehicle may include one or more transceivers or other communication units that may then transmit the images and any other related data to the teleoperator station of the teleoperator via a communication network, e.g., over a cellular or Wi-Fi network.

In parallel, at box 525, the follower vehicles capture data using one or more onboard sensors. The data captured at box 525 may be of the same type or category as the data captured at box 515, or of any other type or category. For example, the data captured by the follower vehicles may include, for example, identifiers of the respective vehicles, as well as indicators of velocities (e.g., speed) or accelerations of the vehicles, courses (or directions) of the vehicles, Eulerian angles of the vehicles (e.g., a yaw angle, a pitch angle or a roll angle), positions of the vehicles, steering angles of the vehicles, or any other attributes of the position, motion or orientation of the vehicles. The data captured by the follower vehicles may further include any other data captured by sensors provided aboard the vehicles, including but not limited to imaging data. For example, data captured by the follower vehicles may include identifiers of locations of objects detected by any of such vehicles, as well as sizes, shapes or dimensions of the objects, or any other data, including but not limited to classifications of detected objects, and confidence scores or levels associated with such classifications.

At box 530, the follower vehicles transmit the data captured at box 520 to the teleoperator station. The follower vehicles may transmit the data captured by the sensors of the follower vehicles in any manner, and according to any wireless protocols, such as any Wi-Fi or cellular (or mobile) protocol.

At box 535, the teleoperator station estimates a drive state of the lead vehicle based on the images captured by the lead vehicle and the data captured by the lead vehicle and the follower vehicles. For example, where the data captured by the lead vehicle and each of the follower vehicles includes estimates of the velocities, accelerations, courses, orientations, positions, or other attributes of the respective vehicles, the data captured by each of the vehicles may be aggregated to determine a refined estimate of a drive state of the lead vehicle. The teleoperator station may process the data and the images to obtain a more accurate estimate of a drive state of the lead vehicle, including not only accelerations, longitudinal velocities, yaw angles or yaw rates, or path curvatures of the lead vehicle but also a more complete account of an environment in which the lead vehicle operates than may have been determined using the images or data captured by the lead vehicle alone. In some implementations, where the lead vehicle and one or more of the follower vehicles have detected objects based on imaging data or other data captured by other sensors, and reported locations of the detected objects, the teleoperator station may determine whether any of the detections of objects by the respective vehicles may be correlated with one another, e.g., by determining that detections correspond to the same object, and refining any estimates or determinations of positions or velocities of such objects based on data captured by multiple vehicles. Similarly, the teleoperator station may rely upon data captured by the multiple vehicles when classifying detected objects, in order to increase a level of confidence in a detected classification.

At box 540, the teleoperator generates reference instructions for the lead vehicle via the teleoperator station based on the estimated drive state of the lead vehicle. The reference instructions (or reference commands) may correspond to points in three-dimensional space over or through which the lead vehicle is intended to travel, and may be manually selected by the teleoperator for travel to an intended destination based at least in part on the visualization, as well as any traffic conditions, weather conditions, or other operational concerns. For example, the teleoperator may evaluate conditions surrounding the lead vehicle based on a vehicle visualization that may be updated continuously or at regular intervals, based on images subsequently received from the lead vehicle, drive state data subsequently received from the lead vehicle, or any other relevant factors, e.g., map data, or any other information or data The teleoperator station may generate the reference instructions in response to one or more inputs received from the teleoperator via the teleoperator station.

The reference instructions may include any information or data regarding the intended operation of the lead vehicle, including but not limited to demands for steering angles or torques, brake pedal or accelerator pedal forces, brake pedal or accelerator pedal positions, longitudinal accelerations or velocities, yaw angles, yaw rates or vehicle path curvature, or other attributes of the operation of the lead vehicle at various points in three-dimensional space. Moreover, in some implementations, the reference instructions may identify positions of objects within a vicinity of the lead vehicle, as well as classifications of such objects, and speeds or directions of motion of such objects where applicable.

At box 545, the teleoperator station transmits the reference instructions generated for the lead vehicle and the data representing the drive state of the lead vehicle to the vehicles of the platoon, including not only the lead vehicle but also each of the follower vehicles. Alternatively, the teleoperator station may transmit the reference instructions generated at box 540 to the lead vehicle, or to one or more of the follower vehicles, and the lead vehicle or the follower vehicles may transmit the reference instruction to other follower vehicles.

At box 550, the lead vehicle executes actions consistent with the reference instructions. For example, where the reference instructions identify a trajectory based on plurality of points in three-dimensional space, or positions of objects to be avoided, a control system or other computer system provided aboard the lead vehicle may interpret the reference instructions and identify changes in speeds or steering angles that are required in order for the lead vehicle to travel along the trajectory, or to avoid the positions of the objects, as well as times or locations at which the speeds or steering angles of the first vehicle should be changed. The lead vehicle may then execute actions required to cause the lead vehicle to speed up or to slow down, to turn, or to come to a stop at one or more points in three-dimensional space, as necessary.

At box 555, each of the follower vehicles derives instructions from the reference instructions generated for the lead vehicle, the data representing the estimated drive state of the lead vehicle, and the data captured by their respective onboard sensors. In some implementations, the follower vehicles may receive the reference instructions from the teleoperator station, and the data representing the drive state of the lead vehicle, and interpret the reference instructions and the data, along with data captured by their own onboard sensors, to derive instructions for traveling on a desired trajectory, or to avoid positions of objects, e.g., changes in speeds or steering angles that are required in order to travel along the trajectory or to avoid the positions, as well as times or locations at which the speeds or steering angles should be changed. Thus, guided by a drive state of the lead vehicle, and aided by inputs generated by a remote operator for the lead vehicle, autonomous operation of the second vehicle may be enhanced accordingly.

At box 560, the follower vehicles execute actions in accordance with their respectively derived instructions. For example, the respective follower vehicles may execute the instructions derived at box 555 to speed up or to slow down, to turn, or to come to a stop at one or more points in three-dimensional space, or to take any other action in furtherance of the instructions, as necessary.

At box 565, whether the lead vehicle and the follower vehicles remain in the platoon is determined. If the lead vehicle and the follower vehicles remain in the platoon, then the process returns to box 515, where the lead vehicle captures images and data using one or more onboard sensors, and to box 525, where the follower vehicles capture data using one or more onboard sensors. If the lead vehicle and the follower vehicles are no longer in the platoon, however, then the process advances to box 570, where control of the follower vehicles is transferred to respective manual operators, to one or more teleoperators, or to other platoons, and the process ends.

As is discussed above, predictions or estimations of a drive state of a lead vehicle of a platoon may be enhanced based on data captured not only by the lead vehicle but also by the follower vehicles of the platoon. Referring to FIGS. 6A through 6G, views of aspects of one system for platooning teleoperated vehicles in accordance with implementations of the present disclosure in accordance with implementations of the present disclosure are shown. Except where otherwise noted, reference numerals preceded by the number "6" shown in FIGS. 6A through 6D indicate components or features that are similar to components or features having reference numerals preceded by the number "4" shown in FIGS. 4A through 4E, by the number "2" shown in FIGS. 2A through 2L or by the number "1" shown in FIG. 1.

Figure 6A:
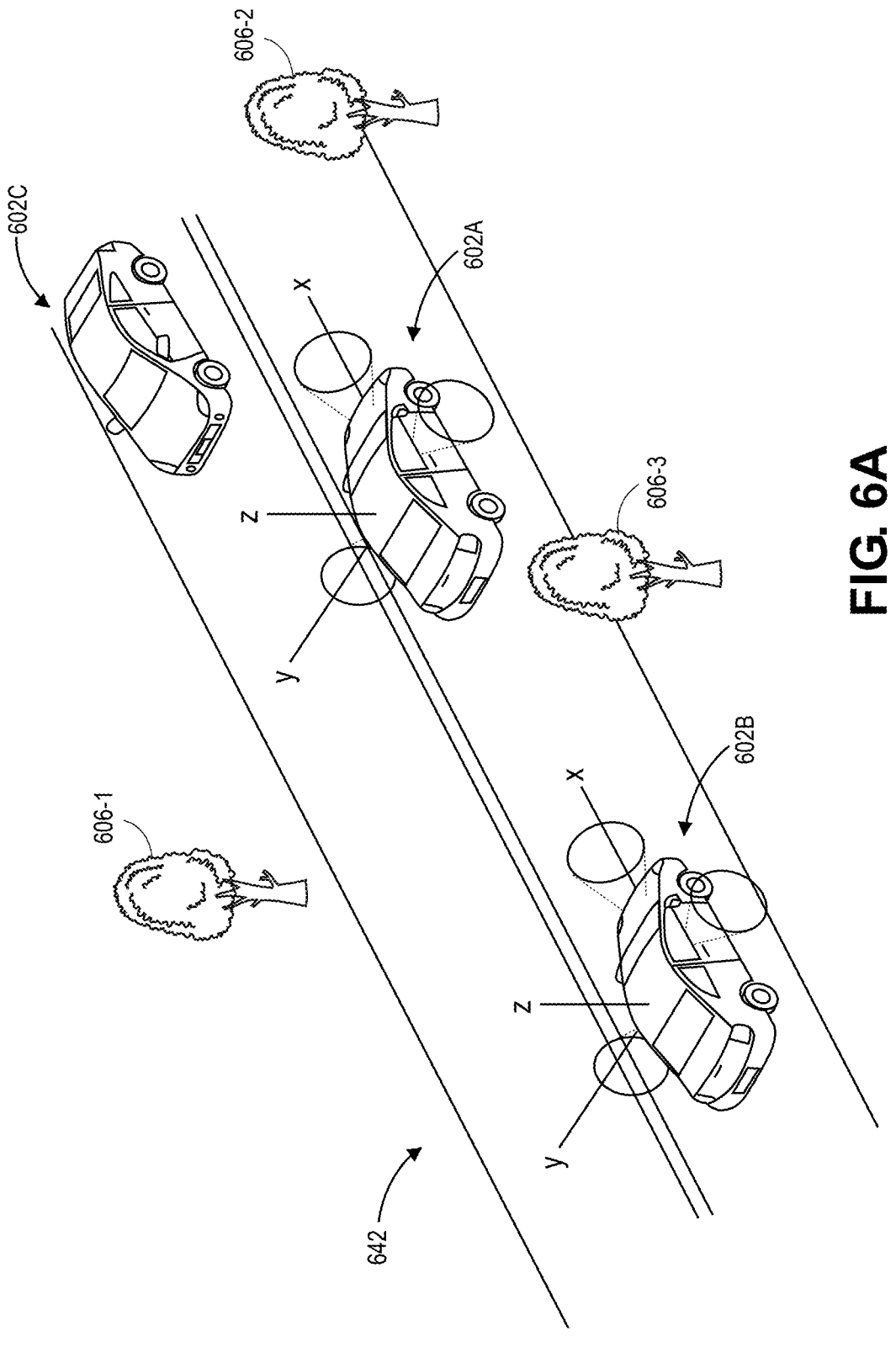
FIGS. 6A through 6G are views of aspects of one system for platooning teleoperated vehicles in accordance with implementations of the present disclosure.

As is shown in FIG. 6A, a platoon includes a lead vehicle 602A and a follower vehicle 602B traveling along one or more roads 642 of any capacity or rating, e.g., highways (e.g., interstate highways, divided highways, or undivided highways), streets, or avenues, which may be open to traffic of all types or forms, or limited to certain types or forms of traffic, e.g., personal vehicles. The roads 642 may further include any number of other vehicles not in the platoon with the lead vehicle 602A and the follower vehicle 602B, e.g., a vehicle 603C. The roads 642 may further include any number of natural or man-made objects nearby, including trees 606-1, 606-2, 606-3, or any other objects such as buildings, posts, signs, walls, or other features.

The lead vehicle 602A and the follower vehicle 602B are outfitted or configured with any number of imaging devices or other sensors for capturing images during operation of the platoon, as well as information or data regarding their respective drive states, which may include, for example, identifiers of the vehicles, indicators of velocities or accelerations of the vehicles, positions of the vehicles, courses of the vehicles, Eulerian angles of the vehicles, steering angles of the vehicles, or any other attributes of the position, motion or orientation of the respective vehicles. The lead vehicle 602A and the follower vehicle 602B may be further outfitted or configured with any type or form of sensors or other equipment for determining ranges to objects, or for detecting and recognizing objects within a vicinity of the respective vehicles.

Figure 6B:
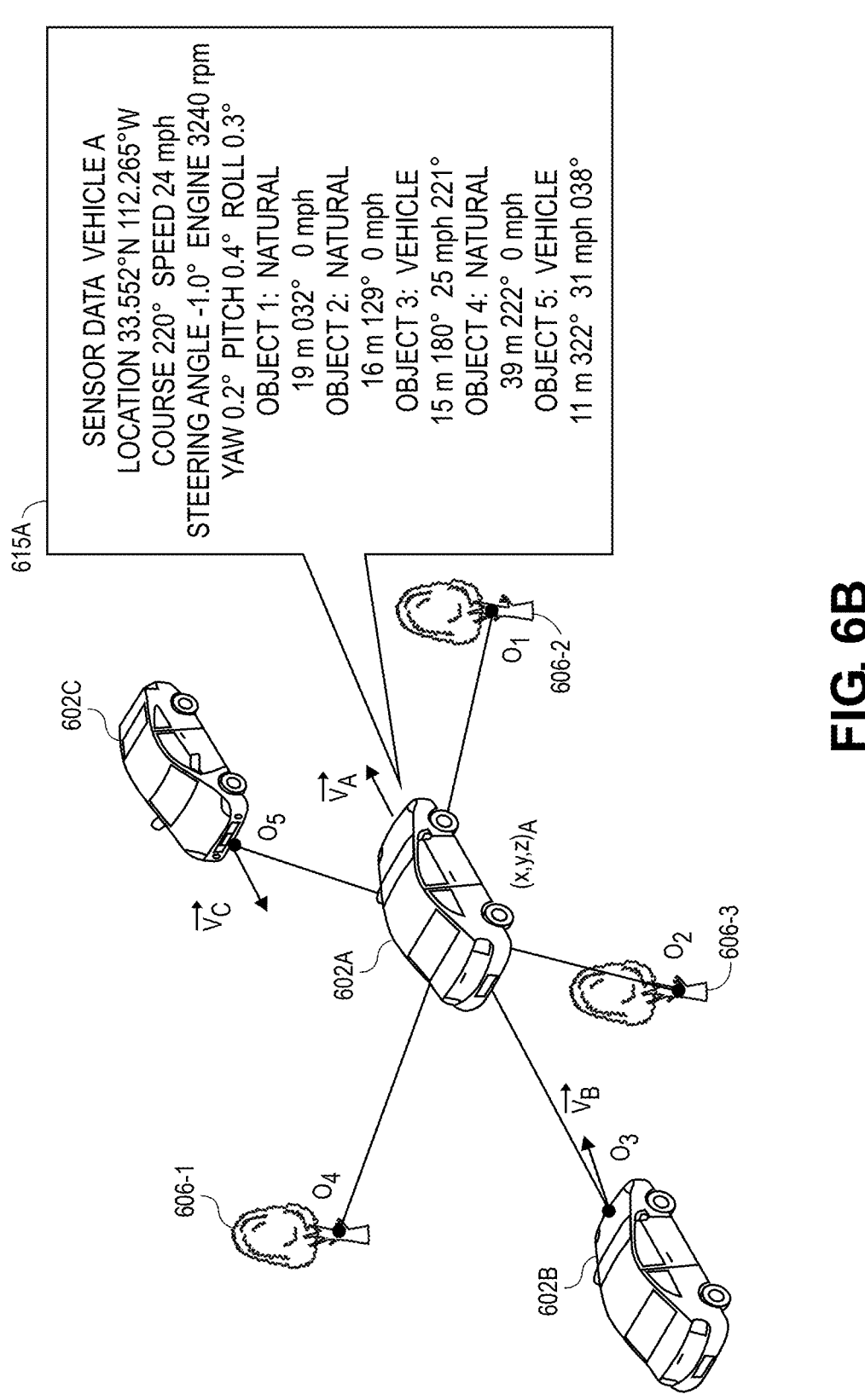

The lead vehicle 602A and the follower vehicle 602B are also configured to transmit images or other information or data captured during operation of the platoon to a teleoperator station 610 over one or more computer networks 605. For example, as is shown in FIG. 6B, the lead vehicle 602A transmits a set of sensor data 615A captured at or near a given time including a location $(x, y, z)_A$ of the lead vehicle 602A, a velocity $V_A$ (e.g., a course and a speed) of the lead vehicle 602A, a steering angle of the lead vehicle 602A, an operating speed of a motor of the lead vehicle 602A, as well as a yaw angle, a pitch angle and a roll angle of the lead vehicle 602A. The set of sensor data 615A also includes information or data regarding positions or motion of objects within a vicinity of the lead vehicle 602A, and classifications of such objects. For example, as is shown in FIG. 6B, the set of sensor data 615A includes a bearing and a range to a position $O_1$ of the tree 606-2, a bearing and a range to a position $O_2$ of the tree 606-3, and a bearing and a range to a position $O_4$ of the tree 606-1, as well as classifications of the trees 606-1, 606-2, 606-3 as natural objects. The set of sensor data 615A further includes a bearing and a range to a position $O_3$ of the follower vehicle 602B, as well as an estimated velocity $V_B$ (e.g., a course and a speed) of the follower vehicle 602B, along with a bearing and a range to a position $O_5$ of the vehicle 602C, and an estimated velocity $V_C$ (e.g., a course and a speed) of the vehicle 602C. The lead vehicle 602A may determine the bearings, ranges, velocities or classifications of the objects, or any other attributes of the shapes, positions or motions of the objects, from the sensor data 615A or the images 660A, or from the sensor data 615A and the images 660A collectively.

Figure 6C:
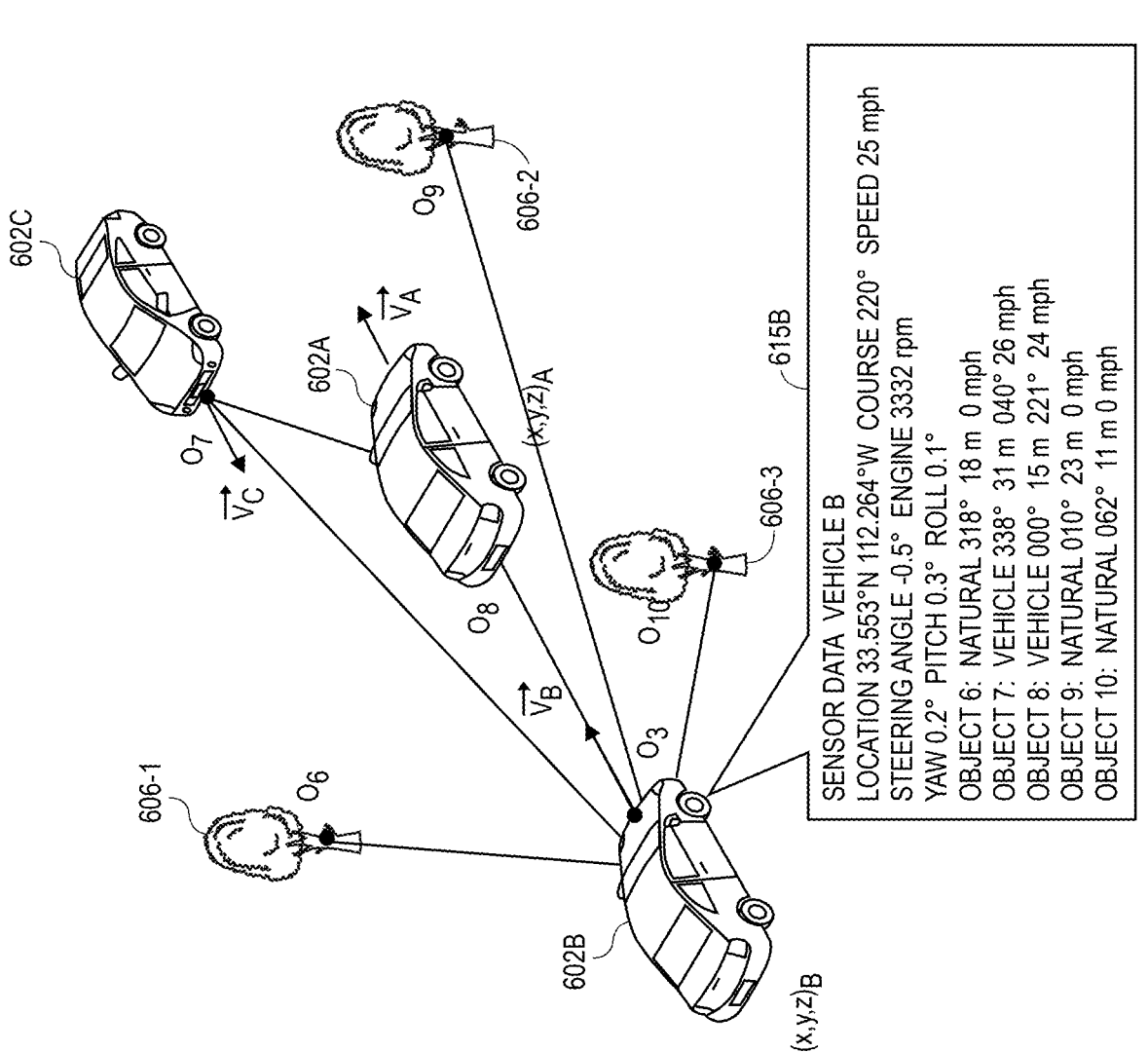

Similarly, as is shown in FIG. 6C, the follower vehicle 602B transmits a set of sensor data 615B captured at or near a given time including a location $(x, y, z)_B$ of the follower vehicle 602B, the velocity $V_B$ (e.g., a course and a speed) of the follower vehicle 602B, a steering angle of the follower vehicle 602B, an operating speed of a motor of the follower vehicle 602B, as well as a yaw angle, a pitch angle and a roll angle of the follower vehicle 602B. The set of sensor data 615B also includes information or data regarding positions or motion of objects within a vicinity of the follower vehicle 602B, and classifications of such objects. For example, as is shown in FIG. 6C, the set of sensor data 615B includes a bearing and a range to a position $O_6$ of the tree 606-1, a bearing and a range to a position $O_9$ of the tree 606-2, and a bearing and a range to a position $O_{10}$ of the tree 606-3, as well as classifications of the trees 606-1, 606-2, 606-3 as natural objects. The set of sensor data 615B further includes a bearing and a range to a position $O_8$ of the lead vehicle 602A, as well as an estimated velocity $V_A$ (e.g., a course and a speed) of the lead vehicle 602A, along with a bearing and a range to a position $O_7$ of the vehicle 602C, and an estimated velocity $V_C$ (e.g., a course and a speed) of the vehicle 602C. As with the lead vehicle 602A, the follower vehicle 602B may determine the bearings, ranges, velocities or classifications of the objects, or any other attributes of the shapes, positions or motions of the objects, from the sensor data 615B or the images 660B, or from the sensor data 615B and the images 660B collectively.

Figure 6D:
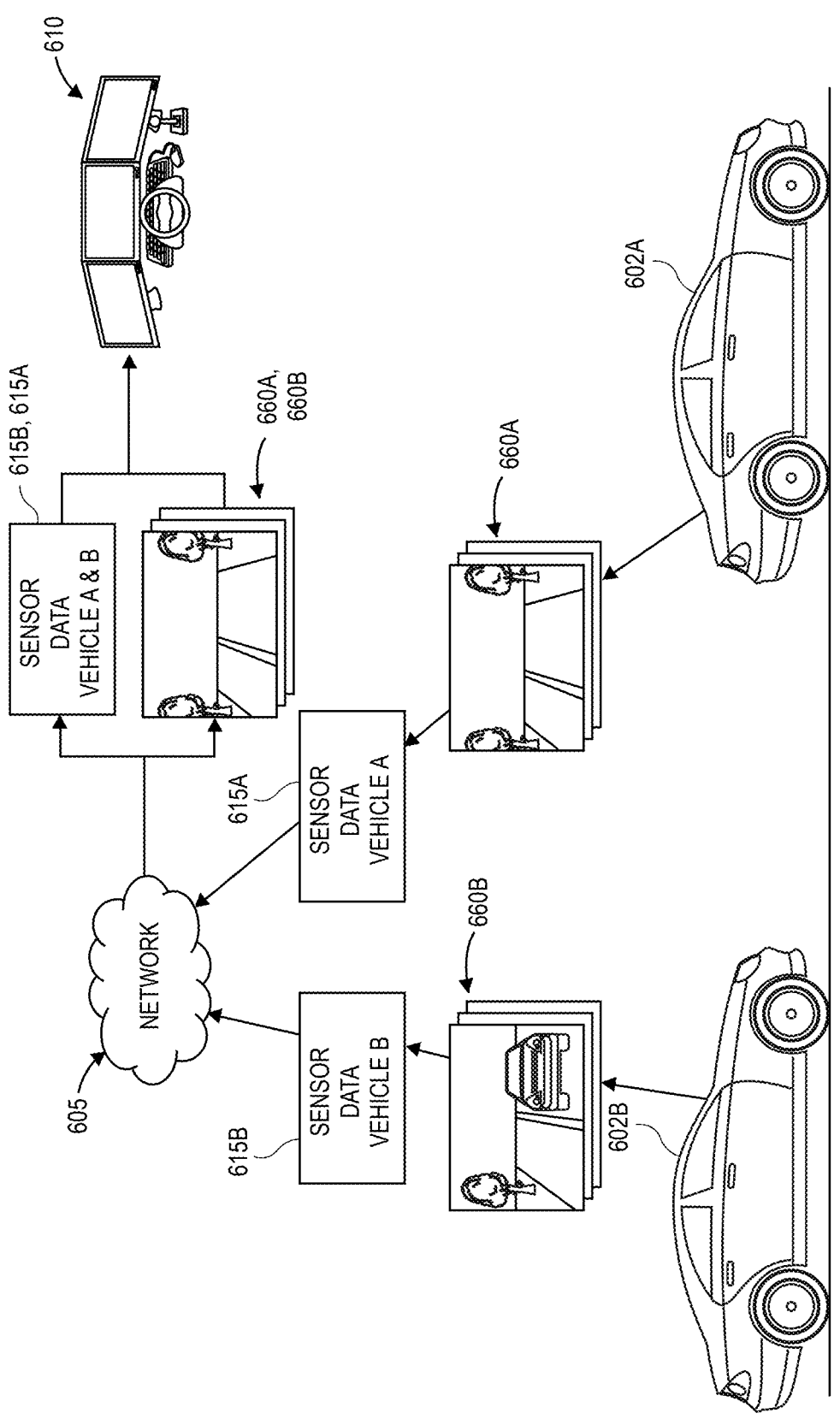

As is shown in FIG. 6D, the lead vehicle 602A transmits images 660A captured during operations and the sensor data 615A to the teleoperator station 610 over one or more networks 605. As is further shown in FIG. 6D, the follower vehicle 602B transmits images 660B captured during operations and the sensor data 615B to the teleoperator station 610 over the one or more networks 605. The images 660A, 660B and the sensor data 615A, 615B may be transmitted in individual sets (e.g., packets) of data, or streamed from the lead vehicle 602A and follower vehicle 602B in a continuous or substantially continuous manner.

Figure 6E:
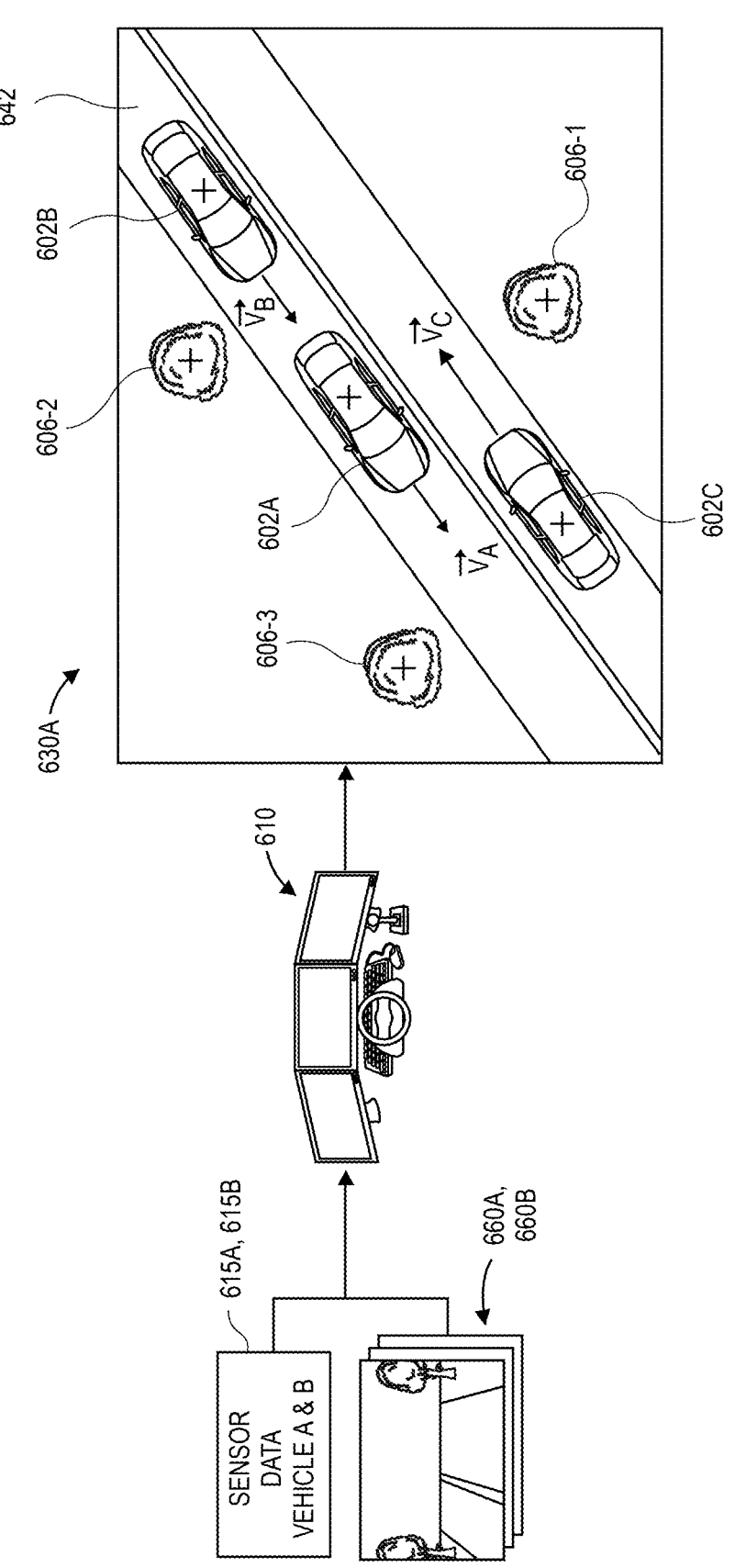

As is shown in FIG. 6E, the teleoperator station 610 may interpret the data regarding the sensor data 615A, 615B and the images 660A, 660B to estimate a drive state 630A of the lead vehicle 602A. For example, the teleoperator station 610 may determine whether any positions, ranges or bearings to objects detected by the lead vehicle 602A may be correlated with positions, ranges or bearings to objects detected by the follower vehicle 602B based on the sensor data 615A, 615B and the images 660A, 660B, and may enhance a determination of the positions of such objects, or ranges or bearings from the lead vehicle 602A to such objects, based on any such correlations. In some implementations, the teleoperator station 610 may be programmed or configured to determine positions of the objects in 3D space based on the sensor data 615A, 615B and the images 660A, 660B, e.g., by clustering positions determined by the lead vehicle 602A and the follower vehicle 602B at common times, or by otherwise triangulating such positions. The drive state 630A may include sets of information or data representative of predictions or hypotheses as to positions of objects expressed in the sensor data 615A, 615B or the images 660A, 660B captured at synchronized or similar times may be correlated and trajectories or records of positions of the objects at various times beginning at an initial position and including subsequently determined positions may be defined.

Furthermore, where positions, ranges or bearings to detected objects may be correlated, the drive state 630A may include classifications of such objects that are enhanced based on differing views of the detected objects, as determined from the images 660A, 660B, or attributes of the positions or motion of the detected objects, as determined from the sensor data 615A, 615B or the images 660A, 660B.

The drive state 630A may also include any other attributes of the operation of the lead vehicle 602A, which may be determined or refined from data captured by the lead vehicle 602A or the follower vehicle 602B. For example, the drive state 630A may identify a position $(x, y, z)_A$ of the lead vehicle 602A, e.g., by a latitude and longitude and, alternatively, an elevation, as well as the velocity $V_A$ of the lead vehicle 602A, e.g., by a course and a speed, that may have greater confidence or lower uncertainty than a position or a velocity determined from data captured by the lead vehicle 602A alone.

Figure 6F:
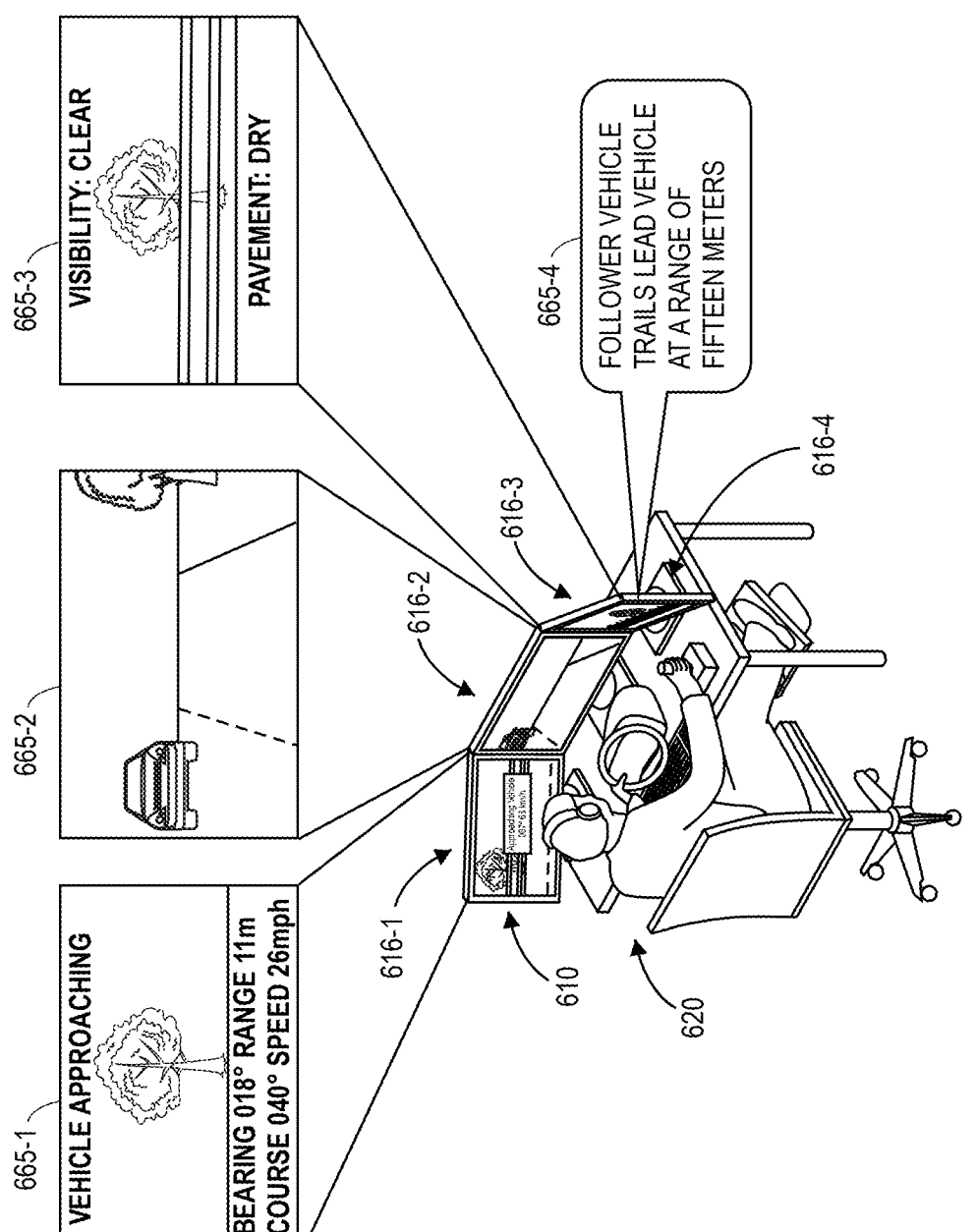

As is shown in FIG. 6F, the teleoperator station 610 may generate a visualization for the lead vehicle 602A based on the drive state 630A, as well as the sensor data 615A, 615B and the images 660A, 660B. The visualization may include images 665-1, 665-2, 665-3 rendered on displays 616-1, 616-2, 616-3, that represent viewpoints or perspectives of the lead vehicle 602A at a position associated with the sensor data 615A, 615B or the images 660A, 660B. Alternatively, or additionally, the teleoperator station 610 may cause acoustic data 665-4 that may have been received from the lead vehicle 602A or the follower vehicle 602B, or generated based on the sensor data 615A, 615B or the images 660A, 660B, to be played to the teleoperator 620 by one or more speakers 616-4. The images 665-1, 665-2, 665-3 or the acoustic data 665-4 of the visualization may provide a more accurate representations of an environment in which the lead vehicle 602A and the follower vehicle 602B and enable the teleoperator 620 to generate more relevant reference commands or instructions for the operation of the lead vehicle 602A accordingly.

Figure 6G:
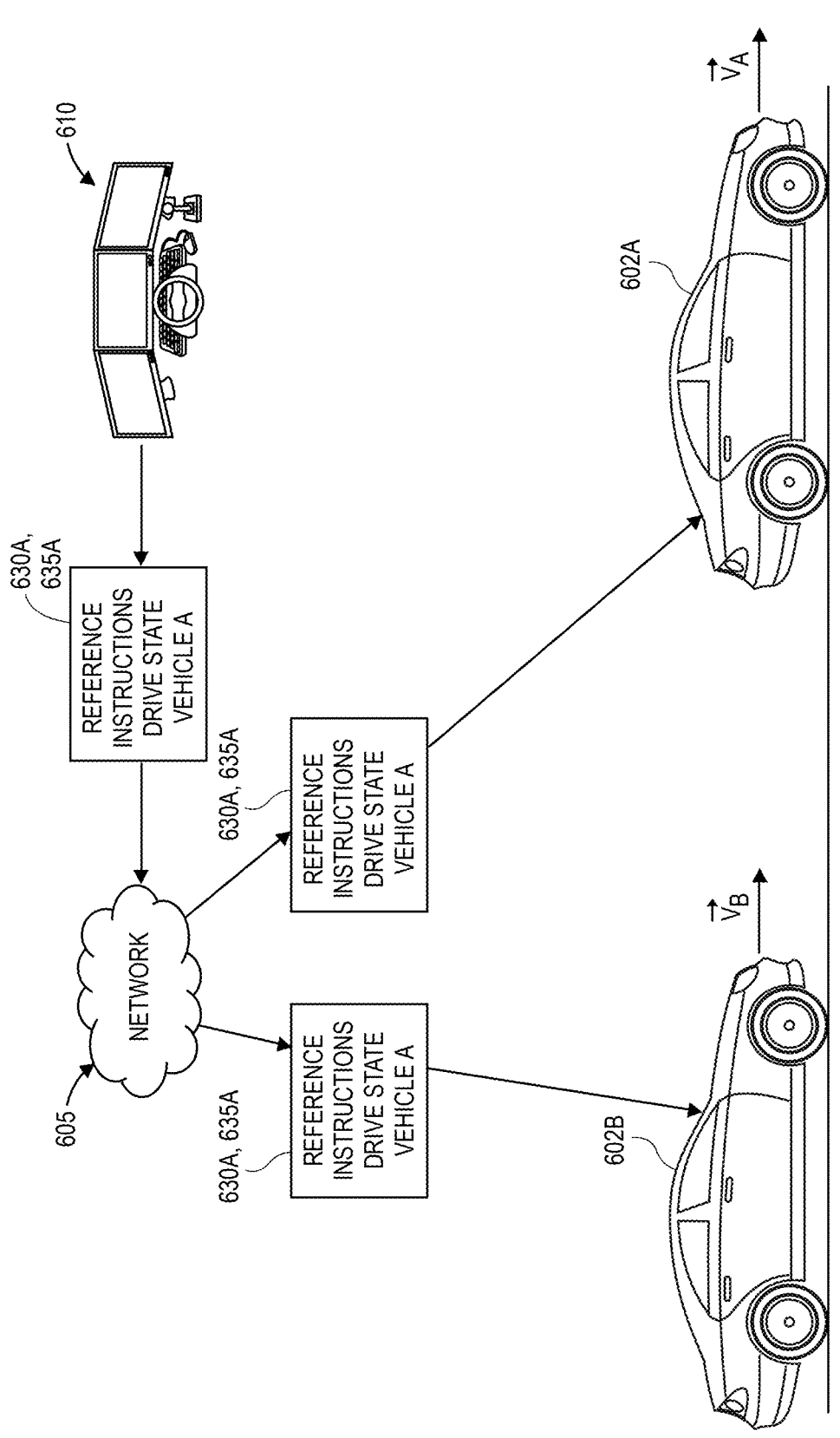

As is shown in FIG. 6G, the teleoperator station 610 may transmit information or data representing the drive state 630A and any reference commands or instructions 635A generated by the teleoperator station 610 to the lead vehicle 602A and the follower vehicle 602B via the wireless communications networks 605. Such reference commands or instructions 635A may include, but need not be limited to, coordinates or other identifiers of any number of points in three-dimensional space of a trajectory that the teleoperator 620 has designated for the lead vehicle 602A to follow, or points of any locations that the lead vehicle 602A is to avoid, as well as any number of conditions or constraints that define parameters of operation for the lead vehicle 602A or the follower vehicle 602B, e.g., maximum or minimum speeds or accelerations minimum turn radii, a formation geometry, or any other conditions or constraints. The lead vehicle 602A may then interpret the reference instructions 635A and generate actions consistent with the reference commands or instructions 635A.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3A and 3B or FIGS. 5A and 5B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A first vehicle comprising:
a first frame;
a first engine;
a first drive train comprising a transmission, a drive shaft, at least one axle and at least one wheel;
at least a first sensor;
a first computer system configured for communication over one or more computer networks; and
a first plurality of actuators in communication with the first computer system, wherein the first plurality of actuators comprises a first steering wheel, a first accelerator pedal and a first brake pedal,
wherein the first computer system is programmed with one or more sets of instructions that, when executed, cause the first computer system to at least:
transmit first information regarding the first vehicle at a first time, wherein the first information comprises:
an identifier of the first vehicle;
a position of the first vehicle at the first time;
an intended destination of the first vehicle; and
at least one condition for establishing a platoon with the first vehicle;
receive second information regarding a second vehicle from a second computer system of the second vehicle at a second time, wherein the second time follows the first time, and wherein the second information comprises:
an identifier of the second vehicle;
a position of the second vehicle at the second time;
an intended destination of the second vehicle; and
an indication that the at least one condition for establishing a platoon with the first vehicle has been met;
capture third information at a third time by at least the first sensor, wherein the first vehicle is traveling on a first course and at a first speed at the third time, wherein the first vehicle is under control of a teleoperator at approximately the third time, and wherein the third information comprises:

a position of the first vehicle at the third time;

the first course; and the first speed;

transmit at least the third information to a third computer system associated with the teleoperator;

receive, from the third computer system, a reference command for the first vehicle, wherein the reference command is generated by the third computer system based at least in part on the third information and fourth information received from the second computer system, wherein the fourth information comprises:

a position of the second vehicle at the third time;

a second course of the second vehicle at the third time; and a second speed of the second vehicle at the third time;

generate, by the first computer system, a set of instructions for causing the first vehicle to travel on a third course or at a third speed based at least in part on the reference command; and execute, by the first computer system, the set of instructions for causing the first vehicle to travel on the third course or at the third speed by at least one of the first plurality of actuators.

2. The first vehicle of claim 1, wherein the third information further comprises at least one of:

a steering torque applied to the first steering wheel;

a steering angle of the first steering wheel;

a position of the first accelerator pedal;

a position of the first brake pedal;

a force applied to the first accelerator pedal;

a force applied to the first brake pedal;

a longitudinal acceleration of the first vehicle;

a longitudinal velocity of the first vehicle; or a yaw angle of the first vehicle, and wherein the fourth information comprises at least one of:

a steering torque applied to a second steering wheel of the second vehicle;

a steering angle of the second steering wheel;

a position of a second accelerator pedal of the second vehicle;

a position of a second brake pedal of the second vehicle;

a force applied to the second accelerator pedal;

a force applied to the second brake pedal;

a longitudinal acceleration of the second vehicle;

a longitudinal velocity of the second vehicle; or a yaw angle of the second vehicle.

3. The first vehicle of claim 1, wherein the reference command is one of:

a change in the first course or a change in the first speed.

4. The first vehicle of claim 1, wherein the third information further comprises at least one image captured by a first camera of the first vehicle, and wherein the fourth information further comprises at least one image captured by a second camera of the second vehicle.

5. The first vehicle of claim 1, wherein the at least one condition is one of:

a predetermined speed of the second vehicle;

a relative position of the second vehicle with respect to the first vehicle;

a course of the second vehicle;

an orientation of the second vehicle; or an intended destination of the second vehicle.

6. A method comprising:

transmitting, by at least a first computer system provided aboard a first vehicle, at least first information captured at a first time by at least a first sensor provided aboard the first vehicle over one or more networks, and wherein the first vehicle is under operational control of a first remote human operator at the first time;

transmitting, by at least a second computer system provided aboard a second vehicle, at least second information captured at approximately the first time by at least a second sensor provided aboard the second vehicle over the one or more networks;

receiving, by a third computer system associated with the first remote human operator, at least the first information from the first computer system and the second information from the second computer system over the one or more networks;

generating, by the third computer system, third information comprising at least one reference command for the first vehicle based at least in part on the first information and the second information;

transmitting, by the third computer system, at least the third information comprising the at least one reference command for the first vehicle over the one or more networks;

receiving, by the first computer system, at least the third information;

generating, by the first computer system, at least one instruction for the first vehicle based at least in part on the at least one reference command; and executing, by the first computer system, the at least one instruction generated for the first vehicle at a second time.

7. The method of claim 6, wherein the first information further comprises at least one of:

a steering torque applied to a first steering wheel of the first vehicle;

a steering angle of the first steering wheel;

a position of a first accelerator pedal of the first vehicle;

a position of a first brake pedal of the first vehicle;

a force applied to the first accelerator pedal;

a force applied to the first brake pedal;

a longitudinal acceleration of the first vehicle;

a longitudinal velocity of the first vehicle; or a yaw angle of the first vehicle, and wherein the second information comprises at least one of:

a steering torque applied to a second steering wheel of the second vehicle;

a steering angle of the second steering wheel;

a position of a second accelerator pedal of the second vehicle;

a position of a second brake pedal of the second vehicle;

a force applied to the second accelerator pedal;

a force applied to the second brake pedal;

a longitudinal acceleration of the second vehicle;

a longitudinal velocity of the second vehicle; or a yaw angle of the second vehicle.

8. The method of claim 6, wherein the reference command is one of:

a change in a course of the first vehicle or a change in a speed of the first vehicle.

9. The method of claim 6, further comprising:

transmitting, by the first computer system, at least fourth information regarding the at least one instruction generated for the first vehicle over the one or more networks;

receiving, by the second computer system, at least the third information and the fourth information;

generating, by the second computer system, at least one instruction for the second vehicle based at least in part on at least the third information and the fourth information; and executing, by the second computer system, the at least one instruction generated for the second vehicle.

10. The method of claim 6, wherein the first information comprises a first plurality of images captured by a first camera provided aboard the first vehicle, wherein the first camera is aligned to capture images from a first field of view extending forward of the first vehicle at least in part, and wherein the method further comprises:

generating, by the third computer system, a visualization representative of the first vehicle at the first time based at least in part on the first information; and causing, by the third computer system, the visualization to be displayed on at least one computer display.

11. The method of claim 6, further comprising:

transmitting, by the first computer system, at least fourth information regarding the first vehicle at a third time, wherein the third time precedes the first time, and wherein the fourth information comprises:

an identifier of the first vehicle;

a position of the first vehicle at the third time;

an intended destination of the first vehicle; and at least one condition for establishing a platoon with the first vehicle; and receiving, by the second computer system, at least the fourth information.

12. The method of claim 11, further comprising:

in response to receiving the fourth information, causing, by the second computer system, the second vehicle to execute at least one of a change in speed or a change in steering angle to satisfy the at least one condition, wherein the at least one condition is one of:

a predetermined speed of the second vehicle;

a relative position of the second vehicle with respect to the first vehicle;

a course of the second vehicle;

an orientation of the second vehicle; or an intended destination of the second vehicle.

13. The method of claim 6, further comprising:

transmitting, by at least a fourth computer system provided aboard a third vehicle, at least fourth information captured at approximately the first time by at least a third sensor provided aboard the third vehicle over the one or more networks, wherein at least the fourth information is received by the third computer system, and wherein the third information is generated based at least in part on the first information, the second information and the fourth information.

14. The method of claim 6, wherein the first vehicle is one of a convertible, a coupe, a hatch back, a sedan, a sport-utility vehicle, a tractor, a truck, or a van, and wherein the first vehicle comprises:

an engine;

a drive train having a transmission having at least one driveshaft, at least one axle, and at least one wheel; and a frame.

15. The method of claim 9, wherein the second vehicle comprises a plurality of actuators, wherein the plurality of actuators comprises:

a steering wheel;

an accelerator pedal; and a brake pedal, and wherein executing the at least one instruction generated for the second vehicle comprises:

causing a change in at least one of:

a steering torque applied to the steering wheel;

a steering angle of the steering wheel;

a position of the accelerator pedal;

a position of the brake pedal;

a force applied to the accelerator pedal; or a force applied to the brake pedal.

16. The method of claim 6, wherein the first sensor comprises at least one of:

an imaging device;

a speedometer;

an encoder;

an accelerometer;

a pressure sensor; or an orientation sensor; and wherein the first information is captured by the first sensor.

17. The method of claim 6, wherein the one or more networks comprise at least one of:

a Long-Term Evolution network;

a 4G wireless communication network;

a 5G wireless communication network; or the Internet.

18. A system comprising:

a teleoperator station;

a first vehicle; and a second vehicle, wherein the first vehicle is programmed with one or more sets of instructions that, when executed, cause the first vehicle to execute a first method comprising:

generating first information regarding the first vehicle at a first time, wherein the first information comprises:

an identifier of a first speed of the first vehicle at the first time; and an identifier of a first course of the first vehicle at the first time; and transmitting at least the first information over at least one network, wherein the second vehicle is programmed with one or more sets of instructions that, when executed, cause the second vehicle to execute a second method comprising:

generating second information regarding the second vehicle at the first time, wherein the second information comprises:

an identifier of a second speed of the second vehicle at the first time; and an identifier of a second course of the second vehicle at the first time; and transmitting at least the second information over the at least one network, and wherein the teleoperator station is programmed with one or more sets of instructions that, when executed, cause the teleoperator station to execute a third method comprising:

receiving at least the first information from the first vehicle and the second information from the second vehicle over the at least one network;

generating a reference command for the first vehicle based at least in part on the first information and the second information; and transmitting third information comprising the reference command for the first vehicle over the at least one network, and wherein the first method further comprises:

receiving the third information from the teleoperator station over the at least one network;

selecting at least one of a third speed or a third steering angle for the first vehicle based at least in part on the reference command;

generating instructions for causing the first vehicle to travel at one of the third speed or the third steering angle; and executing the instructions at a third time.

19. The system of claim 18, wherein the first vehicle comprises a first plurality of actuators, wherein the first plurality of actuators comprises:

a steering wheel;

an accelerator pedal; and a brake pedal; and wherein the second vehicle comprises a second plurality of actuators, wherein the second plurality of actuators comprises:

a steering wheel;

an accelerator pedal; and a brake pedal; and wherein each of the first plurality of actuators and each of the second plurality of actuators is configured for local human operation or remote operation.

20. The system of claim 19, wherein the first vehicle further comprises at least one sensor, wherein the first information is generated by the at least one sensor, and wherein the at least one sensor is one of:

a camera;

a speedometer;

an encoder;

an accelerometer;

a pressure sensor; or an orientation sensor.

* * * * *